(12) United States Patent
Fujimori et al.

(10) Patent No.: US 7,216,987 B2
(45) Date of Patent: May 15, 2007

(54) OPTICAL MODULATOR HOLDER OPTICAL DEVICE AND PROJECTOR

(75) Inventors: Motoyuki Fujimori, Suwa (JP);
Masami Murata, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 275 days.

(21) Appl. No.: 11/042,118

(22) Filed: Jan. 26, 2005

(65) Prior Publication Data
US 2005/0195460 A1    Sep. 8, 2005

(30) Foreign Application Priority Data
Jan. 28, 2004    (JP)    ............................. 2004-020262

(51) Int. Cl.
*G03B 21/18*    (2006.01)
*G02B 26/00*    (2006.01)
(52) U.S. Cl. ....................................... 353/54; 359/237
(58) Field of Classification Search ................... 353/52, 353/54, 61, 100, 119; 359/237
See application file for complete search history.

(56) References Cited

U.S. PATENT DOCUMENTS 6,991,335 B2 *    1/2006    Kondo et al. .................. 353/54

2005/0168703 A1 *    8/2005    Fujimori et al. ............... 353/52
2006/0157230 A1 *    7/2006    Kawahara et al. ...... 165/104.33

FOREIGN PATENT DOCUMENTS

| JP | A 1-302386 | 12/1989 |
|---|---|---|
| JP | A 3-174134 | 7/1991 |
| JP | A 2002-357803 | 12/2002 |

\* cited by examiner

*Primary Examiner*—Christopher Mahoney
(74) *Attorney, Agent, or Firm*—Oliff & Berridge, PLC

(57) ABSTRACT

An optical modulator holder 4402 has a middle frame 4409 for supporting a liquid crystal panel 441, a pair of frame members 4405 and 4406 for sandwiching the middle frame 4409 supporting the liquid crystal panel 441, a second elastic member 4407B and a third elastic member 4407C respectively interposed between the pair of frame members 4405 and 4406 and the liquid crystal panel 441, and translucent boards 442A and 443A respectively arranged on outer faces of the pair of frame members 4405 and 4406. An opening 4409A into which the liquid crystal panel 441 can be fitted is formed on the middle frame 4409, and an inner face thereof serves as an exterior position reference face for the liquid crystal panel 441.

22 Claims, 31 Drawing Sheets

OPTICAL MODULATOR HOLDER OPTICAL DEVICE AND PROJECTOR

BACKGROUND OF THE INVENTION

1. Field of the Invention

The present invention relates to an optical modulator holder, an optical device and a projector.

2. Description of Related Art

There has been a well-know projector including a plurality of optical modulator devices that modulate light beams irradiated from a light source in accordance with image information to form an optical image, a color-combining optical device that combines the light beams modulated by the respective optical modulator devices to irradiate them, and a projection optical device that projects the light beams combined by the color-combining optical device in an enlarged manner.

As for the optical modulator device, for example, an optical modulator of an active-matrix drive system having a pair of boards with electro-optic material such as liquid crystal sealed therebetween is typically used. More specifically, the pair of boards of the optical modulator includes a drive board arranged on a light-irradiation side, adapted to apply a drive voltage to the liquid crystal and provided with data lines, scan lines, switching elements, pixel electrodes and the like, and an opposing board arranged on a light-incident side and provided with common electrodes, a black matrix and the like.

An incident-side polarization plate and an irradiation-side polarization plate for transmitting a light beam having a predetermined polarization axis are respectively arranged on the light-incident side and light-irradiation side of the optical modulator.

When the light beam irradiated from the light source is irradiated on the optical modulator, the temperature of the optical modulator tends to rise due to light absorption by a liquid crystal layer as well as light absorption by the data lines and scan lines formed on the drive board and the black matrix formed on the opposing board. Further, a light beam not having a predetermined polarization axis contained in the light beam irradiated by the light source and the light beam transmitted through the optical modulator is absorbed by the incident-side polarization plate and the irradiation-side polarization plate, and therefore the polarization plates tend to be heated.

A projector having such optical elements thereinside disclosed in Reference: JP Hei 01-302386A includes a cooling device with use of a cooling fluid in order to suppress the temperature rise of the optical elements.

More specifically, the cooling device described in the Reference is constructed of a substantially rectangular solid casing with openings on opposing end faces. The openings are respectively covered by glass plates, and thus a cooling chamber for sealing the cooling fluid therein is formed. The previously-mentioned optical modulator, the incident-side polarization plate and the irradiation-side polarization plate are arranged at predetermined intervals in the cooling fluid. With this configuration, the heat generated in the optical modulator, the incident-side polarization plate and the irradiation-side polarization plate is directly radiated to the cooling fluid.

In the cooling device described in Reference, however, it is difficult to install the optical modulators at predetermined positions in the casing, and the positioning accuracy of the optical modulator with respect to the casing is low.

Moreover, the positions of the optical modulators might be displaced with respect to the casing after a long period of use.

If the optical modulators are displaced with respect to the casing as mentioned above, the positions of the optical modulators with respect to the optical axis of the light beam irradiated from the light source are also displaced, and therefore an unwanted light is projected on the screen.

SUMMARY OF THE INVENTION

An object of the present invention is to provide an optical modulator holder, an optical device and a projector in which an optical modulator can be cooled by a cooling fluid and an optical modulator can be positioned at a predetermined position.

According to the present invention, an optical modulator holder holds an optical modulator for modulating a light beam irradiated from a light source in accordance with image information to form an optical image, and is provided with a cooling chamber for sealing the cooling fluid therein, the cooling fluid cooling the optical modulator. The optical modulator holder includes: a support frame having an opening corresponding to the outer profile of the optical modulator and supporting the optical modulator; a pair of frame members respectively having openings corresponding to an image formation area of the optical modulator and sandwiching the support frame supporting the optical modulator; elastic members respectively having openings corresponding to the image formation area of the optical modulator and respectively interposed between the pair of frame members and the optical modulator; and translucent boards respectively arranged on faces opposite to the opposing faces of the pair of frame members. The cooling chamber is formed by closing opposing faces of the openings of the pair frame members and the faces opposite to the opposing faces respectively with the optical modulator, the support frame, the elastic members and the translucent boards such that the cooling chamber is formed inside both of the pair of frame members, and the optical modulator can be fitted into the opening of the support frame, an inner face of the opening of the support frame being an external position reference face for the optical modulator.

According to this configuration, the optical modulator holder includes the support frame, the pair of frame members, the elastic members, and translucent boards. The support frame supports the optical modulator by fitting the optical modulator in the opening with the inner face serving as the external position reference face, so that the optical modulator is positioned with respect to the support frame. The support frame with the optical modulator is sandwiched by the pair of frame members through the elastic members, and the translucent boards are respectively arranged on the faces opposite to the opposing faces of the pair of frame members. The optical modulator holder is thus assembled. Accordingly, since the support frame restricts the external position of the optical modulator, the positioning accuracy of the optical modulator with respect to the optical modulator holder can be improved compared with a conventional configuration in which the optical modulator is accommodated and arranged in a casing. The movement of the optical modulator in the outer circumferential direction is restricted by the support frame, and the movement of the optical modulator in the thickness direction and the inclination direction is restricted by the elastic members and the pair of frame members. Therefore, even after a long period of use, the position of the optical modulator will not be displaced with respect to the optical modulator holder.

Since the opposing faces of the opening of the pair of frame members and the faces opposite to the opposing faces are respectively covered by the support frame, the elastic members, the optical modulator and the translucent boards, the cooling chambers are formed on both of the light-incident side and the light-irradiation side of the optical modulator. The cooling fluid can therefore efficiently cool the optical modulator.

Accordingly, since the cooling fluid can efficiently cool the optical modulator and the optical modulator can be positioned at a predetermined position, the object of the present invention can be achieved.

The optical modulator is assembled in the optical modulator holder in a condition that the optical modulator is supported by the support frame in advance. Therefore, compared with the conventional configuration in which the optical modulator without being covered is accommodated and arranged in the casing, the damage to the optical panel due to a clash with other components will not be caused during the handling of the optical modulator.

In the above-described optical modulator holder, it is preferable that the support frame has a thickness approximately equal to a thickness of the optical modulator, so that a light-incident end face and a light-irradiation end face of the support frame become, respectively, substantially flush with a light-incident end face and a light-irradiation end face of the optical modulator when the optical modulator is received in the opening.

According to this configuration, since the support frame becomes flush with the light-incident end face and the light-irradiation end face of the optical modulator when the optical modulator is received in the opening, the outer circumference of the optical modulator is covered by the inner face of the opening of the support frame. Therefore, in a condition that the optical modulator holder is assembled, when the elastic members are pressed by the optical modulator and the pair of frame members, the elastic members will not be moved to the outer circumferential direction of the optical modulator by the reaction force. Accordingly, the leakage protection of the cooling fluid between the optical modulator and the pair of frame members can be secured by the elastic members.

In the above-described optical modulator holder, it is preferable that the elastic members are extended to planimetrically interfere with the support frame and respectively interposed between the support frame, the optical modulator and the pair of frame members.

According to this configuration, the elastic members are extended to planimetrically interfere with the support frame and respectively interposed between the support frame, the optical modulator and the pair of frame members. Therefore, for example, compared with the configuration in which the elastic members are interposed between only the optical modulator and the pair of frame members without planimetrically interfering with the support frame, the volume of the elastic members can be increased. Since the support frame becomes flush with the light-incident end face and the light-irradiation end face of the optical modulator, the width of flexed parts of the elastic members can be equalized when the elastic members are pressed by the support frame, the optical modulator and the pair of frame members. Accordingly, the leakage protection of the cooling fluid between the pair of frame members and the optical modulator can be more secured by the elastic members.

In the above-described optical modulator holder, it is preferable that recesses corresponding to the shape of the elastic members are respectively formed on the opposing faces of the pair of frame members, and elastic member housings capable of accommodating the elastic members are formed by the support frame, the optical modulator and the recesses when the optical modulator holder is assembled.

According to this configuration, when the optical modulator holder is assembled, the elastic member housings are formed by the support frame, optical modulator and the recesses formed on the opposing faces of the pair of frame members. Therefore, neither the reaction force caused when the elastic members are pressed by the support frame, the optical modulator and the pair of frame members, nor the pressure fluctuation of the cooling fluid in the respective cooling chambers cause the displacement of the elastic members. Accordingly, the leakage protection of the cooling fluid between the optical modulator and the pair of frame members can be more secured by the elastic members.

In the above-described optical modulator holder, it is preferable that a projection projecting toward the opposing frame member is formed on at least one frame member of the pair of frame members, and a fitting portion into which the projection can be fitted is formed on the support frame.

The number of projection and the number of fitting portion corresponding thereto may, without limitation, be at least one.

According to this configuration, the external position of the optical modulator is restrict by the support frame, and the position with respect to the pair of frame members of the support frame is restricted by fitting the projection formed on at least one frame member of the pair of frame members to the fitting portion of the support frame. Accordingly, the positioning accuracy of the optical modulator with respect to the optical modulator holder can be further improved with the simple structure. Since the projection of the frame member is fitted to the fitting portion of the support frame, the support frame will not be displaced with respect to the pair of frame members even after a long period of use. That is, the optical modulator will not be displaced with respect to the optical modulator holder. With this configuration, the optical modulator holder can be easily assembled with the simple structure.

In the above-described optical modulator holder, it is preferable that the projection projecting toward the opposing frame member is formed on a one frame member of the pair of frame members, and is provided with a hole communicating with the inside of the cooling chamber in the one frame member, the projection can be inserted into the fitting portion of the support frame, a projection insert hole communicating with the inside of the cooling chamber in the other frame member and into which the projection can be inserted is formed on the other frame member of the pair of frame members, and an insert hole into which the projection can be inserted is formed on the elastic member interposed between the other frame member and the optical modulator.

According to this configuration, the projection formed on the one frame member has the hole communicating with the inside of the cooling chamber in the one frame member, and the projection insert hole communicating with the inside of the cooling chamber in the other frame member is formed on the other frame member. Accordingly, the cooling chambers can be communicated and connected by inserting the projection of the one frame member in the projection insert hole of the other frame member in assembling the respective frame members.

Therefore, the cooling fluid can flow from either one of the cooling chambers to the other one of the cooling chambers or other way around, and thus the light-incident side and the light-irradiation side of the optical modulator can be cooled by the cooling fluids with the substantially same temperature. This equalizes the temperature of the light-incident side and the light-irradiation side of the optical modulator.

Also, for example, compared with the configuration in which the cooling chambers are communicated and connected by the fluid circulator for flowing the cooling fluid therein, the optical modulator holder can become compact, and the size and the weight of the optical modulator holder can be reduced.

Moreover, for example, when providing an inlet port through which the cooling fluid flows from the outside to the inside of the cooling chamber and an outlet port from which the cooling fluid inside the cooling chamber flows to the outside, there is no need to provide two inlet ports and two outlet ports corresponding to the cooling chambers since the cooling chambers are communicated and connected. Therefore, the configuration in which only one inlet port and one outlet port are provided in the optical modulator holder is applicable. Accordingly, compared with the configuration in which two inlet ports and two outlet ports are provided corresponding to the cooling chambers, the number of the fluid circulator for connecting the inlet port and the outlet port can be reduced. This facilitates the work for connecting the inlet port and the outlet port to the fluid circulators and improves the space efficiency around the optical modulator holder.

The elastic member interposed between the other frame member and the optical modulator has the insert hole. Accordingly, in a condition that the optical modulator holder is assembled, when the elastic member is pressed by the other frame member and the optical modulator, the projection insert hole of the elastic member can press and abut on a connecting part of the projection and the projection insert hole. Therefore, the leakage of the cooling fluid circulating between the cooling chambers through the projection and the projection insert hole can be surely prevented with the simple structure By integrating a component for preventing the leakage of the cooling fluid between the other frame member and the optical modulator and a component for preventing the leakage of the cooling fluid from the connecting part of the projection and the projection insert hole, the number of components and the number of steps for assembling the optical modulator holder can be reduced.

In the above-described optical modulator holder, it is preferable that the optical modulator includes: a drive board having a plurality of signal lines, a plurality of switching elements connected to the plurality of signal lines, and a plurality of pixel electrodes connected to the plurality of switching elements; an opposing board arranged opposite to the drive board and having a common electrode; and a circuit board electrically connected to the plurality of signal lines and the common electrode and extending from between the drive board and the opposing board, and a recess into which the circuit board is loosely fitted when the optical modulator is received in the opening is formed on the support frame.

An active-matrix drive system is applicable to the optical modulator of the present invention. As a switching element, a three-terminal element such as a TFT element (Thin Film Transistor) or a two-terminal element such as MIM (Metal Insulator Metal) is applicable.

According to the above-mentioned configuration, the optical modulator includes the drive board, the opposing board and the circuit board. Also, the recess into which the circuit board is loosely fitted is formed on the support frame. Therefore, since the support frame does not interfere with the circuit board even when the support frame supports the optical modulator on the opening, the external force applied to the circuit board will not affect on the opposing board and the drive board. Accordingly, the positioning accuracy of the optical modulator with respect to the optical modulator holder can be maintained properly.

In the above-described optical modulator holder, it is preferable that the pair of frame members and the support frame are made of a same material.

According to this configuration, since the pair of frame members and the support frame are made of a same material, the size fluctuation due to the temperature fluctuation can be equalized, and the variation of the width of the flexed parts of the elastic members is therefore minimized. Accordingly, the leakage protection of the cooling fluid between the pair of frame members and the optical modulator can be properly secured.

According to the present invention, an optical device includes: an optical modulator that modulates a light beam irradiated from a light source in accordance with image information to form an optical image; and the above-described optical modulator holder.

According to this configuration, since the optical device includes the optical modulator and the above-described optical modulator holder, the same functions and advantages as the above-described optical modulator holder can be obtained.

Preferably, the above-described optical device further includes at least one optical converter that converts an optical property of an incident light beam, and the optical converter has: a translucent board; and an optical conversion film formed on the translucent board for converting the optical property of the incident light beam. At least one of the translucent boards of the optical modulator holder is the translucent board of the optical converter.

As the optical modulator, a polarization plate, a phase plate or a visual-angle corrector plate may be used, for example.

According to this configuration, since at least one of the translucent boards of the optical modulator holder is the translucent board of the optical converter. Accordingly, not only the heat in the optical modulator but also the heat in an optical conversion film generated by the light beam irradiated from the light source can be released to the cooling fluid convecting in the cooling chambers through the translucent board.

Preferably, the above-described optical device further includes: a plurality of the optical modulators; a plurality of the optical modulator holders corresponding to the plurality of optical modulators; and a color-combining optical device that has a plurality of light-incident end faces to which the plurality of optical modulator holders are attached, and combines and irradiates respective color lights modulated by the plurality of optical modulators.

According to this configuration, the optical device includes the plurality of optical modulators, the plurality of optical modulator holders and the color-combining optical device. As described above, since the positioning accuracy of the optical modulator with respect to the optical modulator holder is improved, the relative displacement of the optical modulators can be prevented, and therefore the optical device can form a proper optical image without pixel displacement.

According to the present invention, a projector includes: a light source device; the above-described optical device; and a projection optical device that enlarges and projects an optical image formed by the optical device.

According to this configuration, since the projector includes the light source device, the above-described optical device and the projection optical device, the same functions and advantages as the above-described optical device can be obtained.

With this projector, since the positioning accuracy of the optical modulator is improved, the position of the optical modulator with respect to the optical axis of the light beam irradiated from the light source device will not be displaced, and therefore an unwanted light will not be projected on the screen.

DETAILED DESCRIPTION OF PREFERRED EMBODIMENT(S)

[First Embodiment]

A first embodiment of the present invention will be described below with reference to the attached drawings.

[Structure of Projector]

Figure 1:
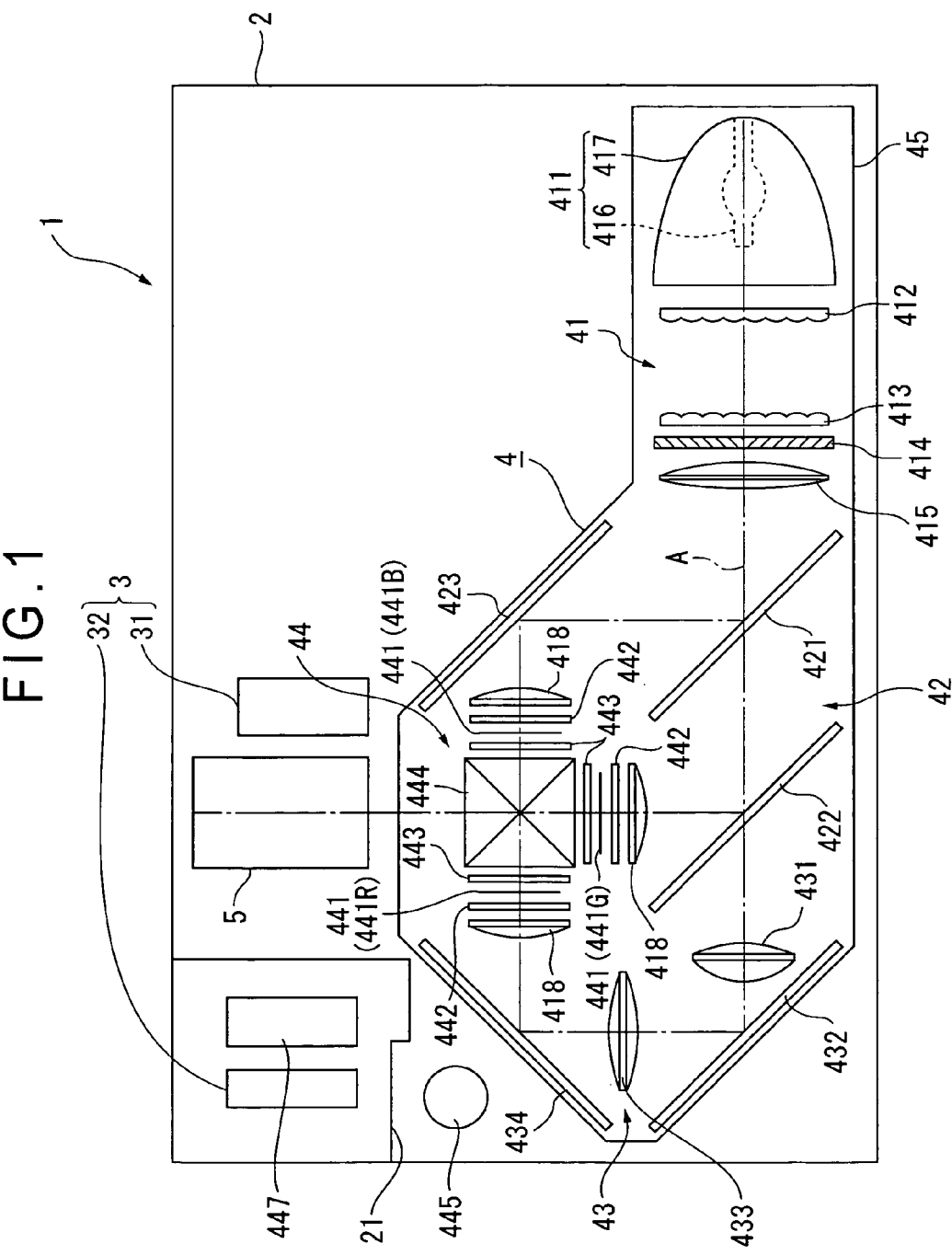
FIG. 1 is a schematic illustration showing the structure of a projector according to each embodiment.

FIG. 1 is a schematic illustration showing the structure of a projector 1.

The projector 1 is designed to modulate a light beam irradiated from a light source in accordance with image information to form an optical image, and project the formed optical image on a screen in an enlarged manner. The projector 1 includes an exterior case 2, a cooling unit 3, an optical unit 4, and a projection lens 5 as a projection optical device.

Although not shown in FIG. 1, a power source block, a lamp drive circuit and the like are arranged in the exterior case 2 except the space where the cooling unit 3, the optical unit 4 and the projection lens 5 are arranged.

The exterior case 2 is made of synthetic resin or the like and substantially formed in a rectangular solid as a whole in which the cooling unit 3, the optical unit 4 and the projection lens 5 are accommodated. Although not shown, the exterior case 2 includes an upper case forming a top face, a front face, a rear face and side faces of the projector 1, and a lower case forming a bottom face, a front face, side faces and a rear face of the projector 1. The upper case and the lower case are fixed to each other by screws or the like.

The exterior case 2 may be made of other materials such as metal without limiting to synthetic resin.

Although not shown, the exterior case 2 has an intake port such that the cooling unit 3 introduces cooling air thereinto from the outside of the projector 1 (see, for example, an intake port 22 shown in FIG. 2) and an exhaust port for exhausting the air heated in the projector 1.

Further, as shown in FIG. 1, the exterior case 2 has a partition 21, which is located at the side of the projection lens 5 at the corner of the exterior case 2 to insulate a radiator of a later-described optical device of the optical unit 4 from other components.

The cooling unit 3 sends the cooling air to a cooling flow channel formed inside the projector 1 to cool the heat generated in the projector 1. The cooling unit 3 includes a sirocco fan 31 located at the side of the projection lens 5 and adapted to introduce the cooling air outside the projector 1 from a not-shown intake port of the exterior case 2 to blow the cooling air on liquid crystal panels of the later-described optical device of the optical unit 4, and an axial fan 32 located at the inner side of the partition 21 of the exterior case 2 and adapted to introduce the cooling air outside the projector 1 from the intake port 22 (see FIG. 2) of the exterior case 2 to blow the cooling air on the later-described radiator of the optical unit 4.

Although not shown, the cooling unit 3 includes a later-described light source device of the optical unit 4, and the not-shown power source block, the lamp drive circuit and the like in addition to the sirocco fan 31 and the axial fan 32.

The optical unit 4 is a unit that optically processes the light beam irradiated from the light source to form an optical image (color image) in accordance with image information. The optical unit 4, as shown in FIG. 1, has a substantially L shape in plan view extending along the rear face of the exterior case 2 and also extending along the side face of the exterior case 2. The structure of the optical unit 4 will be described later in detail.

The projection lens 5 is a lens set including a plurality of combined lenses. The projection lens 5 projects the optical image (color image) formed by the optical unit 4 on a not-shown screen in an enlarged manner.

[Detailed Structure of Optical Unit]

As shown in FIG. 1, the optical unit 4 includes an integrator illumination optical system 41, a color-separating optical system 42, a relay optical system 43, an optical device 44, and an optical component casing 45 for accommodating these optical components 41 to 44 therein.

The integrator illumination optical system 41 is an optical system that substantially uniformly illuminates an image formation area of the later-described liquid crystal panels of the optical device 44. As shown in FIG. 1, the integrator illumination optical system 41 includes the light source device 411, a first lens array 412, a second lens array 413, a polarization converter 414 and a superposing lens 415.

The light source device 411 includes a light source lamp 416 that irradiates a radial light, and a reflector 417 that reflects the radial light irradiated by the light source lamp 416. A halogen lamp, a metal halide lamp or a high-pressure mercury lamp is often used as the light source lamp 416. As for the reflector 417, although a parabolic mirror is employed in FIG. 1, it may be constructed of an ellipsoidal mirror in which a parallelizing concave lens that converts the light beam reflected by the ellipsoidal mirror into a parallel light is employed at the light-irradiation side.

The first lens array 412 has small lenses arranged in a matrix, the lenses having a substantially rectangular shape when viewed from the optical axis direction. The respective small lenses divide the light beam irradiated from the light source device 411 into a plurality of sub-beams.

The second lens array 413 configured like the first lens array 412 has small lenses arranged in a matrix. The second lens array 413 focuses images of the small lenses of the first lens array 412 onto the later-described liquid crystal panels of the optical device 44 together with the superposing lens 415.

The polarization converter 414 interposed between the second lens array 413 and the superposing lens 415 converts the light beams from the second lens array 413 into a substantially uniform polarized light.

Specifically, the respective sub-beams converted into the substantially uniform polarized light by the polarization converter 414 are finally substantially superposed on the liquid crystal panels of the later-described optical device 44 by the superposing lens 415. Since only a uniform polarized light can be used in a projector using the liquid crystal panels that modulate a polarized light, about a half of the light from the light source device 411 that emits a random polarized light cannot be used. Accordingly, with the use of the polarization converter 414, all of the light irradiated from the light source device 411 is converted into a substantially uniform polarized light to enhance the light utilization efficiency of the optical device 44.

The color-separating optical system 42, as shown in FIG. 1, includes two dichroic mirrors 421 and 422, and a reflection mirror 423, and has a function for separating the plurality of sub-beams irradiated from the integrator illumination optical system 41 by the dichroic mirrors 421 and 422 into three color lights of red, green and blue.

The relay optical system 43, as shown in FIG. 1, includes an incident-side lens 431, a relay lens 433 and two reflection mirrors 432 and 434, and has a function for guiding the red light separated by the color-separating optical system 42 toward the later-described liquid crystal panel for the red light of the optical device 44.

The dichroic mirror 421 of the color-separating optical system 42 reflects the blue light component of the light beam irradiated from the integrator illumination optical system 41, but transmits the red light component and the green light component. The blue light reflected by the dichroic mirror 421 is reflected by the reflection mirror 423 to reach the later-described liquid crystal panel for the blue light of the optical device 44 through a field lens 418. The field lens 418 converts the respective sub-beams irradiated from the second lens array 413 into a light beam parallel to the center axis (main beam) thereof. The field lenses 418 provided on the light-incident side of the other liquid crystal panels for the green light and the red light function in the same manner.

After the red and green lights passed through the dichroic mirror 421, the green light is reflected by the dichroic mirror 422 to reach the later-described liquid crystal panel for the green light of the optical device 44 through the field lens 418. On the other hand, the red light passes through the dichroic mirror 422, the relay optical system 43, and the field lens 418 to reach the later-described liquid crystal panel for the red light of the optical device 44. Herein, because the optical path length of the red light is longer than those of the other color lights, the relay optical system 43 is used for the red light, thereby preventing deterioration in the light utilization efficiency caused by the light dispersion and the like. In other words, the relay optical system 43 is used for directly transmitting the sub-beams incident on the incident-side lens 431 to the field lens 418.

The optical device 44, as shown in FIG. 1, integrally includes the three liquid crystal panels 441 (defining the liquid crystal panel for the red light as 441R, the liquid crystal panel for the green light as 441G, and the liquid crystal panel for the blue light as 441B) as an optical modulator, incident-side polarization plates 442 and irradiation-side polarization plates 443 as optical converters respectively disposed on the light-incident side and the light-irradiation side of the liquid crystal panels 441, and a cross dichroic prism 444 as a color-combining optical device.

The optical device 44, of which structure will be described later in more detail, includes a main tank, a fluid feeder, the radiator, fluid circulators, a fluid splitter, optical modulator holders and a relay tank, in addition to the liquid crystal panels 441, the incident-side polarization plate 442, the irradiation-side polarization plate 443 and the cross dichroic prism 444.

The liquid crystal panel 441 is a pair of boards 441C and 441D (see FIG. 8) made of glass or the like with electro-optic material such as liquid crystal sealed therebetween. The board 441C (see FIG. 8) is a drive board that drives the liquid crystal, and is provided with a plurality of data lines arranged in parallel to each other, a plurality of scan lines arranged in the direction orthogonal to the plurality of the data lines, pixels electrodes arranged in a matrix corresponding to the cross of the scan lines and data lines, and switching elements such as TFT. The board 441D (see FIG. 8) is an opposing board arranged opposite to the board 441C with a predetermined interval therebetween, and is provide with common electrodes to which a predetermined voltage Vcom is applied. The boards 441C and 441D are electrically connected to a not-shown control device, and connected to a flexible printed board 441E (see FIG. 8) as a circuit board for outputting a predetermined drive signal to the scan lines, the data lines, the switching elements, and the common electrodes. When the drive signal is input from the control device through the flexible printed board 441E (see FIG. 8), the voltage is applied between predetermined pixel electrodes and common electrodes, and thus the orientation of the crystal liquid interposed between the pixel electrodes and the common electrodes are controlled to change the polarized light beam irradiated from the incident-side polarization plate 442.

The incident-side polarization plate 442, on which color lights having the polarization direction aligned substantially in one direction by the polarization converter 414 are incident, transmits the polarized light contained in the incident light beam in the direction same as the polarization axis of the light beam aligned by the polarization converter 414, and absorbs the other light beams. The incident-side polarization plate 442 has a translucent board 442A (see FIG. 8) such as sapphire glass or crystal with a polarization film (not shown) as an optical conversion film attached thereon.

The irradiation-side polarization plate 443, like the incident-side polarization plate 442, has a translucent board 443A and a polarization film 443B (see FIG. 8) as an optical conversion film. The irradiation-side polarization plate 443 transmits only the light beam having the polarization axis orthogonal to the transmission axis of the light beam in the incident-side polarization plate 442 contained in the light beam irradiated from the liquid crystal panel 441, and absorbs the other light beams.

The cross dichroic prism 444 is an optical element for combining the optical image irradiated from the irradiation-side polarization plate 443 and modulated for each color light to form a color image. The cross dichroic prism 444 has a square shape in plan view with four right-angle prisms attached with each other. On surfaces on which the right-angle prisms are attached with each other, two dielectric multi-layered films are formed. The dielectric multi-layered films reflect the color lights irradiated from the liquid crystal panels 441R and 441B and transmitted through the irradiation-side polarization plate 443, but transmit the color light irradiated from the liquid crystal panel 441G and transmitted through the irradiation-side polarization plate 443. In this way, the color lights respectively modulated by the liquid crystal panels 441R, 441G and 441B are combined to form a color image.

Figure 2:
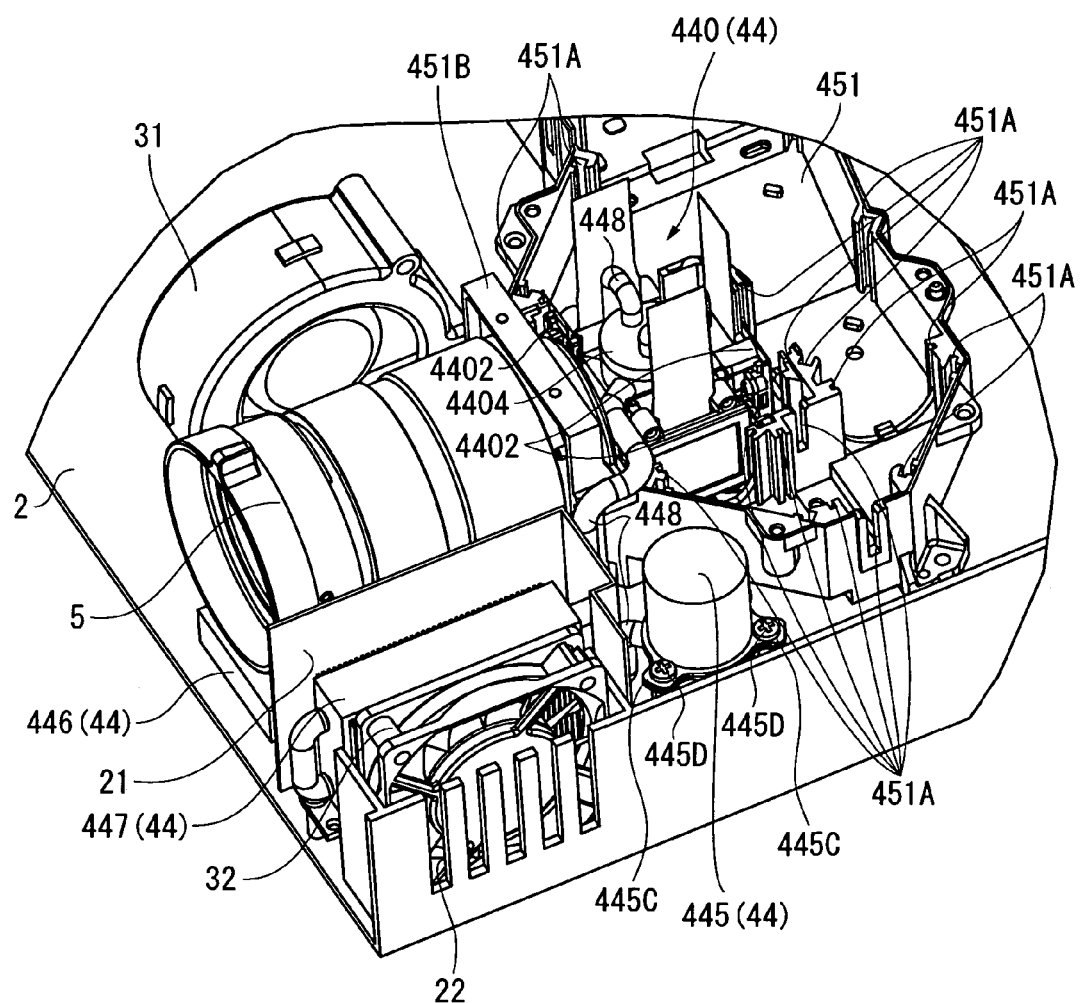
FIG. 2 is a perspective view of a part inside the projector seen from the upper side according to a first embodiment.

FIG. 2 is a perspective view of a part inside the projector 1 seen from the upper side. As for the optical components in the optical component casing 45, only a later-described optical device body of the optical device 44 is illustrated in FIG. 2, while other components 41 to 43 are omitted.

Figure 3:
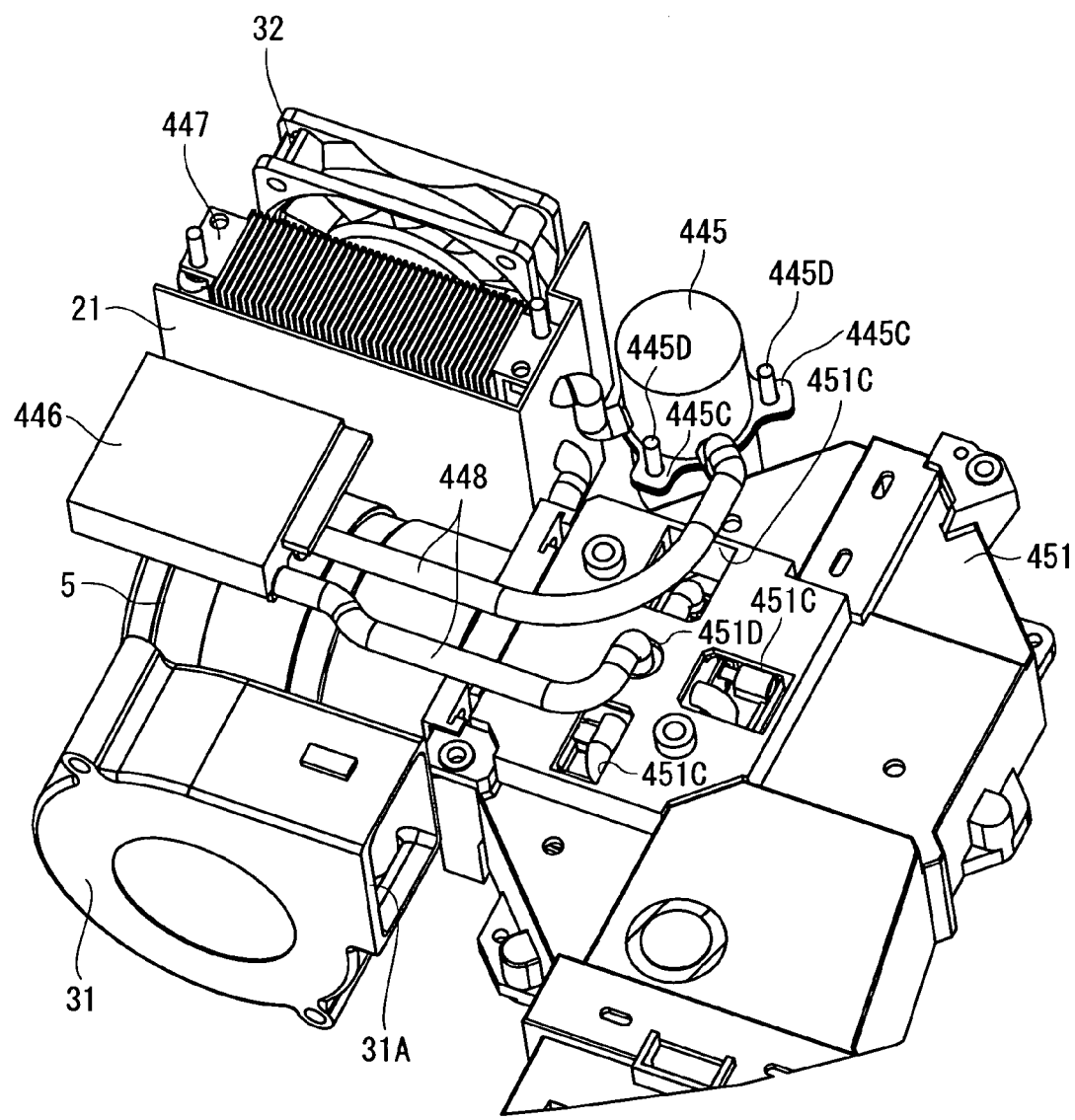
FIG. 3 is a perspective view of a part inside the projector seen from the lower side according to the aforesaid embodiment.

FIG. 3 is a perspective view of a part inside the projector 1 seen from the lower side.

Referring to FIG. 1, the optical component casing 45 constructed of, for example, metal members, has a predetermined illumination optical axis A therein, and accommodates the above-described optical components 41 to 43 and the later-described optical device body of the optical device 44 at the predetermined position with respect to the illumination optical axis A. The optical component casing 45 may be constructed of other materials, preferably heat-conductive materials, without limiting to the metal members. The optical component casing 45, as shown in FIG. 2, includes a container-like component housing member 451 for accommodating the optical components 41 to 43 and the later-described optical device body of the optical device 44 therein, and a not-shown lid member for covering the open part of the component housing member 451.

The component housing member 451 defines each of the bottom face, the side face and the rear face of the optical component casing 45.

In the component housing member 451, as shown in FIG. 2, grooves 451A are formed on the inner face of the side face so that the above-described optical components 412 to 415, 418, 421 to 423 and 431 to 434 are slidably fitted thereto.

Further, as shown in FIG. 2, a projection lens installed portion 451B is formed at the front part of the side face so that the projection lens 5 is installed at a predetermined position with respect to the optical unit 4. The projection lens installed portion 451B has a substantially rectangular shape in plan view, at the center of which in plan view a not-shown circular hole is formed corresponding to a light beam irradiation position from the optical device 44 so that the projection lens 5 projects the color image formed by the optical unit 4 in an enlarged manner through the hole.

Further, in the component housing member 451, as shown in FIG. 3, three holes 451C corresponding to the position of the liquid crystal panels 441 of the optical device 44, and a hole 451D corresponding to a cooling fluid inlet of the later-described fluid splitter of the optical device 44 are formed on the bottom face. The cooling air introduced from the outside of the projector 1 to the inside thereof by the sirocco fan 31 of the cooling unit 3 is discharged from a discharge port 31A (FIG. 3) of the sirocco fan 31, and then guided by the holes 451C through a not-shown duct.

[Structure of Optical Device]

The optical device 44, as shown in FIGS. 2 and 3, includes the optical device body 440 (FIG. 2) integrally having the liquid crystal panels 441, the incident-side polarization plates 442, the irradiation-side polarization plates 443 and the cross dichroic prism 444, the main tank 445, the fluid feeder 446, the radiator 447, and the plurality of fluid circulators 448.

The plurality of fluid circulator 448 is constructed of aluminum pipe members allowing the cooling air to convect therein, and connects the members 440, 445 to 447 in a manner allowing the circulation of the cooling fluid. The circulating cooling fluid cools the heat generated in the liquid crystal panels 441, the incident-side polarization plates 442 and the irradiation-side polarization plates 443 of the optical device body 440.

The cooling fluid used in the present embodiment is ethylene glycol, which is transparent nonvolatile fluid. However, without limiting to ethylene glycol, other fluid may be used as the cooling fluid.

In the following description, the members 440, 445 to 447 are respectively explained from the upstream relative to the liquid crystal panels 441 along the flow channel of the circulating cooling fluid.

Figure 4A:
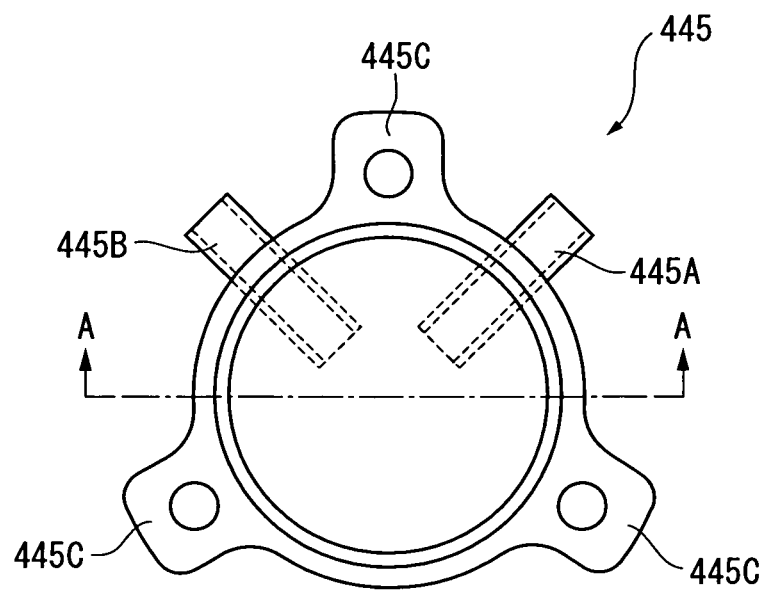
FIGS. 4A and 4B are illustrations each showing the structure of a main tank according to the aforesaid embodiment.
Figure 4B:
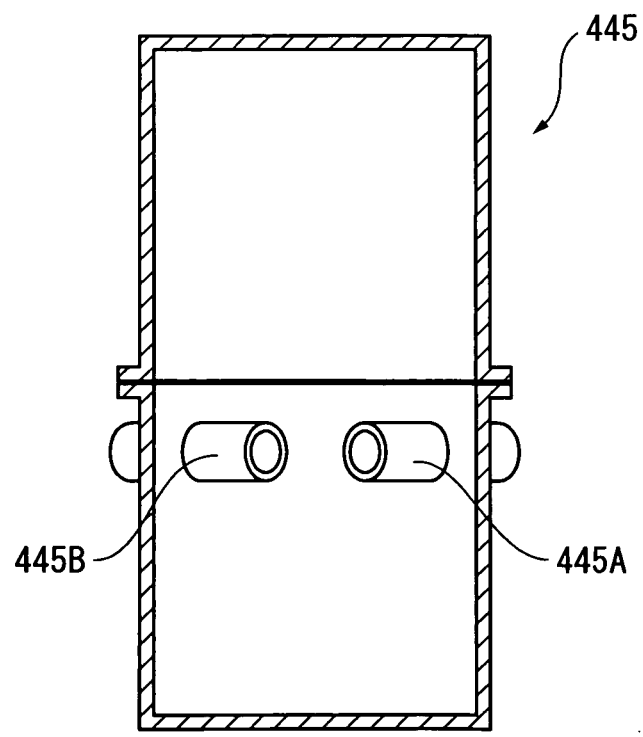

FIGS. 4A and 4B are illustrations each showing the structure of the main tank 445. Specifically, FIG. 4A is a plan view of the main tank 445 seen from the upper side. FIG. 4B is a cross section taken along a line A—A in FIG. 4A.

The substantially columnar main tank 445 is constructed of two aluminum container members, of which respective open parts are connected with each other so as to temporarily store the cooling fluid therein. The container members are connected by, for instance, the seal welding or by an elastic member such as rubber interposed therebetween.

In the main tank 445, as shown in FIG. 4B, a cooling fluid inlet 445A through which the cooling fluid flows to the inside and a cooling fluid outlet 445B through which the cooling fluid flows from the inside to the outside are formed at the approximate center in the column axis direction.

Each of the cooling fluid inlet 445A and the cooling fluid outlet 445B is constructed of a substantially tubular member with the tube diameter thereof smaller than that of the fluid circulator 448, and is arranged to project to both the inner and outer sides of the main tank 445. A first end of the fluid circulator 448 is connected to an outwardly-projecting end of the cooling fluid inlet 445A, so that the cooling fluid flows from the outside into the main tank 445 through the fluid circulator 448. Also, an end of another fluid circulator 448 is connected to an outwardly-projecting end of the cooling fluid outlet 445B, so that the cooling fluid in the main tank 445 flows out through the fluid circulator 448.

Inwardly-projecting ends of the cooling fluid inlet 445A and the cooling fluid outlet 445B extend toward the column axis of the main tank 445 so that they are substantially orthogonal to each other in plan view as shown in FIG. 4A. Since the cooling fluid inlet 445A and the cooling fluid outlet 445B are substantially orthogonal to each other in plan view, the cooling fluid flown into the main tank 445 through the cooling fluid inlet 445A will not immediately flow to the outside through the cooling fluid outlet 445B. Therefore, The cooling fluid flown to the inside is therefore mixed with the cooling fluid inside the main tank 445, and thus equalizing the temperature of the cooling fluid.

As shown in FIG. 4A, on the outer circumference of the main tank 445, three fixing portions 445C are respectively formed on the two container members at the center in the column axis direction. Screws 445D (FIGS. 2 and 3) are inserted in the fixing portions 445C and screwed in the bottom face of the exterior case 2. Therefore, the two container members are tightly connected to each other, and the main tank 445 is fixed to the exterior case 2.

As shown in FIG. 1 or 2, the main tank 445 is arranged in a triangle area in plan view surrounded by the optical component casing 45 and the inner face of the exterior case 2. Arranging the main tank 445 in this area improves the accommodating efficiency of the inside of the exterior case 2 and avoids the size increase of the projector 1.

The fluid feeder 446 takes in the cooling fluid stored in the main tank 445, and forcibly sends the taken-in cooling fluid to the outside. Therefore, as shown in FIG. 3, the fluid feeder 446 is communicated with and connected to a second end of the fluid circulator 448 connected to the cooling fluid outlet 445B of the main tank 445, and also communicated with and connected to a first end of still another fluid circulator 448 for sending the cooling fluid to the outside.

Although not specifically shown, the fluid feeder 446 is constructed of, for example, a substantially rectangular solid aluminum hollow member with an impeller arranged therein. Under the control of the not-shown control device, the impeller is rotated, so that the fluid feeder 446 forcibly takes in the cooling fluid stored in the main tank 445 through the fluid circulator 448 and forcibly sends out the taken-in cooling fluid to the outside through the fluid circulator 448. Since this configuration allows the reduction of the thickness of the impeller in the rotary shaft direction, the fluid feeder 446 can be arranged in an available space inside the projector 1, thereby improving the accommodating efficiency of the inside of the projector 1 and avoiding the size increase of the projector 1. In the present embodiment, as shown in FIG. 2 or 3, the fluid feeder 446 is arranged under the projection lens 5.

Figure 5:
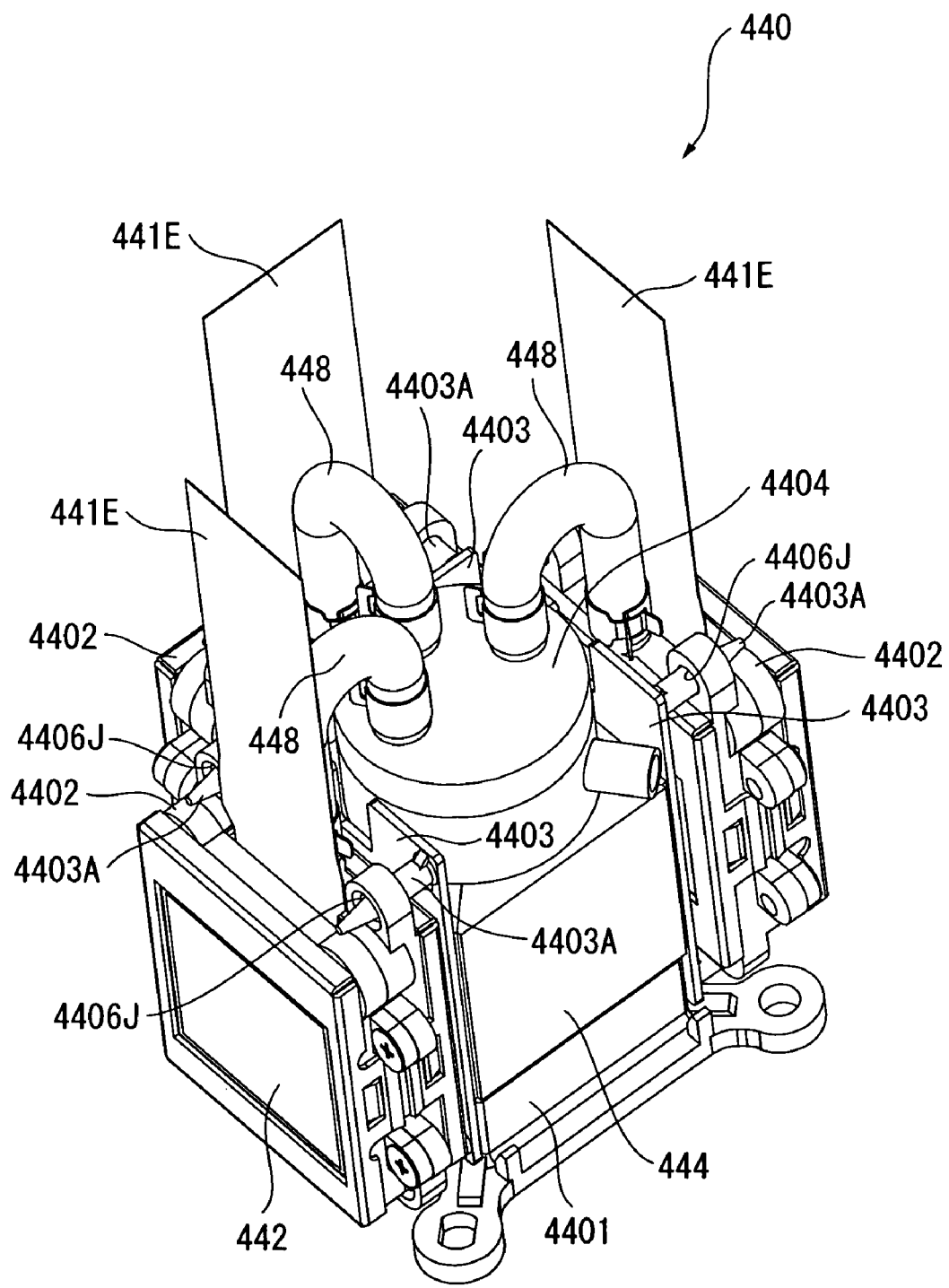
FIG. 5 is a schematic illustration showing the structure of an optical device body according to the aforesaid embodiment.
Figure 6:
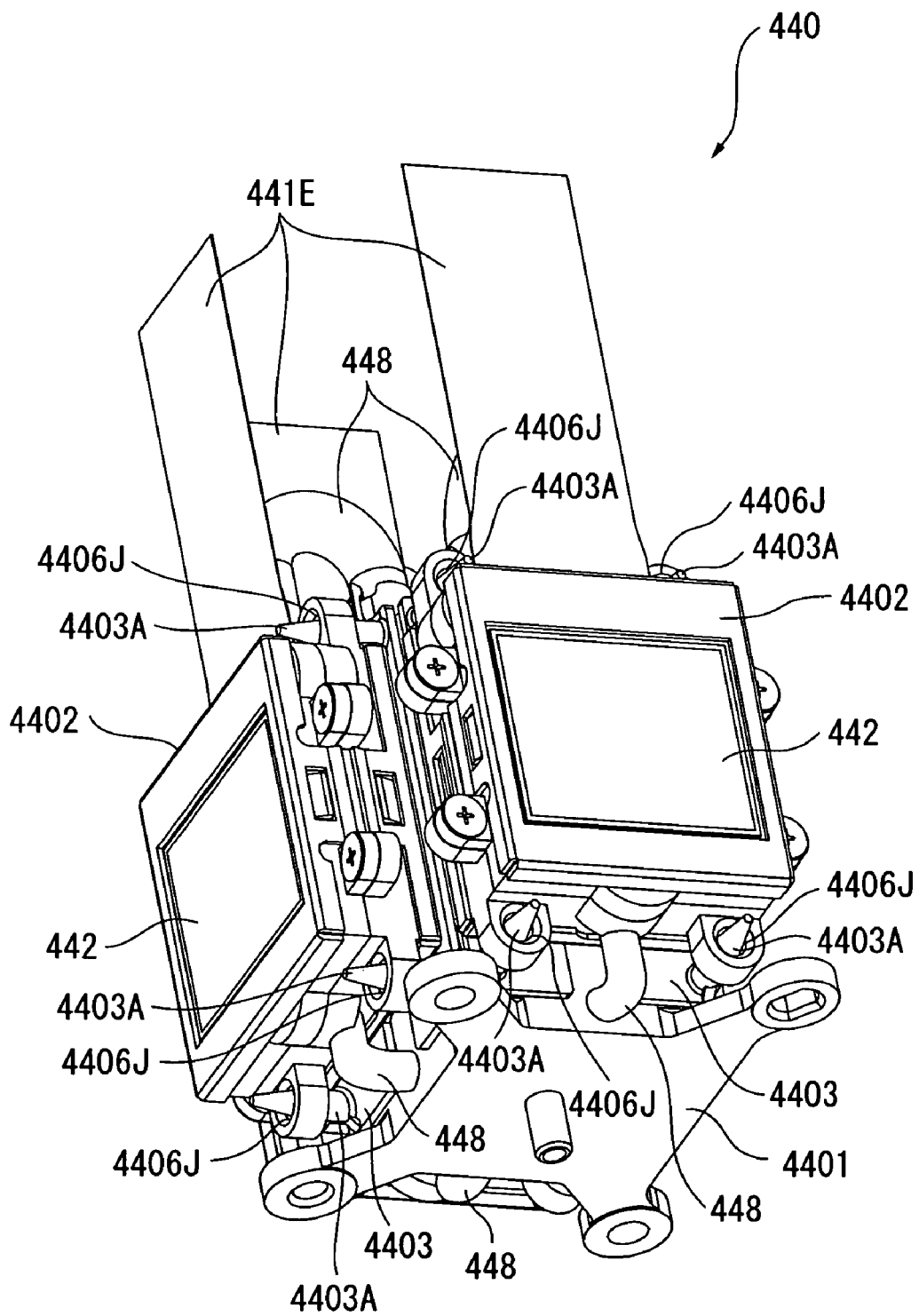
FIG. 6 is a schematic illustration showing the structure of the optical device body according to the aforesaid embodiment.

FIGS. 5 and 6 are schematic illustrations each showing the structure of the optical device body 440. Specifically, FIG. 5 is a perspective view of the optical device body 440 seen from the upper side. FIG. 6 is a perspective view of the optical device body 440 seen from the lower side.

As shown in FIGS. 5 and 6, the optical device body 440 includes the fluid splitter 4401, the three optical modulator holders 4402 and three support members 4403 and the relay tank 4404 (FIG. 5), in addition to the three liquid crystal panels 441, the three incident-side polarization plates 442, the three irradiation-side polarization plates 443 and the cross dichroic prism 444.

Figure 7A:
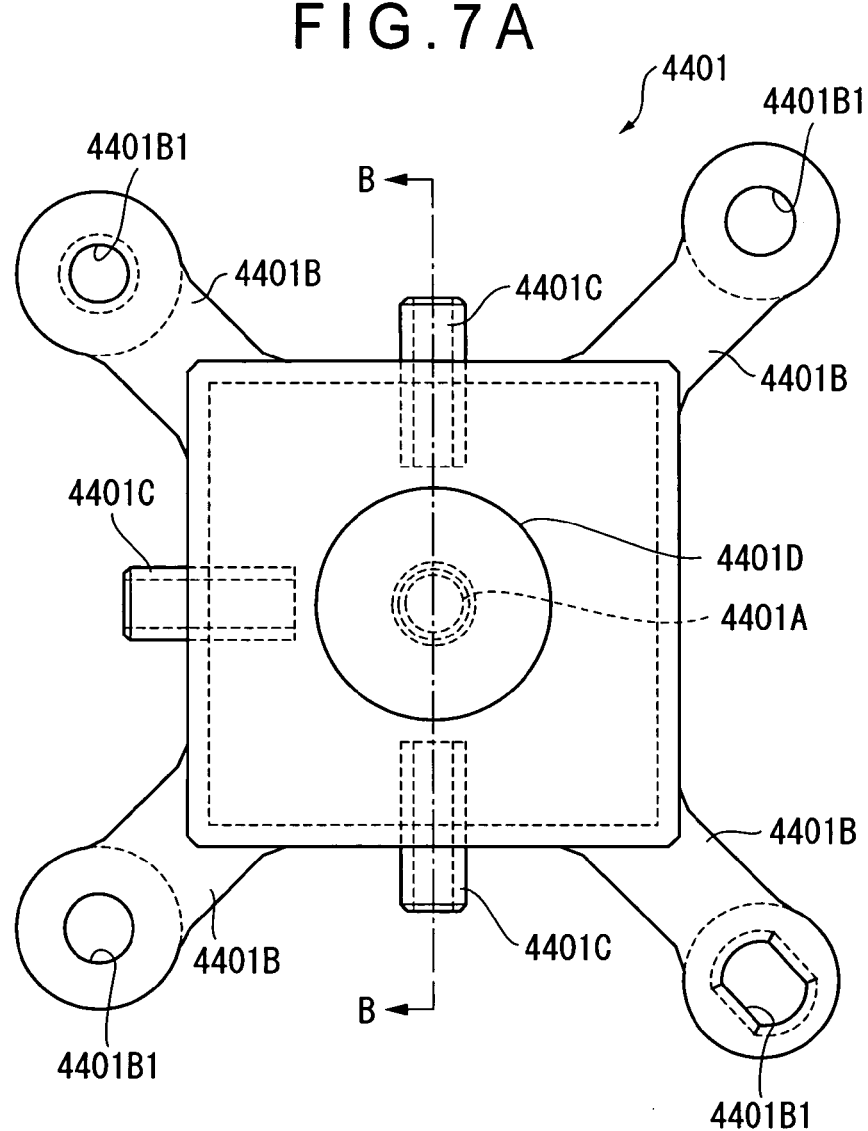
FIGS. 7A and 7B are illustrations each showing the structure of a fluid splitter according to the aforesaid embodiment.
Figure 7B:
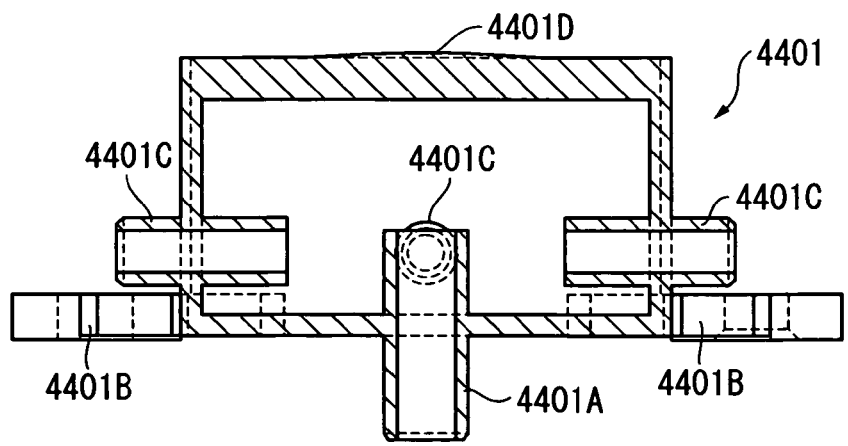

FIGS. 7A and 7B are illustrations each showing the structure of the fluid splitter 4401. Specifically, FIG. 7A is a plan view of the fluid splitter 4401 seen from the upper side. FIG. 7B is a cross section taken along a line B—B in FIG. 7A.

The fluid splitter 4401 constructed of a substantially rectangular solid aluminum hollow member takes in the cooling fluid forcibly sent out of the fluid feeder 446, and splits and sends out the taken-in cooling fluid to each of the three optical modulator holders 4402. The fluid splitter 4401 also serves as a prism fixing plate for supporting the cross dichroic prism 444, since it is fixed to a bottom face (i.e., an end face orthogonal to three light-incident end faces) of the cross dichroic prism 444.

In the fluid splitter 4401, as shown in FIG. 7B, a cooling fluid inlet 4401A from which the cooling fluid sent out of the fluid feeder 446 flows to the inside is formed at the approximate center on the bottom face. Like the cooling fluid inlet 445A of the main tank 445, the cooling fluid inlet 4401A is constructed of a substantially tubular member with the tube diameter thereof smaller than that of the fluid circulator 448, and is arranged to project to both the inner and outer sides of the fluid splitter 4401. A second end of the fluid circulator 448 communicated with and connected to the fluid feeder 446 is connected to an outwardly-projecting end of the cooling fluid inlet 4401A, so that the cooling fluid sent out of the fluid feeder 446 through the fluid circulator 448 flows into the fluid splitter 4401.

Arms 4401B extending along the bottom face are respectively formed at the four corners of the bottom face as shown in FIG. 7A. Holes 4401B1 are respectively formed on the tip of the arms 4401B, so that not-show screws are inserted in the holes 4401B1 and screwed in the component housing member 451 of the optical component casing 45. The optical device body 440 is thus fixed to the component housing member 451. The fluid splitter 4401 and the optical component casing 45 are thereby connected in a heat conductive manner. Accordingly, since the fluid splitter 4401 is connected to the optical component casing 45 in a heat conductive manner, a heat conduction path from the circulating cooling fluid to the fluid splitter 4401 to the optical component casing 45 is established, thereby improving the cooling efficiency of the cooling fluid and, consequently, improving the cooling efficiency of the liquid crystal panels 441, the incident-side polarization plates 442 and the irradiation-side polarization plates 443. Further, by sending air from the sirocco fan 31 along the bottom face of the optical component casing 45, the heat-radiation area of the circulating cooling fluid can be increased, and thus improving the cooling efficiency.

Further, in the fluid splitter 4401, as shown in FIG. 7A, cooling fluid outlets 4401C are formed at three side faces corresponding to the light-incident end faces of the cross dichroic prism 444 so as to split and send out the taken-in cooling fluid to each of the three optical modulator holders 4402.

Like the cooling fluid inlet 4401A, each of the cooling fluid outlets 4401C is constructed of a substantially tubular member with the tube diameter thereof smaller than that of the fluid circulator 448, and is arranged to project to both the inner and outer sides of the fluid splitter 4401. Also, first ends of still other fluid circulators 448 are respectively connected to outwardly-projecting ends of the cooling fluid outlets 4401C, so that the cooling fluid in the fluid splitter 4401 is split and flown out through the fluid circulators 448.

Further, in the fluid splitter 4401, as shown in FIGS. 7A and 7B, a spherical bulging portion 4401D is formed at the approximate center on the upper face. By keeping the lower face of the cross dichroic prism 444 in contact with the bulging portion 4401D, the tilt of the cross dichroic prism 444 relative to the fluid splitter 4401 can be adjusted.

Figure 8:
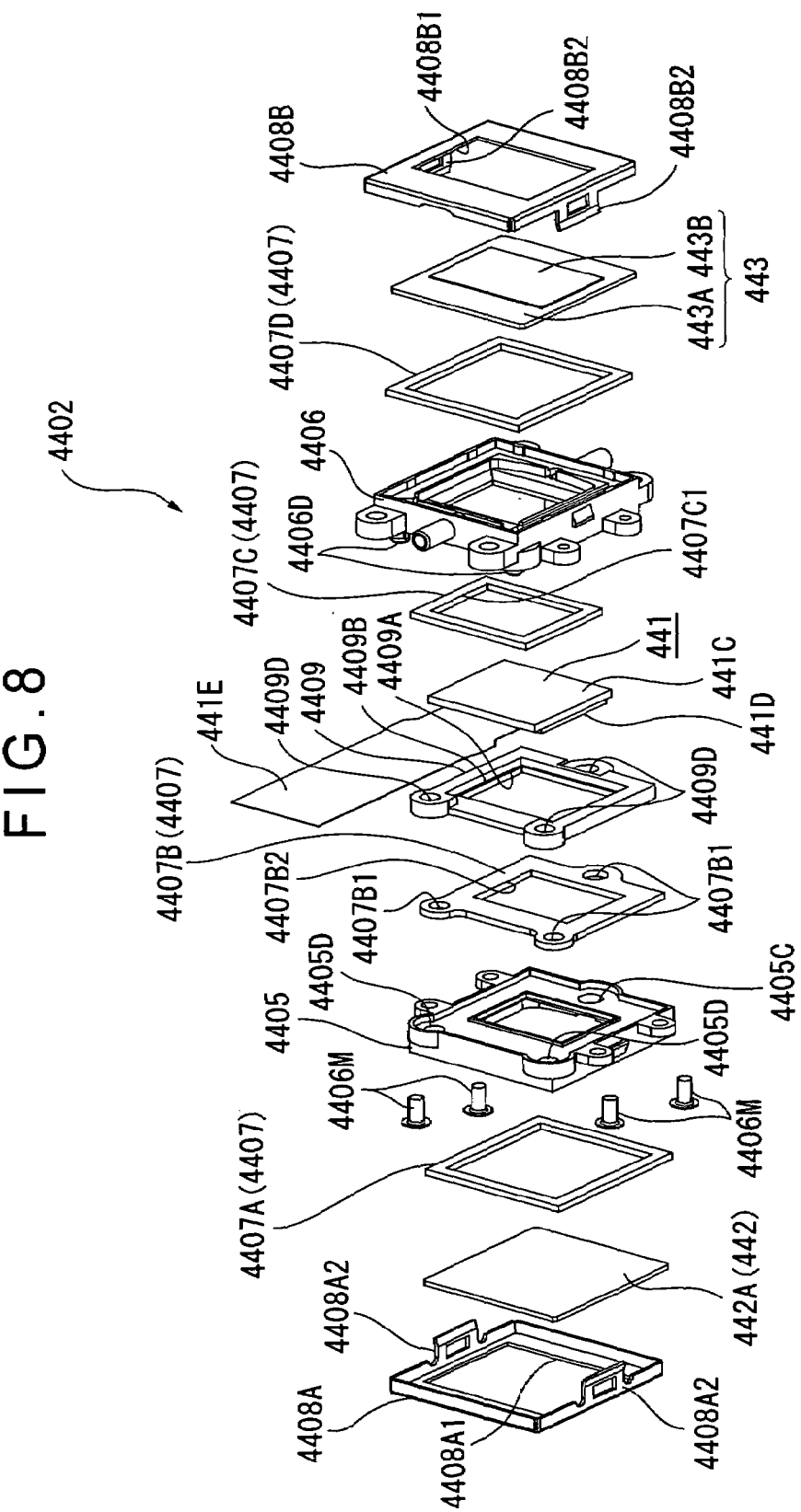
FIG. 8 is a schematic exploded perspective view showing the structure of an optical modulator holder according to the aforesaid embodiment.

FIG. 8 is a schematic exploded perspective view showing the structure of the optical modulator holder 4402.

The three optical modulator holders 4402 respectively hold the three liquid crystal panels 441, the three incident-side polarization plates 442 and the three irradiation-side polarization plates 443. Also, the optical modulator holders 4402, where the cooling fluid flows in and out, respectively cool the three liquid crystal panels 441, the three incident-side polarization plates 442 and the three irradiation-side polarization plates 443 by the cooling fluid. Since the optical modulator holders 4402 have the same structure, only one of the optical modulator holders 4402 will be depicted in the following description.

As shown in FIG. 8, the optical modulator holder 4402 includes a pair of frame members 4405 and 4406, four elastic members 4407, a pair of polarization plate fixers 4408A and 4408B and a middle frame 4409 as a support frame.

Figure 9A:
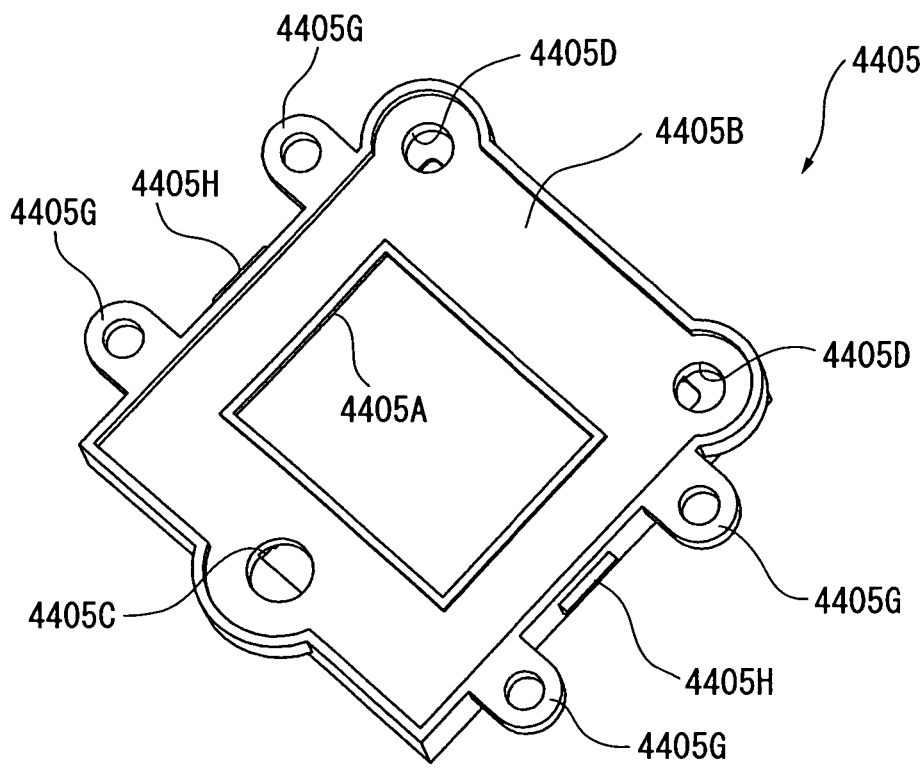
FIGS. 9A and 9B are schematic illustrations each showing the structure of a frame member according to the aforesaid embodiment.
Figure 9B:
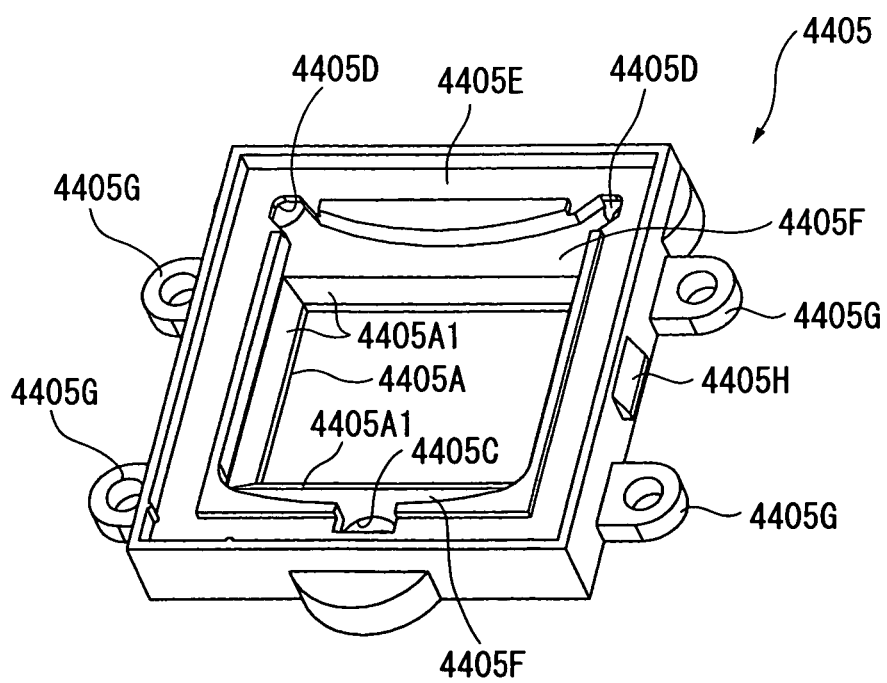

FIGS. 9A and 9B are schematic illustrations each showing the structure of the frame member 4405. Specifically, FIG. 9A is a perspective view of the frame member 4405 seen from the light-irradiation side. FIG. 9B is a perspective view of the frame member 4405 seen from the light-incident side.

The frame member 4405 is an aluminum frame with a rectangular shape in plan view having, at the substantial centre thereof, a rectangular opening 4405A corresponding to an image formation area of the liquid crystal panel 441. The frame member 4405 is arranged at the light-incident side with respect to the frame member 4406 to support the light-incident side of the liquid crystal panel 441 and support the light-irradiation side of the incident-side polarization plate 442.

In the frame member 4405, as shown in FIG. 9A, a recess 4405B having the shape corresponding to the shape of a later-described second elastic member of the elastic member 4407 is formed on the light-irradiation end face, so that the recess 4405B supports the light-incident end face of the liquid crystal panel 441 through the second elastic member and the middle frame 4409. Since the frame member 4405 supports the light-incident end face of the liquid crystal panel 441, the light-irradiation side of the opening 4405A is covered by the second elastic member, the middle frame 4409 and the light-incident end face of the liquid crystal panel 441.

In the recess 4405B, as shown in FIGS. 9A and 9B, three insert holes 4405C and 4405D as projection insertion holes penetrating the light-irradiation end face and the light-incident end face are formed at the upper corners and the lower horizontal approximate center so that later-described tubular portions of the frame member 4406 can be inserted therein.

Further, in the frame member 4405, as shown in FIG. 9B, a recess 4405E with a shape of rectangular frame corresponding to the shape of a later-described first elastic member of the elastic member 4407 is formed on the light-incident end face, so that the incident-side polarization plate 442 is supported by the recess 4405E through the first elastic member. Since the frame member 4405 supports the light-irradiation end face of the incident-side polarization plate 442, the light-incident side of the opening 4405A is covered by the first elastic member and the light-irradiation end face of the incident-side polarization plate 442.

The opening 4405A, as shown in FIG. 9B, is chamfered at the corners on the light-incident side and provided with a slanted face 4405A1 so that the opening area is enlarged from the light-irradiation end face to the light-incident end face.

On the light-incident end face, as shown in FIG. 9B, recesses 4405F having greater depth than the recess 4405E are formed at the upper and lower end edges of the opening 4405A to respectively connect to the three insert holes 4405C and 4405D.

As for the recesses 4405F, an upper lateral wall of the recess 4405F positioned at the upper side is so curved that the horizontal approximate center thereof is projected to the lower side. Likewise, a lower lateral wall of the recess 4405F is so curved that the horizontal approximate center thereof is dented to the lower side.

The light-incident side and the light-irradiation side of the opening 4405A are thus covered by the liquid crystal panel 441 and the incident-side polarization plate 442, so that a cooling chamber R1 (see FIG. 14 or 15) for sealing the cooling fluid therein is formed inside the frame member 4405 (in the opening 4405A, and a clearance between the recesses 4405F and the incident-side polarization plate 442).

Further, in the frame member 4405, as shown in FIGS. 9A and 9B, connecting portions 4405G for the connection with the frame member 4406 are formed at the left end corners and the right end corners.

Further, in the frame member 4405, as shown in FIGS. 9A and 9B, hooks 4405H for the engagement with the polarization plate fixer 4408A are formed at the left end approximate center and the right end approximate center.

Figure 10A:
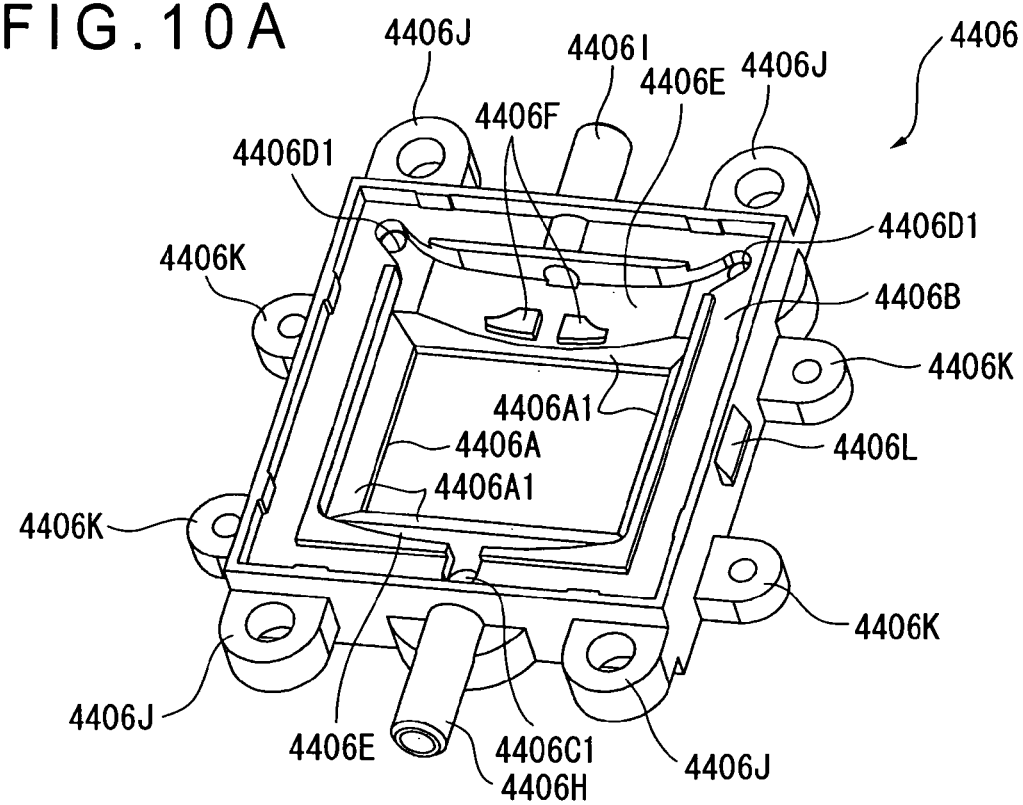
FIGS. 10A and 10B are schematic illustrations each showing the structure of another frame member according to the aforesaid embodiment.
Figure 10B:
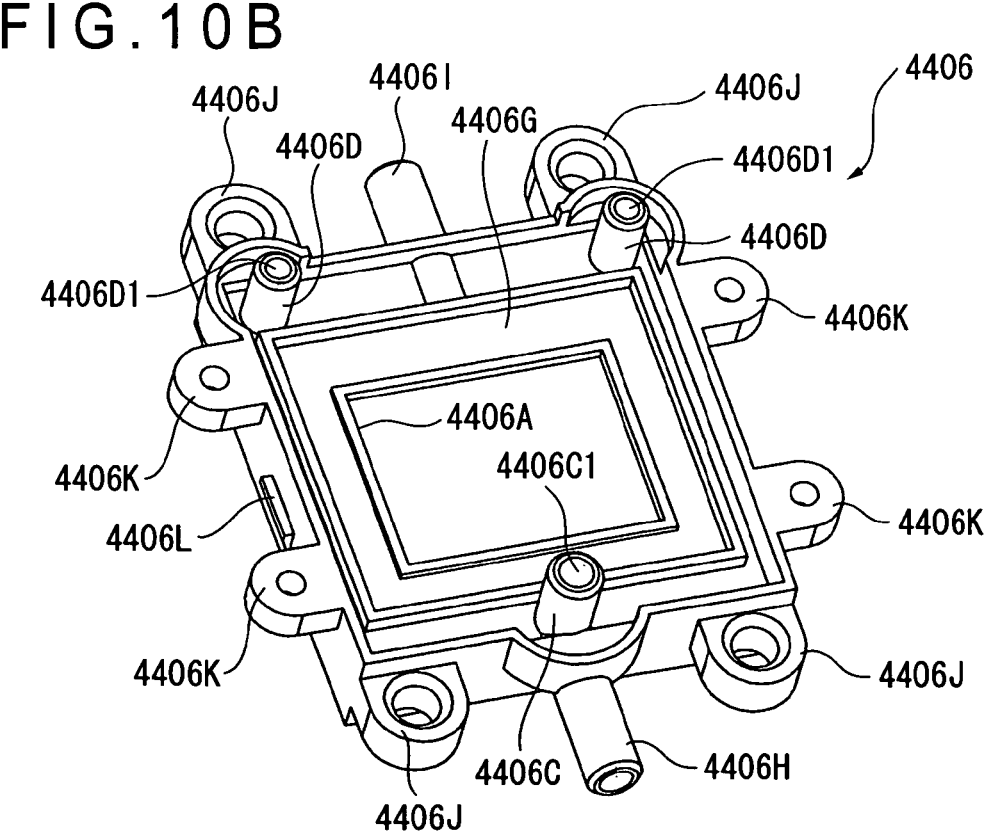

FIGS. 10A and 10B are schematic illustrations each showing the structure of the frame member 4406. Specifically, FIG. 10A is a perspective view of the frame member 4406 seen from the light-irradiation side. FIG. 10B is a perspective view of the frame member 4406 seen from the light-incident side.

Like the above-described frame member 4405, the frame member 4406 is an aluminum frame with a rectangular shape in plan view having, at the substantial centre thereof, a rectangular opening 4406A corresponding to the image formation area of the liquid crystal panel 441. The frame member 4406 and the above-described frame member 4405 sandwich the liquid crystal panel 441 therebetween through the elastic members 4407 and the middle frame 4409. The frame member 4406 also supports the irradiation-side polarization plate 443 on the face opposite to the face opposing to the frame member 4405 through the elastic member 4407.

In the frame member 4406, as shown in FIG. 10A, a recess 4406B with a shape of rectangular frame corresponding to the shape of a later-described fourth elastic member of the elastic member 4407 is formed on the light-irradiation end face, so that the irradiation-side polarization plate 443 is supported by the recess 4406B through the fourth elastic member. Since the frame member 4406 supports the light-incident end face of the irradiation-side polarization plate 443, the light-irradiation side of the opening 4406A is covered by the fourth elastic member and the light-incident end face of the irradiation-side polarization plate 443.

In the recess 4406B, as shown in FIG. 10A or 10B, the three tubular portions 4406C and 4406D as projections projecting substantially orthogonally from the light-incident end face are formed at the upper corners and the lower horizontal center. They are corresponding to the three insert holes 4405C and 4405D of the above-described frame member 4405 and have holes 4406C1 and 4406D1 penetrating the light-irradiation end face and the light-incident end face. When the frame member 4406 and the frame member 4405 are assembled, the tubular portions 4406C and 4406D of the frame member 4406 are respectively inserted in the insert holes 4405C and 4405D of the frame member 4405, thus allowing the cooling fluid to flow at the light-irradiation side of the frame member 4406 and the light-incident side of the frame member 4405 through the holes 4406C1 and 4406D1 of the tubular portions 4406C and 4406D and the insert holes 4405C and 4405D.

The inside diameter of the tubular portions 4406C and 4406D is preferably, for example, 1 mm to 5 mm, and more preferably 2 mm to 3 mm. The inside cross-sectional area of the tubular portion 4406C is preferably about equal to the sum of the inside cross-sectional areas of the two tubular portions 4406D. The insert holes 4405C and 4405D may have the inside diameter such that the tubular portions 4406C and 4406D can be respectively fitted therein. In such configuration, the flow channel resistance of the cooling fluid flowing through the tubular portion 4406C and the insert hole 4405C is about equal to that through the tubular portions 4406D and the insert holes 4405D, thereby allowing the smooth flow of the cooling fluid.

Without limiting to the configuration in which the inside cross-sectional area of the tubular portion 4406C is about equal to the sum of the inside cross-sectional areas of the two tubular portions 4406D, a configuration in which the inside cross-sectional areas are different is applicable.

The tubular portion 4406C is communicated with and connected to a later-described inlet port to be substantially orthogonal thereto. A part of the inner face of the tubular portion 4406C extends to cross with a center axis of the inlet port, and a projection 4406C2 (see FIG. 14 or 15) is formed at this part of the inner face so that the cooling fluid flown in through the inlet port is split to the light-incident side of the frame member 4405 (the cooling chamber R1 (see FIG. 14 or 15)) and the light-irradiation side of the frame member 4406 (a later-described cooling chamber R2 (see FIG. 14 or 15)).

The projection 4406C2 (see FIG. 14 or 15) with a substantial triangular prism shape is so formed that the axial direction thereof is parallel to the light-incident end face and the light-irradiation end face of the frame member 4406. That is, one side face out of three side faces of the triangular prism is connected to an inner wall of the tubular portion 4406C, while the other two side faces are respectively facing the light-incident side and the light irradiation side. With this projection 4406C2 (see FIG. 14 or 15), the cooling fluid flown in through the later-described inlet port is guided by the two side faces and split to the light-incident side of the frame member 4405 (the cooling chamber R1 (see FIG. 14 or 15)) and the light-irradiation side of the frame member 4406 (the later-described cooling chamber R2 (see FIG. 14 or 15)).

The projection 4406C2 (see FIG. 14 or 15) may be formed at a position corresponding to the heat value of the liquid crystal panel 441, the incident-side polarization plate 442 and the irradiation-side polarization plate 443, which are objects to be cooled, without limiting to the position crossed with the center axis of the inlet port. For example, if the heat value of the opposing board 441D of the liquid crystal panel 441 and the incident-side polarization plate 442 is higher than that of the drive board 441C of the liquid crystal panel 441 and the irradiation-side polarization plate 443, the projection 4406C2 (see FIG. 14 or FIG. 15) may be formed at a position shifted from the position crossed with the center axis of the inlet port to the light-irradiation side by a predetermined distance. Otherwise, if the heat value of the drive board 441C of the liquid crystal panel 441 and the irradiation-side polarization plate 443 is higher than that of the opposing board 441D of the liquid crystal panel 441 and the incident-side polarization plate 442, the projection 4406C2 (see FIG. 14 or FIG. 15) may be formed at a position shifted from the position crossed with the center axis of the inlet port to the light-incident side by a predetermined distance.

The projection 4406C2 (see FIG. 14 or 15) may have any shape without limiting to the substantial triangular prism, as long as the cooling fluid flown in from the inlet port can be split to the light-incident side and the light-irradiation side. For example, the two side faces may be dented inward such that the side faces have a substantially concave shape in cross section, or the two side faces may be bulged outward such that the projection has a substantially semispherical shape in cross section.

Like the opening 4405A of the frame member 4405, the opening 4406A, as shown in FIG. 10A, is chamfered at the corners on the light-irradiation side and provided with a slanted face 4406A1 so that the opening area is enlarged from the light-incident end face to the light-irradiation end face.

On the light-irradiation end face, as shown in FIG. 10A, recesses 4406E having greater depth than the recess 4406B are formed at the upper and lower end edges of the opening 4406A to respectively connect to the holes 4406C1 and 4406D1 of the tubular portions 4406C and 4406D.

As for the recesses 4406E, the recess 4406E positioned at the upper side is so curved that the horizontal approximate center thereof is dented to the light-incident side. At the horizontal approximate center of the recess 4406E, two flow straighteners 4406F are mounted to straighten the flow of the cooling fluid.

The flow straighteners 4406F with a substantial quadratic prism shape are arranged with a predetermined interval, and the corners opposing to the holes 4406D1 of the two tubular portions 4406D are so curved to be inwardly dented.

Further, in the frame member 4406, as shown in FIG. 10B, a recess 4406G with a shape of rectangular frame corresponding to the shape of a later-described third elastic member of the elastic member 4407 is formed on the light-incident end face, so that the light-irradiation end face of the liquid crystal panel 441 is supported by the recess 4406G through the third elastic member. Since the frame member 4406 supports the light-irradiation end face of the liquid crystal panel 441, the light-incident side of the opening 4406A is covered by the third elastic member and the light-irradiation end face of the liquid crystal panel 441.

The light-incident side and the light-irradiation side of the opening 4406A are thus covered by the liquid crystal panel 441 and the irradiation-side polarization plate 443, so that the cooling chamber R2 (see FIG. 14 or 15) for sealing the cooling fluid therein is formed inside the frame member 4406 (in the opening 4406A, and a clearance between the recesses 4406E and the irradiation-side polarization plate 443).

Further, in the frame member 4406, as shown in FIGS. 10A and 10B, the inlet port 4406H from which the cooling fluid flown out of the cooling fluid outlet 4401C flows to the inside is formed at the lower end approximate center. The inlet port 4406H is constructed of a substantially tubular member with the tube diameter thereof smaller than that of the fluid circulator 448, and is arranged to project to the outer side of the frame member 4406. A second end of the fluid circulator 448 connected to the cooling fluid outlet 4401C of the fluid splitter 4401 is connected to a projecting end of the inlet port 4406H, so that the cooling fluid flown out of the fluid splitter 4401 through the fluid circulator 448 flows into the cooling chamber R1 (see FIG. 14 or 15) and the cooling chamber R2 (see FIG. 14 or 15).

Further, in the frame member 4406, as shown in FIGS. 10A and 10B, an outlet port 4406I from which the cooling fluid in the cooling chamber R1 (see FIG. 14 or 15) and the cooling chamber R2 (see FIG. 14 or 15) flows to the outside is formed at the upper end approximate center. That is, the outlet port 4406I is formed at a position opposing to the inlet port 4406H. Like the inlet port 4406H, the outlet port 4406I is constructed of a substantially tubular member with the tube diameter thereof smaller than that of the fluid circulator 448, and is arranged to project to the outer side of the frame member 4406. Still another fluid circulator 448 is connected to a projecting end of the outlet port 4406I, so that the cooling fluid flown in the cooling chamber R2 (see FIG. 14 or 15) through the inlet port 4406H and the cooling fluid flown in through the inlet port 4406H, split by the projection 4406C2 of the tubular portion 4406C, flown into the cooling chamber R1 (see FIG. 14 or 15), and then flown out of cooling chamber R1 (see FIG. 14 or 15) into the cooling chamber R2 (see FIG. 14 or 15) through the tubular portions 4406D and the insert holes 4405D flow to the outside through the fluid circulator 448.

In the present embodiment, the inside cross-sectional area of the inlet port 4406H and the outlet port 4406I is about equal to the inside cross-sectional area of the tubular portion 4406C or the sum of the inside cross-sectional areas of the two tubular portions 4406D. In such configuration, the flow channel resistance of the cooling fluid in the optical modulator holder 4402 is about equal, thereby increasing the convection speed of the cooling fluid.

Without limiting to the configuration in which the inside cross-sectional area of the inlet port 4406H and the outlet port 4406I is about equal to the inside cross-sectional area of the tubular portion 4406C or the sum of the inside cross-sectional areas of the two tubular portions 4406D, a configuration in which the inside cross-sectional areas are different is applicable.

Further, in the frame member 4406, as shown in FIGS. 10A and 10B, four insert portions 4406J are formed at the upper corners and the lower corners so that later-described pin members of the support member 4403 can be inserted therein.

Further, in the frame member 4406, as shown in FIGS. 10A and 10B, connecting portions 4406K for the connection with the frame member 4405 are formed at the left end corners and the right end corners. Screws 4406M (FIG. 8) are screwed in the respective connecting portions 4405G and 4406K of the frame members 4405 and 4406, so that the liquid crystal panel 441 is sandwiched between the frame members 4405 and 4406 through the middle frame 4409 and the later-described second elastic member and third elastic member of the elastic members 4407, and thus the opposing faces of the openings 4405A and 4406A of the frame members 4405 and 4406 are sealed.

Further, in the frame member 4406, as shown in FIGS. 10A and 10B, hooks 4406L for the engagement with a polarization plate fixer 4408B are formed at the left end approximate center and the right end approximate center.

As shown in FIG. 8, the elastic members 4407 include the first elastic member 4407A interposed between the incident-side polarization plate 442 and the frame member 4405, the second elastic member 4407B interposed between the frame member 4405 and the liquid crystal panel 441, the third elastic member 4407C interposed between the liquid crystal panel 441 and the frame member 4406, and the fourth elastic member 4407D interposed between the frame member 4406 and the irradiation-side polarization plate 443.

Specifically, the first elastic member 4407A and the fourth elastic member 4407D with a shape of substantial rectangular frame are respectively installed in the recesses 4405E and 4406B of the frame members 4405 and 4406 as shown in FIG. 8.

The third elastic member 4407C is shaped in a rectangular frame having an opening 4407C1 corresponding to the image formation area of the liquid crystal panel 441 as shown in FIG. 8. The third elastic member 4407C extending to planimetrically interfere with the middle frame 4409 is installed on the recess 4406G of the frame member 4406 in a manner extending over the middle frame 4409 and the liquid crystal panel 441 (see FIG. 14 or 15).

The second elastic member 4407B is shaped in a rectangular frame having an opening 4407B2 corresponding to the image formation area of the liquid crystal panel 441 as shown in FIG. 8. Three insert holes 4407B1 are formed at the upper corners and the horizontal approximate center of the lower end so that three tubular portions 4406C (FIG. 10B) of the frame member 4406 are inserted therein. The second elastic member 4407B with a outer profile substantially same as that of the middle frame 4409 is installed on the recess 4405B of the frame member 4405 in a manner extending over the middle frame 4409 and the liquid crystal panel 441 (see FIG. 14 or 15).

The elastic members 4407 seal the respective cooling chambers R1 and R2 (see FIG. 14 or 15) of the frame members 4405 and 4406 to prevent the leakage of the cooling fluid between the incident-side polarization plate 442 and the frame member 4405, between the frame member 4405 and the liquid crystal panel 441, between the liquid crystal panel 441 and the frame member 4406, and between the frame member 4406 and the irradiation-side polarization plate 443, and to prevent the leakage of the cooling fluid from the connecting parts of the three tubular portions 4406C and 4406D and the three insert holes 4405C and 4405D toward the liquid crystal panel 441.

The elastic members 4407 may be made of elastic silicone rubber, preferably both sides or one side of which are surface-treated for improving the cross-link density. For example, SARCON GR-d series (trademark of Fuji Polymer Industries Co., Ltd) is applicable as the elastic members 4407. Such surface treatment of the end face facilitates the installation of the elastic members 4407 on the respective recesses 4405B, 4405E, 4406B and 4406G.

Without limiting to silicone rubber, the elastic members 4407 may be made of butyl rubber or fluorocarbon rubber with low water permeability.

The polarization plate fixers 4408A and 4408B press and fix the incident-side polarization plate 442 and the irradiation-side polarization plate 443 on the respective recesses 4405E and 4406B of the frame members 4405 and 4406 through the first elastic member 4407A and the fourth elastic member 4407D. As shown in FIG. 8, the polarization plate fixers 4408A and 4408B are substantially rectangular frames having openings 4408A1 and 4408B1 at the approximate center. The edges of the openings 4408A1 and 4408B1 respectively press the incident-side polarization plate 442 and the irradiation-side polarization plate 443 on the frame members 4405 and 4406. In the polarization plate fixers 4408A and 4408B, hook engaging portions 4408A2 and 4408B2 are respectively formed at the left and right end edges. By engaging the hook engaging portions 4408A2 and 4408B2 with the respective hooks 4405H and 4406L of the frame members 4405 and 4406, the polarization plate fixers 4408A and 4408B are fixed to the frame members 4405 and 4406 while pressing the incident-side polarization plate 442 and the irradiation-side polarization plate 443.

The middle frame 4409 constructed of an aluminum plate member with a substantially rectangular shape in plan view holds the liquid crystal panel 441 and positions the liquid crystal panel 441 at the predetermined positions of the frame members 4405 and 4406.

In the middle frame 4409, as shown in FIG. 8, a rectangular opening 4409A for fitting the opposing board 441D of the liquid crystal panel 441 therein at the approximate center. By fitting the opposing board 441D of the liquid crystal panel 441 in the opening 4409A, the liquid crystal panel 441 is positioned with respect to the middle frame 4409. Namely, the inner face of the opening 4409A serves as an external position reference face for the liquid crystal panel 441.

A step 4409B is formed on the edge of the opening 4409A to arrange the drive board 441C in a loosely fitted manner in a condition that the opposing board 441D is fitted in the opening 4409A. The distance between the step 4409B and the light-incident end face of the middle frame 4409 is smaller than the thickness of the opposing board 441D. Therefore, when the opposing board 441D is fitted in the opening 4409A to have the light-incident end face of the opposing board 441D flush with the light-incident end face of the middle frame 4409, a clearance 4409C (see FIG. 14 or 15) is formed between the step 4409B and the drive board 441C. By filling an adhesive with high elongation ratio in the clearance 4409C (FIG. 14 or FIG. 15), the position of the liquid crystal panel 441 is fixed with respect to the middle frame 4409. The thickness of the middle frame 4409 is substantially same as that of the liquid crystal panel 441. Therefore, when the position of the liquid crystal panel 441 is fixed with respect to the middle frame 4409, the light-incident end face and the light-irradiation end face of the middle frame 4409 respectively become flush with the light-incident end face and the light-irradiation end face of the liquid crystal panel 441 (see FIG. 14 or 15).

The upper side of the step 4409B extends to the upper end edge of the middle frame 4409. Therefore, when the position of the liquid crystal panel 441 is fixed to the middle frame 4409, the flexible printed board 441E of the liquid crystal panel 441 is arranged on the upper side of the step 4409B without being folded. Namely, the step 4409B serves as a recess according to the present invention.

In the middle frame 4409, as shown in FIG. 8, three insert holes 4409D are formed at the upper end corners and the horizontal approximate center of the lower end so that the tubular portions 4406C (FIG. 10B) and 4406D of the frame member 4406 can be inserted therein. The insert holes 4409D serve as holes for positioning the middle frame 4409 with respect to the frame member 4406. When the tubular portions 4406C and 4406D of the frame member 4406 are respectively inserted in the three insert holes 4409D of the middle frame 4409 in a condition that the position of the liquid crystal panel 441 is fixed with respect to the middle frame 4409 in advance, the middle frame 4409 is positioned with respect to the frame member 4406, or, the liquid crystal panel is positioned at a predetermined position of the frame member 4406. In a condition that the pair of frame members 4405 and 4406 and the middle frame 4409 are assembled, the open parts of the recesses 4405B and 4406G of the pair of frame members 4405 and 4406 are respectively covered by the light-incident end faces of the middle frame 4409 and the opposing board 441D of the liquid crystal panel 441, and, the light-irradiation end faces of the middle frame 4409 and the drive board 441C of the liquid crystal panel 441, so that elastic member housings 4407E for accommodating the second elastic member 4407B and the third elastic member 4407C of the elastic members 4407 therein are formed (see FIG. 14 or 15).

The support member 4403 is constructed of a plate with a shape of rectangular frame in plan view having a not-shown opening at the approximate center.

On the light-incident end face of the support member 4403, as shown in FIG. 5 or 6, the pin members 4403A projecting from the plate are formed at the positions corresponding to the four insert portions 4406J of the optical modulator holder 4402.

Incidentally, for attaching the three optical modulator holders 4402 to the respective light-incident end faces of the cross dichroic prism 444, the relative position of the three liquid crystal panels 441 should be adjusted. For example, the relative position of the respective liquid crystal panels 441 may be adjusted by interposing a plurality of spacers between the optical modulator holders 4402 and the cross dichroic prism 444 and moving the position of the spacers. According to this configuration, however, assembling steps for installing the plurality of spacers are added, and also a troublesome work for removing the plurality of spacers is required when detaching the optical modulator holders 4402 in a case of repair or the like.

In the present embodiment, the support member 4403 supports the optical modulator holder 4402 by inserting the pin members 4403A in the four insert portions 4406J of the optical modulator holder 4402, and the light-irradiation end face of the plate is fixed and adhered to the light-incident end face of the cross dichroic prism 444, thereby integrating the optical modulator holder 4402 to the cross dichroic prism 444. That is, the above-described spacers correspond to the pin members 4403A formed on the support member 4403, and the spacers are integrally formed with the support member 4403. This facilitates the work for attaching and detaching the optical modulator holders 4402 to the cross dichroic prism 444.

Figure 11A:
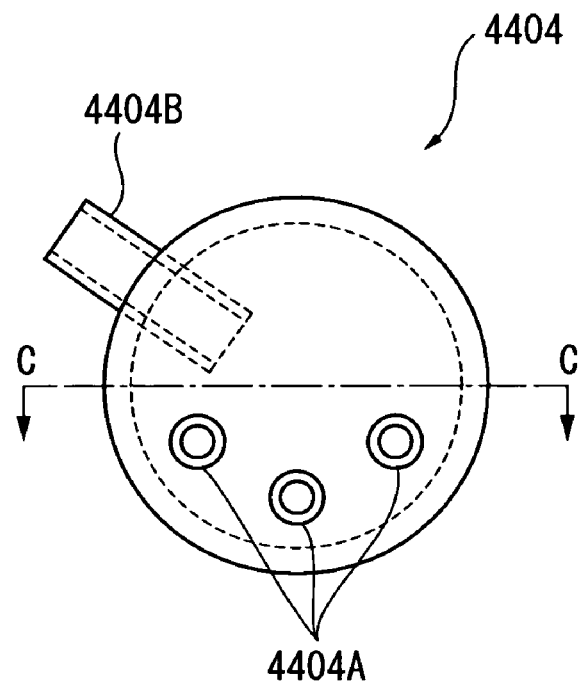
FIGS. 11A and 11B are illustrations each showing the structure of a relay tank according to the aforesaid embodiment.
Figure 11B:
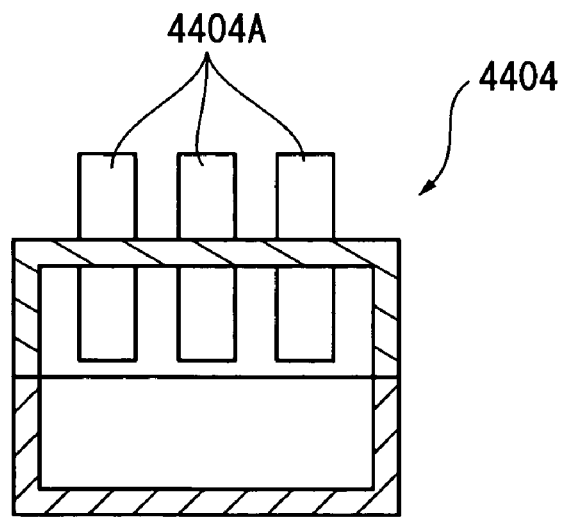

FIGS. 11A and 11B are illustrations each showing the structure of the relay tank 4404. Specifically, FIG. 11A is an illustration of the relay tank 4404 seen from the upper side. FIG. 11B is a cross section taken along a line C—C in FIG. 11A.

The relay tank 4404 constructed of an aluminum hollow member with a substantially columnar shape is fixed on the upper face (i.e., an end face orthogonal to the three light-incident end faces) of the cross dichroic prism 444. The relay tank 4404 collectively takes in the cooling fluid sent out of the respective optical modulator holders 4402 and sends the taken-in cooling fluid to the outside.

In the relay tank 4404, as shown in FIGS. 11A and 11B, three cooling fluid inlets 4404A thorough which the cooling fluid sent out of the respective optical modulator holders 4402 flows to the inside are formed at the upper face thereof. Each of the cooling fluid inlets 4404A is constructed of a substantially tubular member with the tube diameter thereof smaller than that of the fluid circulator 448, and is arranged to project to both the inner and outer sides of the relay tank 4404. Second ends of the fluid circulators 448 connected to the respective outlet ports 4406I of the optical modulator holders 4402 are connected to respective outwardly-projecting ends of the cooling fluid inlets 4404A, so that the cooling fluid sent out of the optical modulator holders 4402 through the fluid circulators 448 collectively flows into the relay tank 4404.

In the relay tank 4404, as shown in FIG. 11A, a cooling fluid outlet 4404B from which the taken-in cooling fluid flows out is formed on the lower outer face. Like the cooling fluid inlet 4404A, the cooling fluid outlet 4404B is constructed of a substantially tubular member with the tube diameter thereof smaller than that of the fluid circulator 448, and is arranged to project to both the inner and outer sides of the relay rank 4404. A first end of still another fluid circulator 448 is connected to an outwardly-projecting end of the cooling fluid outlet 4404B, so that the cooling fluid in the relay tank 4404 flows out through the fluid circulator 448.

Figure 12A:
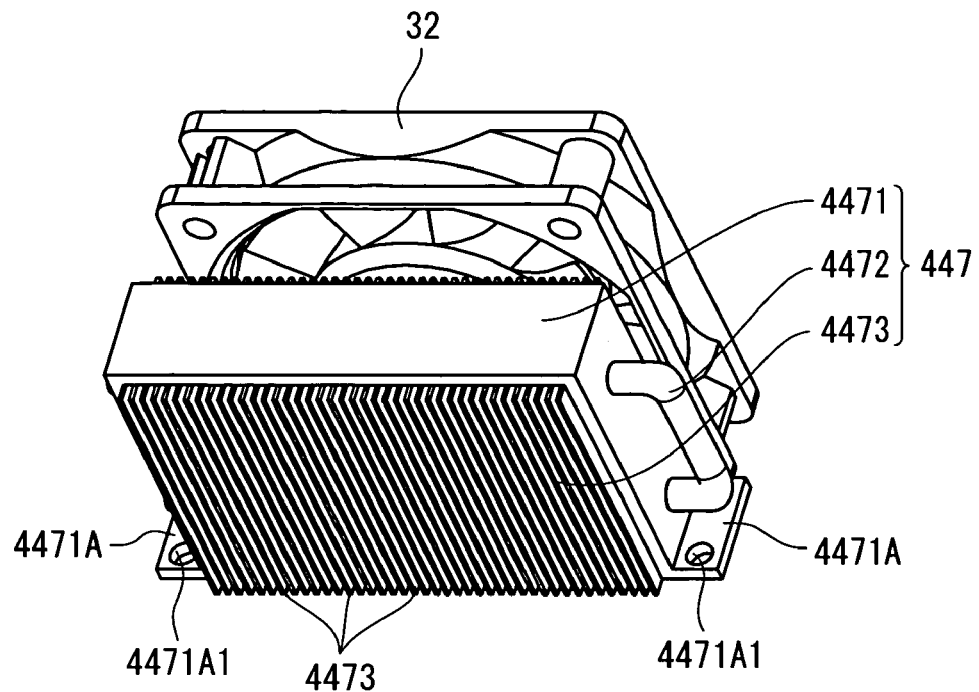
FIGS. 12A and 12B are illustrations each showing the structure of a radiator and the positional relation between the radiator and an axial fan according to the aforesaid embodiment.
Figure 12B:
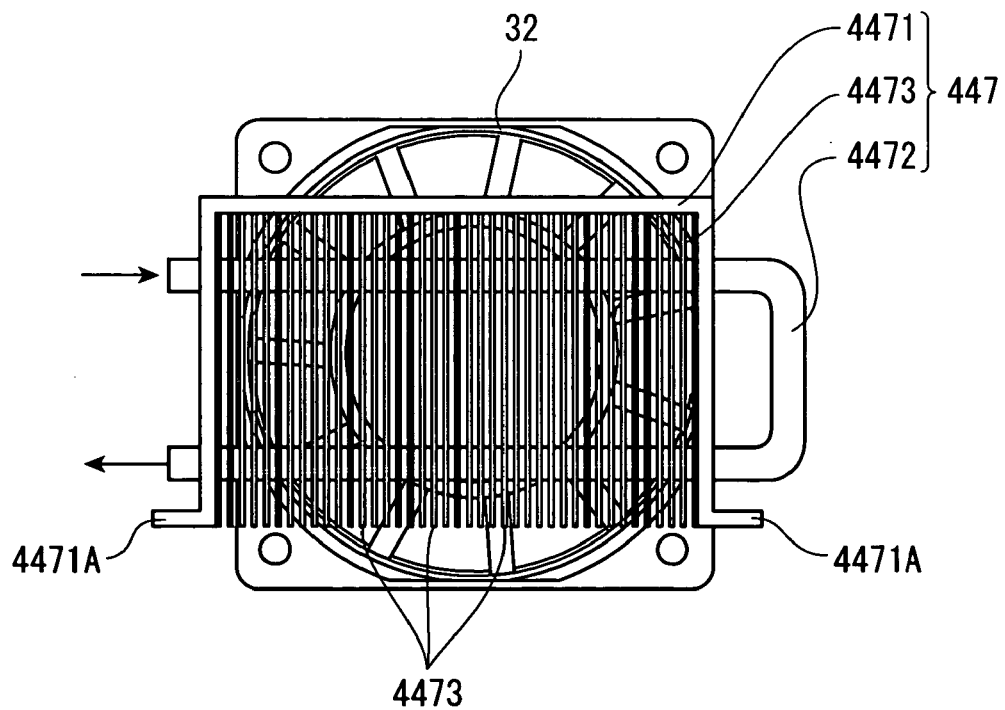

FIGS. 12A and 12B are illustrations each showing the structure of the radiator 447 and the positional relation between the radiator 447 and the axial fan 32. Specifically, FIG. 12A is a perspective view of the radiator 447 and the axial fan 32 seen from the upper side. FIG. 12B is a plan view of the radiator 447 and the axial fan 32 seen from the side of the radiator 447.

As shown in FIG. 1 or 2, the radiator 447 arranged at the inner side of the partition 21 of the exterior case 2 releases the heat of the cooling fluid heated by the liquid crystal panels 441, the incident-side polarization plates 442 and the irradiation-side polarization plate 443 in the optical device body 440. The radiator 447, as shown in FIGS. 12A and 12B, includes a fixing portion 4471 and a pipe member 4472, and a plurality of fins 4473.

The fixing portion 4471 is, for example, constructed of a heat-conductive member made of metal or the like, and is formed in a U shape in plan view as shown in FIG. 12B so that the pipe member 4472 can be inserted in the opposing U-shaped end edges. The fixing portion 4471 supports the plurality of radiator fins 4473 at the inner face of the U shape. On tip ends of the U shape of the fixing portion 4471, outwardly-extending extensions 4471A are formed. Not-shown screws are screwed in holes 4471A1 of the extensions 4471A, so that the radiator 447 is fixed to the exterior case 2.

As shown in FIG. 12B, the aluminum pipe member 4472 is formed in a U extending from one tip end of the U shape of the fixing portion 4471 toward the other tip end of the U shape, and a front end in the extending direction is bent by approximately 90° to extend to the lower side, and further the tip end in the extending direction is bent by approximately 90° to extend from the other tip end of the U shape toward one tip end of the U shape, thereby connecting the fixing portion 4471 and the radiator fins 4473 in a heat conductive manner. The pipe member 4472 has the tube diameter smaller than that of the fluid circulator 448. An upper end thereof shown in FIG. 12B is connected to a second end of the fluid circulator 448 connected to the cooling fluid outlet 4404B of the relay tank 4404 in the optical device body 440. A lower end thereof shown in FIG. 12B is connected to a second end of the fluid circulator 448 connected to the cooling fluid inlet 445A of the main tank 445. Therefore, the cooling fluid flown out of the relay tank 4404 passes through the pipe member 4472 through the fluid circulator 448, and the cooling fluid passed though the pipe member 4472 flows in the main tank 445 through the fluid circulator 448.

The each radiator fin 4473 is, for example, constructed of a heat-conductive member made of metal or the like, and is so formed that the pipe member 4472 can be inserted therein. The plurality of radiator fins 4473 are respectively extended in the direction orthogonal to the insert direction of the pipe member 4472 and arranged in parallel along the insert direction of the pipe member 4472. With this arrangement of the plurality of radiator fins 4473, as shown in FIGS.

12A and 12B, the cooling air discharged from the axial fan 32 passes between the plurality of radiator fins 4473.

As described above, the cooling fluid circulates in the flow channel from the main tank 445 to the fluid feeder 446 to the fluid splitter 4401 to the each optical modulator holder 4402 to the relay tank 4404 to the radiator 447 to the main tank 445 through the plurality of fluid circulators 448.

Next, the cooling mechanism for the liquid crystal panels 441, the incident-side polarization plates 442 and the irradiation-side polarization plates 443 will be described.

Figure 13:
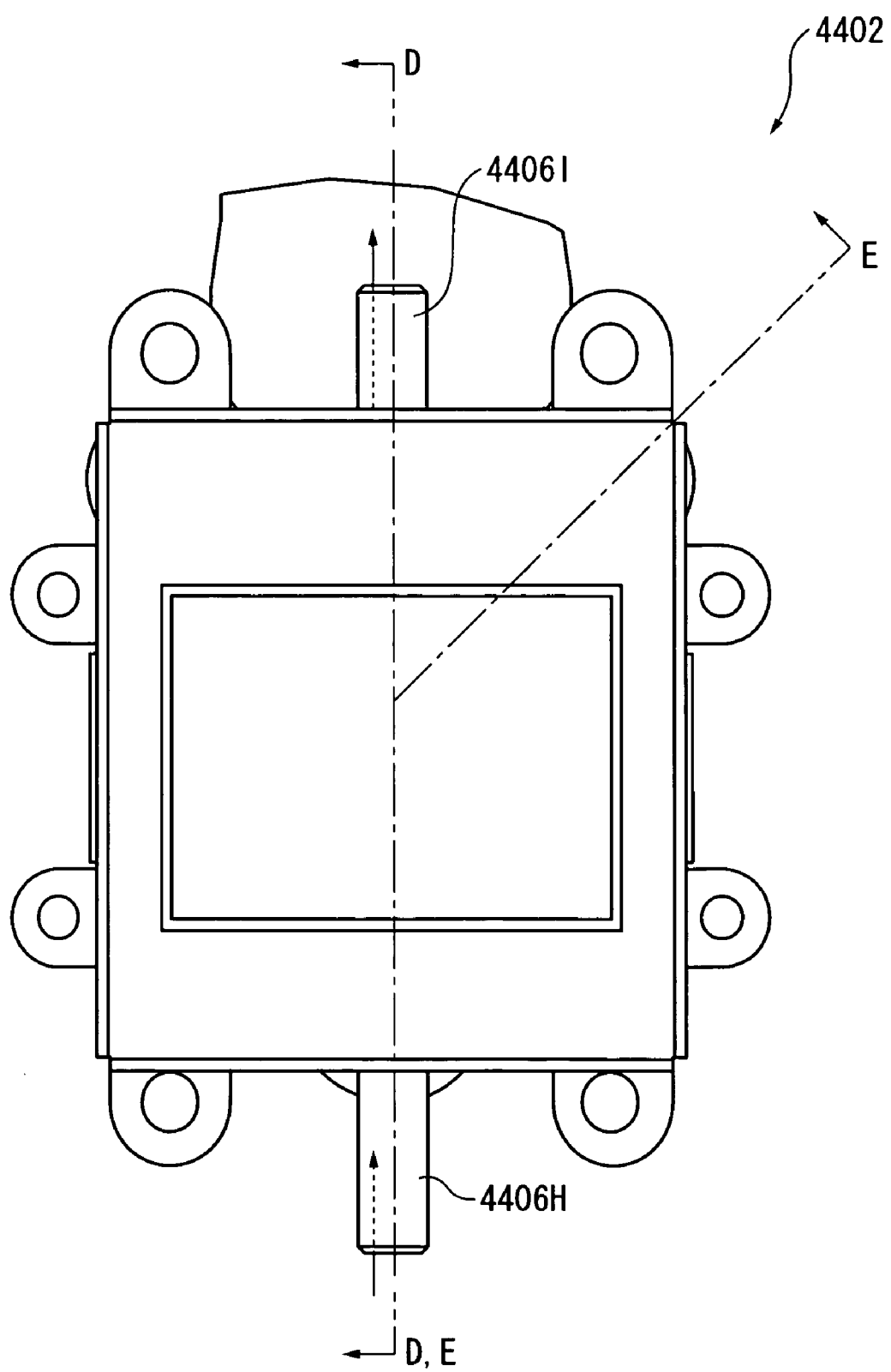
FIG. 13 is an illustration showing a cooling mechanism for a liquid crystal panel, an incident-side polarization plate and an irradiation-side polarization plate according to the aforesaid embodiment.
Figure 14:
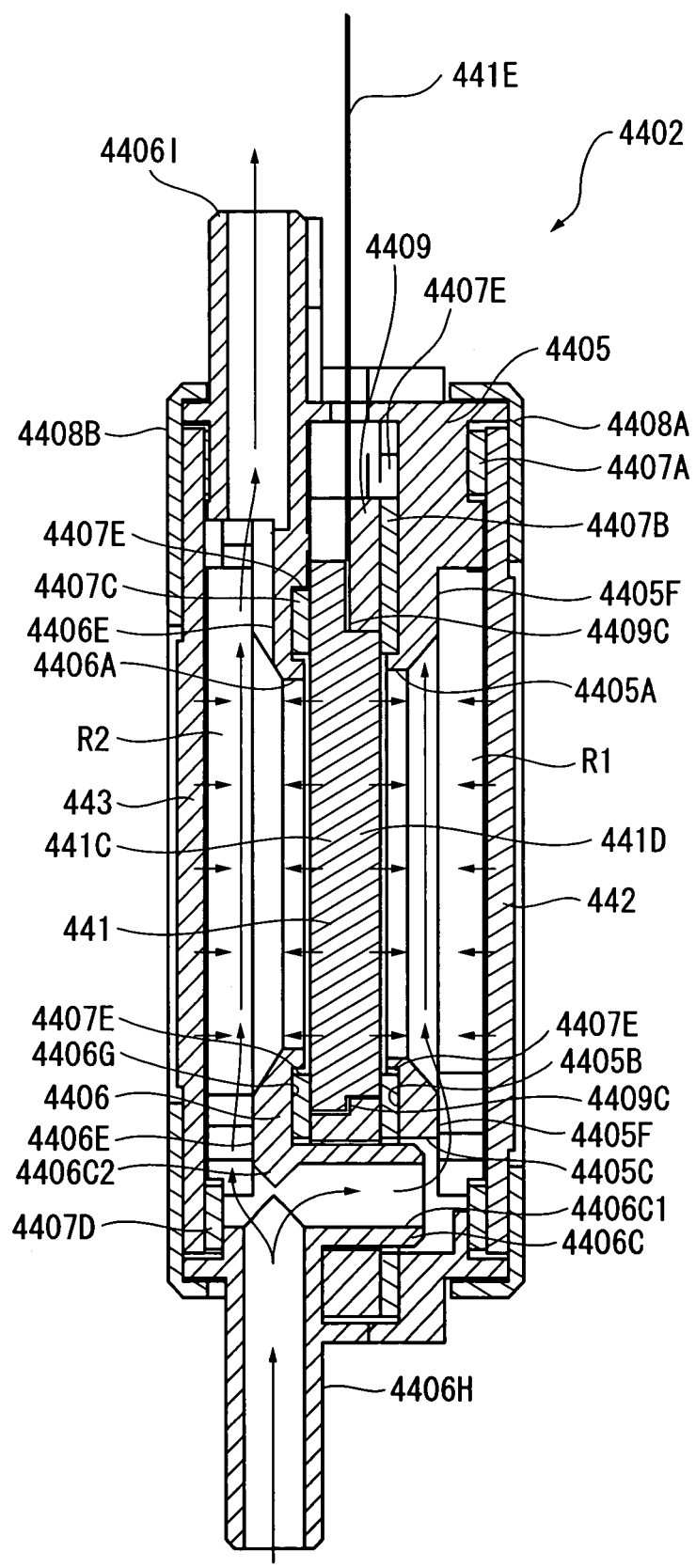
FIG. 14 is an illustration showing the cooling mechanism for the liquid crystal panel, the incident-side polarization plate and the irradiation-side polarization plate according to the aforesaid embodiment.
Figure 15:
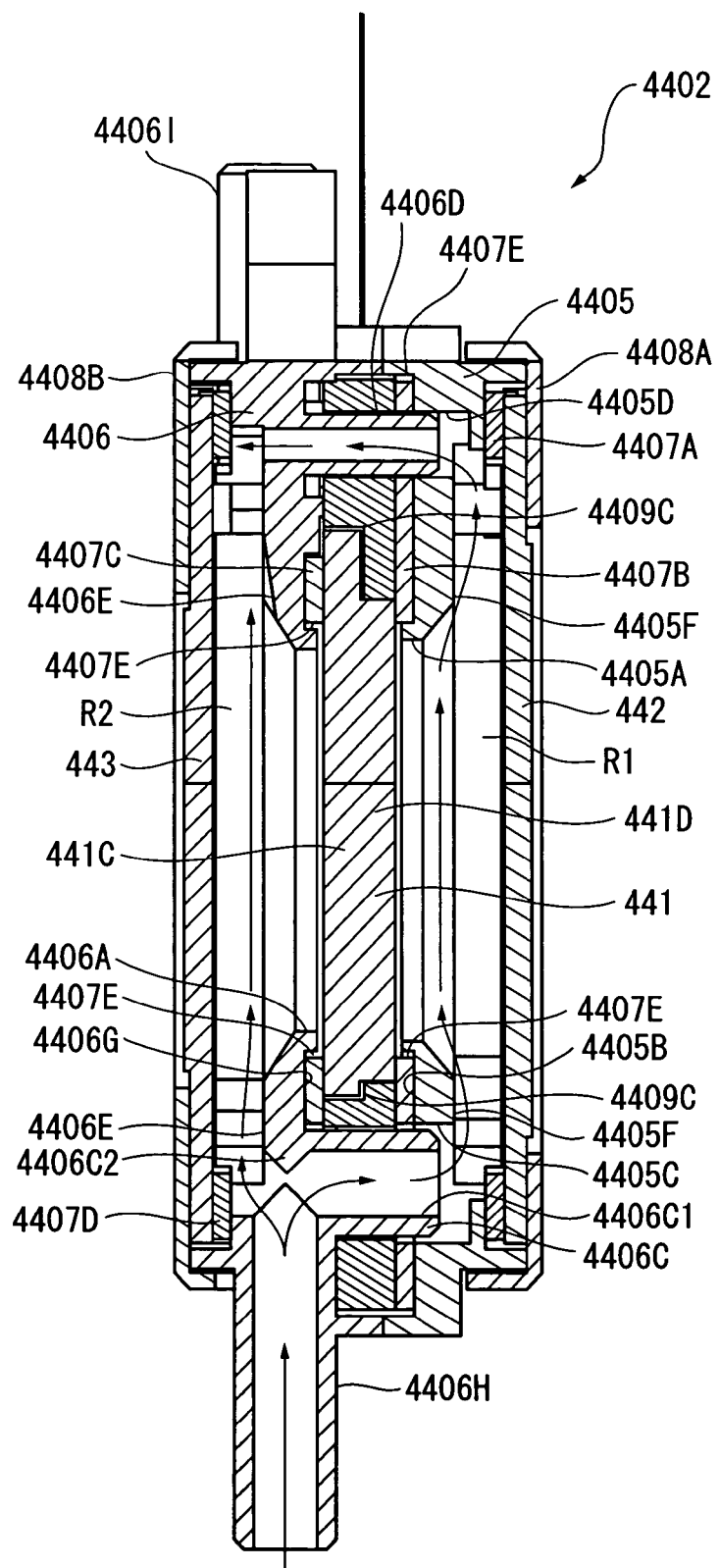
FIG. 15 is an illustration showing the cooling mechanism for the liquid crystal panel, the incident-side polarization plate and the irradiation-side polarization plate according to the aforesaid embodiment.

FIGS. 13 to 15 are illustrations showing a cooling mechanism for the liquid crystal panels 441, the incident-side polarization plates 442 and the irradiation-side polarization plates 443. Specifically, FIG. 13 is a plan view of the optical modulator holder 4402 seen from the light-irradiation side. FIG. 14 is a cross section taken along a line D—D in FIG. 13. FIG. 15 is a cross section taken along a line E—E in FIG. 13.

When the fluid feeder 446 is driven, the cooling fluid in the main tank 445 is taken in the fluid feeder 446, and sent out of the fluid feeder 446 to the fluid splitter 4401 through the fluid circulators 448.

The cooling fluid taken in the fluid splitter 4401 flows out of the cooling fluid outlets 4401C of the fluid splitter 4401, and flows from the inlet ports 4406H of the optical modulator holders 4402 into the optical modulator holders 4402 through the fluid circulators 448 as shown in FIGS. 13 to 15.

As shown in FIG. 14 or 15, the cooling fluid flown into the respective optical modulator holders 4402 is split by the projection 4406C2 of the tubular portion 4406C and flows into the cooling chamber R1 and the cooling chamber R2.

The heat generated in the liquid crystal panel 441, the incident-side polarization plate 442 and the irradiation-side polarization plate 443 by the light beam irradiated from the light source device 411 is transmitted to the cooling fluid in the cooling chambers R1 and R2.

As shown in FIG. 14, the heat transmitted to the cooling fluid in the cooling chamber R2 proceeds upward in FIG. 14 along with the flow of the cooling fluid, and moves to the outside of the cooling chamber R2 through the outlet port 4406I.

On the other hand, as shown in FIG. 14, the heat transmitted to the cooling fluid in the cooling chamber R1 moves upward in FIG. 14 along with the flow of the cooling fluid. The heat moved upward is guided to the left and right corners by a lateral wall of the upper recess 4405F (FIG. 9B) of the frame member 4405 along with the flow of the cooling fluid. As shown in FIG. 15, the heat guided to the left and right corners moves into the cooling chamber R2 through the two insert holes 4405D positioned at the left and right corners and the two tubular portions 4406D connected to the insert holes 4405D, and is straightened by the flow straighteners 4406F (FIG. 10A) to move to the outside of the cooling chamber R2 through the outlet port 4406I along with the flow of the cooling fluid.

The heat moved to the outside of the optical modulator holder 4402 through the outlet port 4406I moves from the cooling chambers R1 and R2 to the relay tank 4404 to the radiator 447 along with the flow of the cooling fluid. When the heated cooling fluid passes through the pipe member 4472 of the radiator 447, the heat of the cooling fluid is transmitted to the pipe member 4472 to the plurality of radiator fins 4473. The heat transmitted to the plurality of radiator fins 4473 are cooled by the cooling air discharged from the axial fan 32.

The cooling fluid cooled by the radiator 447 moves from the radiator 447 to the main tank 445 to the fluid feeder 446 to the fluid splitter 4401, and moves to the cooling chambers R1 and R2 again.

The cooling air introduced from the outside to the inside of the projector 1 by the sirocco fan 31 of the cooling unit 3 is introduced into the optical component casing 45 through the holes 451C formed on the bottom face of the optical component casing 45. The cooling air introduced into the optical component casing 45 flows to the outer face of the optical modulator holder 4402 and between the optical modulator holder 4402 and the support member 4403 and flows from the lower side to the upper side. In this step, the cooling air flows while cooling the light-incident end face of the incident-side polarization plate 442 and the light-irradiation end face of the irradiation-side polarization plate 443.

In the above-described embodiment, since the opposing board 441D of the liquid crystal panel 441 is fitted in the opening 4409A with inner face serving as the external position reference face, the middle frame 4409 of the optical modulator holder 4402 restricts the external position of the liquid crystal panel 441 with respect to the middle frame 4409. Therefore, compared with the conventional configuration in which the liquid crystal panels are accommodated and arranged in the casing, the positioning accuracy of the liquid crystal panel 441 with respect to the optical modulator holder 4402 can be improved. The movement of the liquid crystal panel 441 in the outer circumferential direction is restricted by the middle frame 4409, and the movement of the liquid crystal panel 441 in the thickness direction and the inclination direction is restricted by the second elastic member 4407B, the third elastic member 4407C and the pair of frame members 4405 and 4406. Therefore, even after a long period of use, the liquid crystal panel 441 will not be displaced with respect to the optical modulator holder 4402.

Since the openings 4405A and 4406A of the pair of frame members 4405 and 4406 are respectively covered by the middle frame 4409, the elastic members 4407, the liquid crystal panel 441, the incident-side polarization plate 442 and the irradiation-side polarization plate 443, the cooling chambers R1 and R2 are formed on both of the light-incident side and the light-irradiation side of the liquid crystal panel 441. Accordingly, the cooling fluid can efficiently cool the liquid crystal panel 441.

In assembling the optical modulator holder 4402, the liquid crystal panel 441 is attached to the frame member 4406 in a condition that the position of the liquid crystal panel 441 is fixed with respect to the middle frame 4409 in advance. Therefore, compared with the conventional configuration in which the liquid crystal panel without being covered is accommodated and arranged in the casing, the damage to the liquid crystal panel 441 due to a clash with other components will not be caused during the handling of the liquid crystal panel 441.

Since the middle frame 4409 becomes flush with the light-incident end face and the light-irradiation end face of the liquid crystal panel 441 when the position of the liquid crystal panel 441 is fixed, the outer circumference of the liquid crystal panel 441 is covered by the inner face of the opening 4409A of the middle frame 4409. Accordingly, in a condition that the optical modulator holder 4402 is assembled, when the second elastic member 4407B and the third elastic member 4407C of the elastic members 4407 are pressed by the liquid crystal panel 441 and the pair of frame members 4405 and 4406, the second elastic member 4407B and the third elastic member 4407C will not be moved to the outer circumferential direction of the liquid crystal panel 441 by the reaction force. Accordingly, the second elastic member 4407B and the third elastic member 4407C secure the leakage protection of the cooling fluid between the liquid crystal panel 441 and the pair of frame members 4405 and 4406.

The second elastic member 4407B and the third elastic member 4407C extending to planimetrically interfere with the middle frame 4409 are installed on the respective recesses 4405B and 4406G of the pair of frame members 4405 and 4406 in a manner extending over the middle frame 4409 and the liquid crystal panel 441. Therefore, for example, compared with the configuration in which they are respectively interposed between only the liquid crystal panel 441 and the pair of frame members 4405 and 4406 without planimetrically interfering with the middle frame 4409, the volume of the second elastic member 4407B and the third elastic member 4407C can be increased. Since the middle frame 4409 becomes flush with the light-incident end face and the light-irradiation end face of the liquid crystal panel 441, the width of the flexed parts of the second elastic member 4407B and the third elastic member 4407C can be equalized when the second elastic member 4407B and the third elastic member 4407C are pressed by the middle frame 4409, the liquid crystal panel 441 and the pair of frame members 4405 and 4406. Accordingly, the second elastic member 4407B and the third elastic member 4407C further secure the leakage protection of the cooling fluid between the liquid crystal panel 441 and the pair of frame members 4405 and 4406.

When the optical modulator holder 4402 is assembled, the open parts of the recesses 4405B and 4406G of the pair of frame members 4405 and 4406 are covered by the middle frame 4409 and the liquid crystal panel 441, and thus the elastic member housings 4407E are formed. Therefore, neither the reaction force caused when the second elastic member 4407B and the third elastic member 4407C are pressed by the middle frame 4409, the liquid crystal panel 441 and the pair of frame members 4405 and 4406, nor the pressure fluctuation of the cooling fluid in the respective cooling chambers R1 and R2 cause the displacement of the second elastic member 4407B and the third elastic member 4407C. Accordingly, the second elastic member 4407B and the third elastic member 4407C further secure the leakage protection of the cooling fluid between the liquid crystal panel 441 and the pair of frame members 4405 and 4406.

The external position of the liquid crystal panel 441 can be restricted by the middle frame 4409, while the position of the middle frame 4409 can be restricted with respect to the frame member 4406 by inserting the tubular portions 4406C and 4406D of the frame member 4406 in the insert holes 4409D of the middle frame 4409. Accordingly, the positioning accuracy of the liquid crystal panel 441 with respect to the optical modulator holder 4402 can be further improved with the simple structure. Since the tubular portions 4406C and 4406D of the frame member 4406 are inserted in the insert holes 4409D of the middle frame 4409, the middle frame 4409 will not be displaced with respect to the pair of frame members 4405 and 4406 even after a long period of use. That is, the position of the liquid crystal panel 441 will not be displaced with respect to the optical modulator holder 4402. According to this configuration, the optical modulator holder 4402 can be easily assembled with the simple structure.

The tubular portions 4406C and 4406D have the holes 4406C1 and 4406D1 communicated with the inside of the cooling chamber R2, and the frame member 4405 has the insert holes 4405C and 4405D communicated with the inside of the cooling chamber R1. Therefore, the cooling chambers R1 and R2 can be communicated and connected by inserting the tubular portions 4406C and 4406D in the insert holes 4405C and 4405D in assembling the frame members 4405 and 4406.

Therefore, the cooling fluid can be circulated between the cooling chambers R1 and R2, and thus the light-incident side and the light-irradiation side of the liquid crystal panel 441 can be cooled by the cooling fluids with the substantially same temperature. This equalizes the temperature of the light-incident side and the light-irradiation side of the liquid crystal panel 441. Also, for example, compared with the configuration in which the cooling chambers R1 and R2 are communicated and connected by the fluid circulator, the optical modulator holder 4402 can become compact, and the size and the weight of the optical modulator holder 4402 can be reduced.

The optical modulator holder 4402 has one inlet port 4406H and one outlet port 4406I. The cooling fluid flown in through the inlet port 4406H is split to the cooling chambers R1 and R2 by the tubular portion 4406C and the insert hole 4405C, and the cooling fluid in the cooling chambers R1 and R2 are merged by the two tubular portions 4406D and insert holes 4405D and then flown to the outside through the outlet port 4406I. Therefore, by connecting the inlet port 4406H and the outlet port 4406I by the plurality of fluid circulator 448, the cooling fluid in the cooling chambers R1 and R2 can be easily convected, and thus preventing the cooling fluid heated by the liquid crystal panel 441 from staying in the cooling chambers R1 and R2. Accordingly, the temperature difference between the liquid crystal panel 441 and the cooling fluid will not be reduced even though the cooling fluid is heated by the liquid crystal panel 441, and the cooling fluid can effectively cool the optical modulator.

Since the cooling chambers R1 and R2 are communicated and connected by the three tubular portions 4406C and 4406D and the three insert holes 4405C and 4405D, there is no need to provide two inlet ports 4406H and two outlet ports 4406I corresponding to the cooling chambers R1 and R2. Therefore, the configuration in which only one inlet port 4406H and one outlet port 4406I are provided in the optical modulator holder 4402 is applicable. Accordingly, compared with the configuration in which two inlet ports 4406H and two outlet ports 4406I are provided corresponding to the cooling chambers R1 and R2, the number of the fluid circulator 448 for connecting the inlet port 4406H and the outlet port 4406I can be reduced.

This facilitates the work for connecting the inlet port 4406H and the outlet port 4406I to the fluid circulators 448. Also, by reducing the number of connecting points, the number of points from which the cooling fluid leaks can be reduced. Moreover, the space around the optical modulator holder 4402 can be efficiently used. In a condition that the fluid circulators 448 are connected to the optical modulator holder 4402, the reaction force of the fluid circulators 448 onto the optical modulator holder 4402 can be reduced. Therefore, the relative displacement of the optical modulator holders 4402 with respect to the cross dichroic prism 444 can be prevented, and the pixel displacement among the liquid crystal panels 441 can be suppressed.

The second elastic member 4407B of the elastic member 4407 has the three insert holes 4407B1 corresponding to the three tubular portions 4406C and 4406D of the frame member 4406. Accordingly, in a condition that the optical modulator holder 4402 is assembled, when the second elastic member 4407B is pressed by the frame member 4405 and the liquid crystal panel 441, the insert holes 4407B1 of the second elastic member 4407B can press and abut on the connecting parts of the tubular portions 4406C and 4406D and the insert holes 4405C and 4405D. Therefore, the leakage of the cooling fluid circulating between the cooling chambers R1 and R2 through the tubular portions 4406C and 4406D and the insert holes 4405C and 4405D can be surely prevented with the simple structure. By integrating a component for preventing the leakage of the cooling fluid between the frame member 4405 and the liquid crystal panel 441 and a component for preventing the leakage of the cooling fluid from the connecting parts of the tubular portions 4406C and 4406D and the insert holes 4405C and 4405D, the number of components and the number of steps for assembling the optical modulator holder 4402 can be reduced.

Since the middle frame 4409 has the step 4409B for arranging the flexible printed board 441E of the liquid crystal panel 441 in a loosely fitted manner, the middle frame 4409 does not interfere with the flexible printed board 441E even when the middle frame 4409 supports the liquid crystal panel 441 on the opening 4409A. Therefore, the external force applied to the flexible printed board 441E will not affect on the drive board 441C and the opposing board 441D. Accordingly, the positioning accuracy of the liquid crystal panel 441 with respect to the optical modulator holder 4402 can be maintained properly.

Since the pair of frame members 4405 and 4406 and the middle frame 4409 are made of the same aluminum material, the size fluctuation due to the temperature fluctuation can be equalized, and the variation of the width of the flexed parts of the second elastic member 4407B and the third elastic member 4407C is therefore minimized. Accordingly, the leakage protection of the cooling fluid between the pair of frame members 4405 and 4406 and the liquid crystal panel 441 can be properly secured.

The optical device body 440 includes the incident-side polarization plates 442 and the irradiation-side polarization plates 443. The light-incident side and the light-irradiation side of the openings 4405A and 4406A are respectively covered by the translucent boards 442A and 443A of the incident-side polarization plates 442 and the irradiation-side polarization plates 443, and thus the cooling chambers R1 and R2 are formed. Accordingly, the heat generated in the polarization films of the incident-side polarization plates 442, the polarization films 443B of the irradiation-side polarization plates 443 as well as the liquid crystal panels 441 can be released to the cooling fluid convecting in the cooling chambers R1 and R2 through the translucent boards 442A and 443A, so that the incident-side polarization plates 442 and the irradiation-side polarization plates 443 can be also efficiently cooled.

Since the optical device body 440 includes the three liquid crystal panels 441, the three optical modulator holders 4402 and the cross dichroic prism 444 and, as previously mentioned, has the improved accuracy for positioning the liquid crystal panels 441 with respect to the optical modulator holders 4402, the relative displacement of the liquid crystal panels 441 can be prevented, and therefore the optical device body 440 can form a proper optical image without pixel displacement.

Since the main tank 445, the fluid feeder 446, the plurality of fluid circulators 448, the fluid splitter 4401, the pair of frame members 4405 and 4406, the relay tank 4404 and the pipe member 4472 of the radiator 447 are made of corrosion-resistant aluminum, occurrence of a chemical reaction can be prevented even kept in contact with the cooling fluid for a long period. This prevents the cooling fluid from being colored by active substances formed in a chemical reaction, and also prevents the light beam passing in the cooling chambers R1 and R2 from a change in the optical property thereof.

Since the projector 1 includes the optical device body 440 with the improved accuracy for positioning the liquid crystal panels 441, the position of the liquid crystal panels 441 with respect to the optical axis of the light beam irradiated from the light source device 411 will not be displaced, and therefore a proper optical image without pixel displacement can be projected on the screen by the projection lens 5.

[Second Embodiment]

A second embodiment of the present invention will be described with reference to the attached drawings.

In the following description, the components same as those in the first embodiment are indicated by the same reference symbols or numerals for omitting or simplifying the detailed description thereof.

According to the first embodiment, in the optical device body 440, the inlet port 4406H and the outlet port 4406I of the optical modulator holder 4402 are respectively formed at the opposing positions on the upper and lower ends of the frame member 4406. The middle frame 4409 and the second elastic member 4407B respectively have the three insert holes 4409D and 4407B1 corresponding to the three tubular portions 4406C and 4406D.

On the other hand, according to the second embodiment, in an optical device body 540, an inlet port 5406H and an outlet port 5406I of an optical modulator holder 5402 are respectively formed at one end, i.e., the upper end of a frame member 5406. The frame member 5406 has two tubular portions 5406C and 5406D. Correspondingly, a middle frame 5409 and a second elastic member 5407B respectively have two insert holes 5409D and 5407B1. The configuration other than the optical device body 540 is the same as in the first embodiment.

Figure 16:
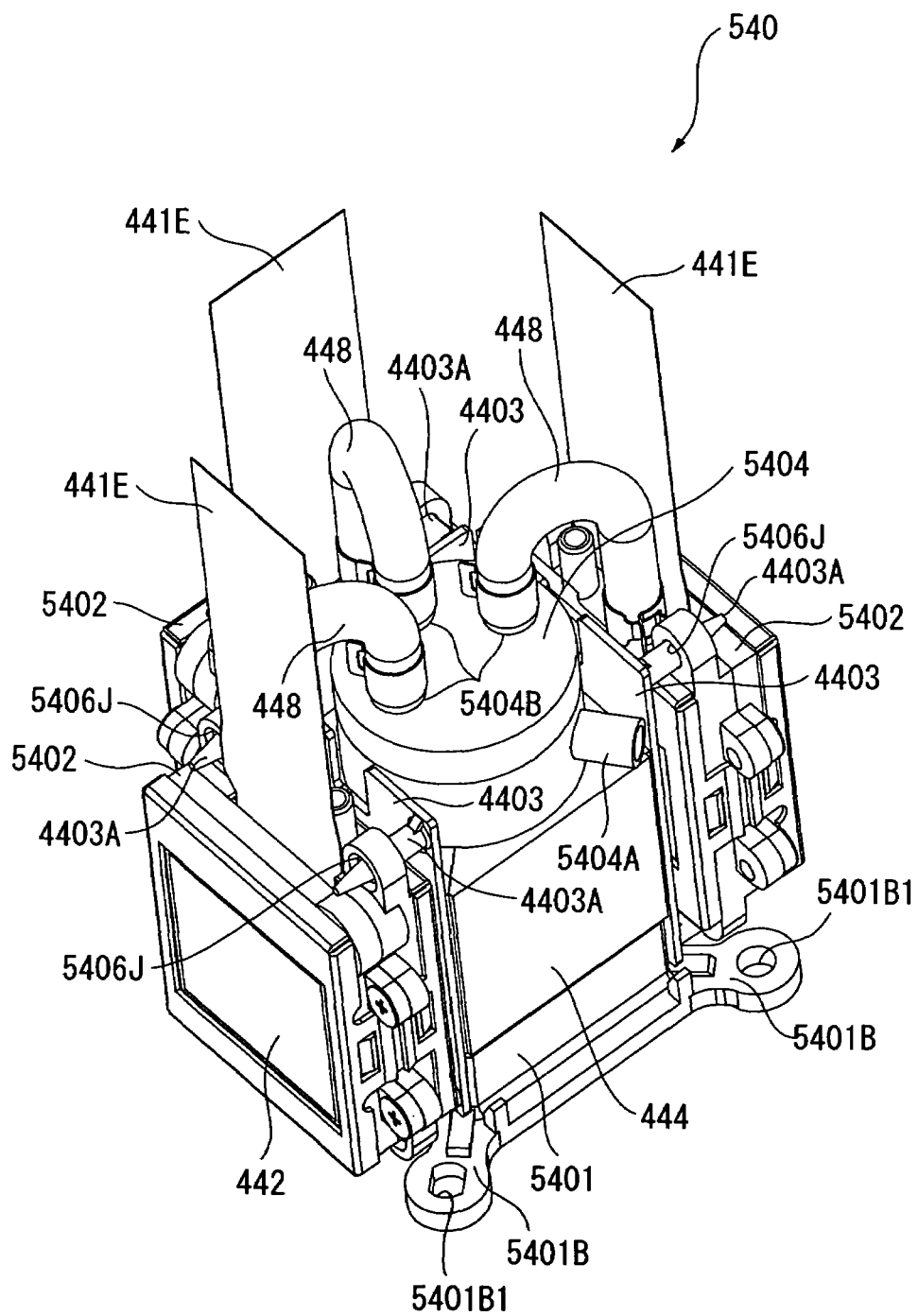
FIG. 16 is a schematic illustration showing the structure of an optical device body according to a second embodiment.
Figure 17:
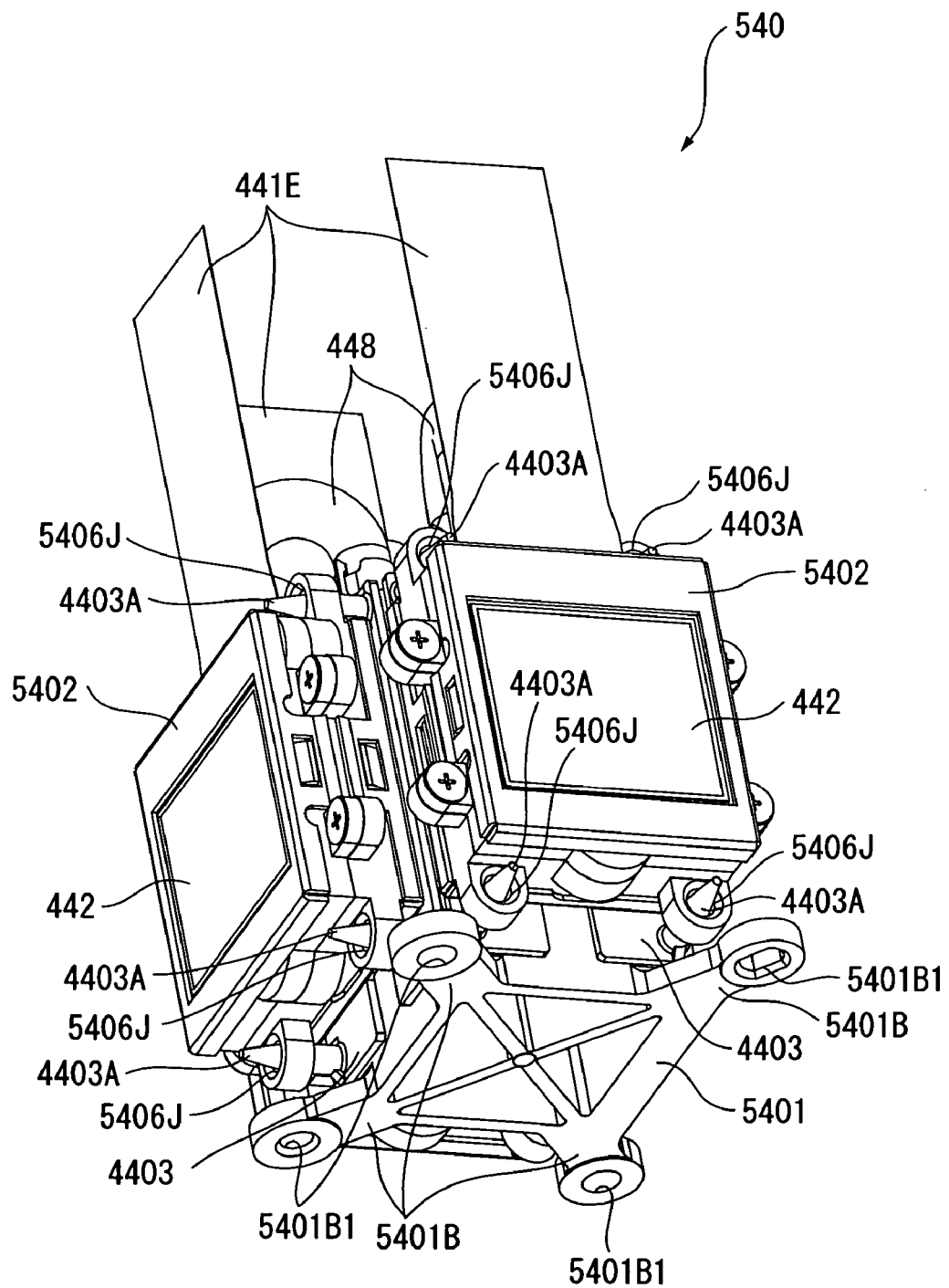
FIG. 17 is a schematic illustration showing the structure of the optical device body according to the aforesaid embodiment.

Specifically, FIGS. 16 and 17 are schematic illustrations each showing the structure of the optical device body 540 according to the second embodiment. FIG. 16 is a perspective view of the optical device body 540 seen from the upper side, and FIG. 17 is a perspective view of the optical device body 540 seen from the loser side.

The optical device body 540 includes, in addition to the liquid crystal panels 441, the incident-side polarization plates 442, the irradiation-side polarization plates 443, the cross dichroic prism 444 and the support member 4403 described in the first embodiment, a relay tank 5404 (FIG. 16), a prism fixing plate 5401 and three optical modulator holders 5402.

The relay tank 5404 has the same configuration as the relay tank 4404 described in the first embodiment except only that the functions of the cooling fluid inlets 4404A and the cooling fluid outlet 4404B of the relay tank 4404 are switched. In the relay tank 5404, as shown in FIG. 16, the cooling fluid outlet 4404B of the relay tank 4404 serves as the cooling fluid inlet 5404A through which the cooling fluid flows from the outside to the inside. Although not shown in detail, the second end of the fluid circulator 448 communicated with and connected to the fluid feeder 446 (FIG. 2 or 3) is connected to an outwardly-projecting end of the cooling fluid inlet 5404A, so that the cooling fluid sent out of the fluid feeder 446 through the fluid circulator 448 flows into the relay tank 5404.

Further, in the relay tank 5404, as shown in FIG. 16, the three cooling fluid inlets 4404A of the relay tank 4404 serve as the three cooling fluid outlets 5404B for splitting and sending out the cooling fluid therein to each of the optical modulator holders 5402. First ends of the three fluid circulators 448 are respectively connected to three outwardly-projecting ends of the cooling fluid outlets 5404B as shown in FIG. 16, and the second ends of fluid circulators 448 are respectively connected to later-described inlet ports of the optical modulator holder 5402. Therefore, the cooling fluid in the relay tank 5404 is split and flown out to the each optical modulator holder 5402 through the fluid circulators 448.

The prism fixing plate 5401 has the same configuration as the fluid splitter 4401 described in the first embodiment and has only a function for supporting the cross dichroic prism 444. Specifically, the prism fixing plate 5401 does not have the cooling fluid inlet 4401A and the cooling fluid outlets 4401C of the fluid splitter 4401 described in the first embodiment but has arms 5401B (with holes 5401B1) and a not-shown bulging portion, which correspond to the arms 4401B (with the holes 4401B1) and the bulging portion 4401D of the fluid splitter 4401.

Figure 18:
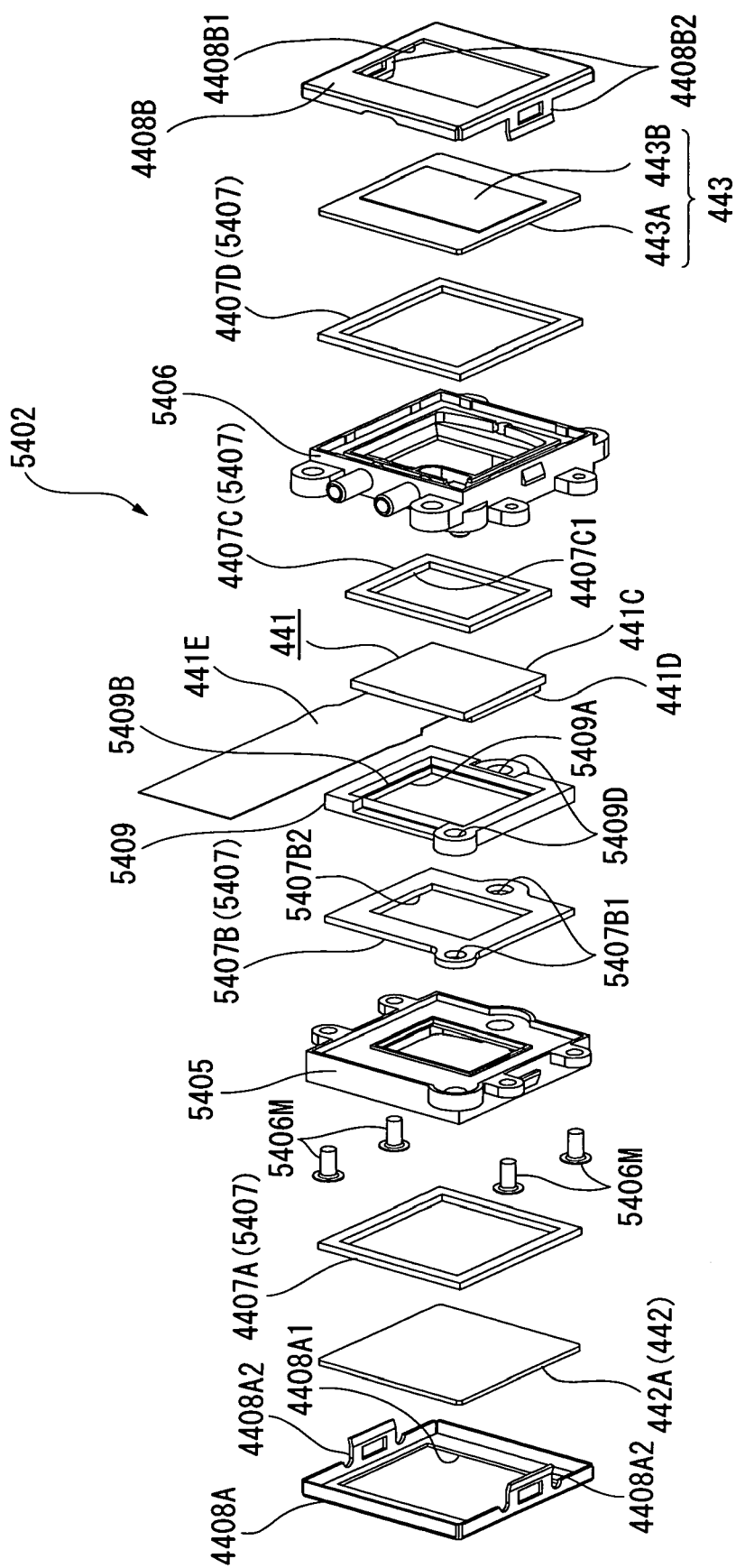
FIG. 18 is a schematic exploded perspective view showing the structure of an optical modulator holder according to the aforesaid embodiment.

FIG. 18 is a schematic exploded perspective view showing the structure of the optical modulator holder 5402.

Like the optical modulator holders 4402 described in the first embodiment, the three optical modulator holders 5402 respectively hold the three liquid crystal panels 441, the three incident-side polarization plates 442 and the three irradiation-side polarization plates 443. Also, the optical modulator holders 5402, where the cooling fluid flows in and out, respectively cool the three liquid crystal panels 441, the three incident-side polarization plates 442 and the three irradiation-side polarization plates 443 by the cooling fluid. Since the optical modulator holders 5402 have the same structure, only one of the optical modulator holders 5402 will be depicted in the following description. As shown in FIG. 18, the optical modulator holder 5402 includes, in addition to the pair of polarization plate fixers 4408A and 4408B described in the first embodiment, a pair of frame members 5405 and 5406, four elastic members 5407, and the middle frame 5409 as a support frame.

Figure 19A:
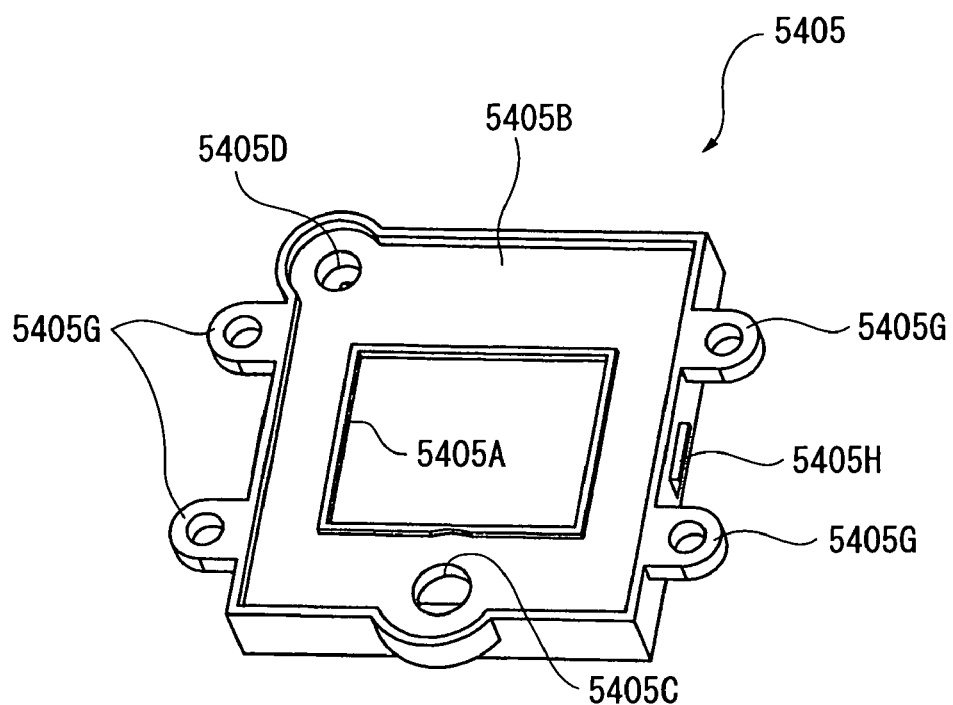
FIGS. 19A and 19B are schematic illustrations each showing the structure of a frame member according to the aforesaid embodiment.
Figure 19B:
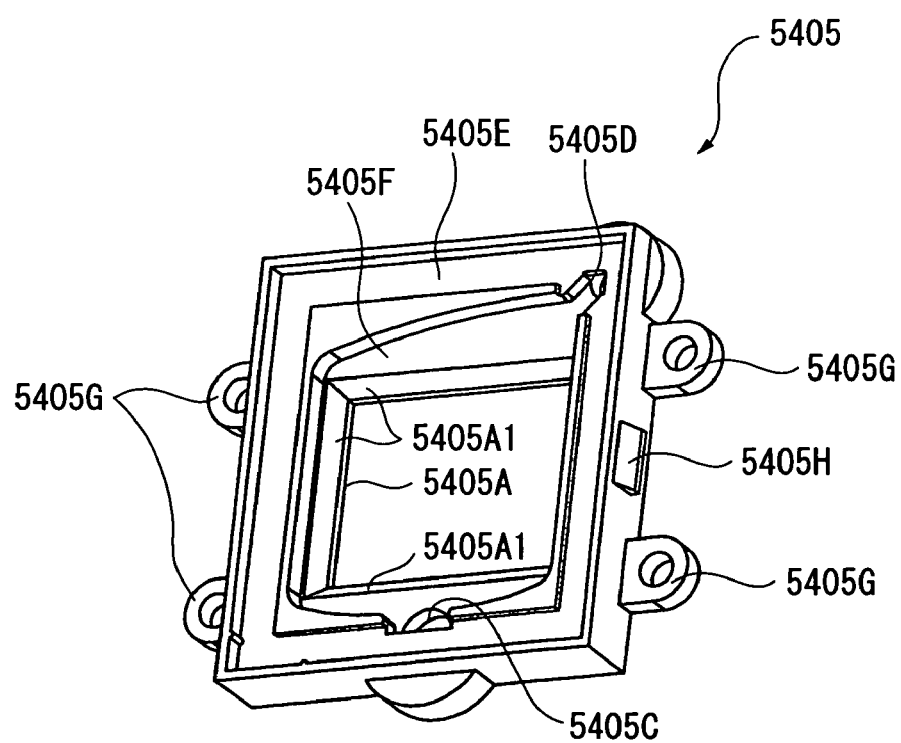

FIGS. 19A and 19B are schematic illustrations each showing the structure of the frame member 5405. Specifically, FIG. 19A is a perspective view of the frame member 5405 seen from the light-irradiation side. FIG. 19B is a perspective view of the frame member 5405 seen from the light-incident side.

The frame member 5405 is arranged at the light-incident side with respect to the frame member 5406 to support the light-incident side of the liquid crystal panel 441 and support the light-irradiation side of the incident-side polarization plate 442. The configuration detail of the frame member 5405 is substantially the same as the frame member 4405 described in the first embodiment. Specifically, the frame member 5405 includes an opening 5405A (with a slanted face 5405A1), recesses 5405B, 5405E and 5405F, insert holes 5405C and 5405D as projection insert holes, connecting portions 5405G and hooks 5405H, which correspond to the opening 4405A (with the slanted face 4405A1), the recesses 4405B, 4405E and 4405F, the insert holes 4405C and 4405D, the connecting portions 4405G and the hooks 4405H of the frame member 4405 described in the first embodiment.

To correspond to later-described two tubular portions of the frame member 5406, there are two insert holes 5405C and 5405D. That is, one insert hole 4405D out of the two insert holes 4405D described in the first embodiment is not provided.

The recesses 5405F are formed to respectively connect to the two insert holes 5405C and 5405D at the upper and lower end edges of the opening 5405A. As for the recesses 5405F, an upper lateral wall of the recess 5405F positioned at the upper side is so curved to be closer to the opening 5405A as it extends apart from the insert hole 5405D.

According to this configuration, in the frame member 5405, like the frame member 4405 described in the first embodiment, since the recess 5405B supports the light-incident end face of the liquid crystal panel 441 through the later-described second elastic member of the elastic member 5407 and the middle frame 5409, the light-irradiation side of the opening 5405A is covered. Since the incident-side polarization plate 442 is pressed on the frame member 5405 through a later-described first elastic member of the elastic member 5407 by fixing the polarization plate fixer 4408A to the frame member 5405, the light-incident side of the opening 5405A of the frame member 5405 is sealed. The light-incident side and the light-irradiation side of the opening 5405A of the frame member 5405 are thus covered, so that a cooling chamber R3 (see FIG. 22 or 23) for sealing the cooling fluid therein is formed inside the frame member 5405 (in the opening 5405A, and a clearance between the recesses 5405F and the incident-side polarization plate 442).

Figure 20A:
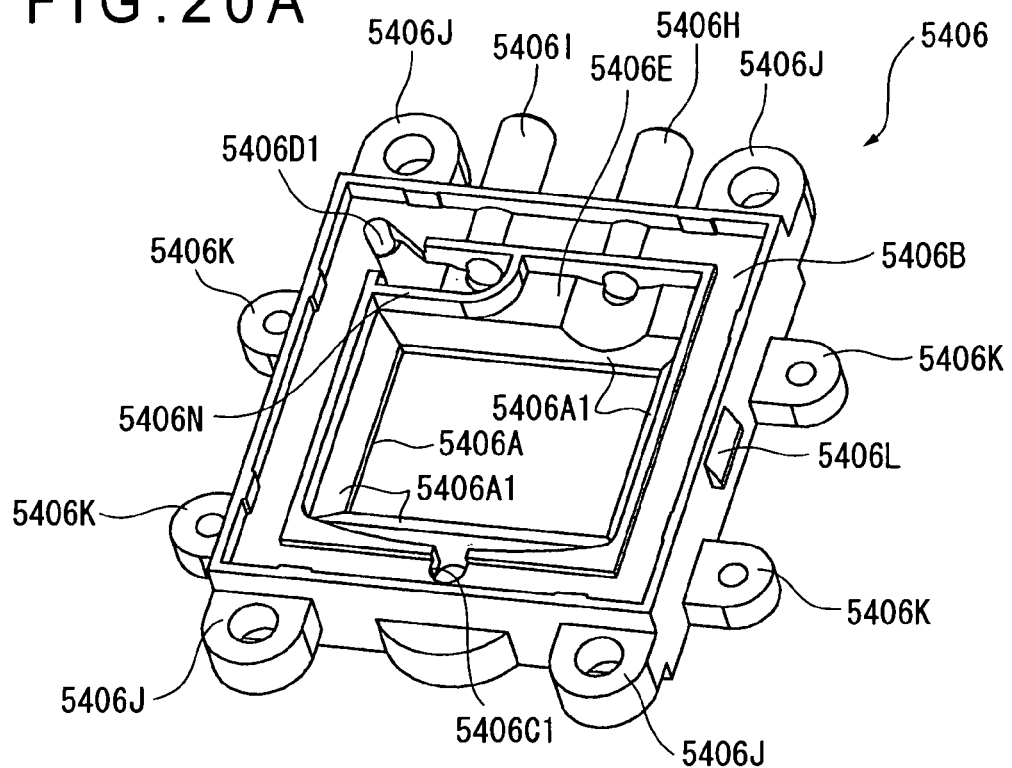
FIGS. 20A and 20B are schematic illustrations each showing the structure of another frame member according to the aforesaid embodiment.
Figure 20B:
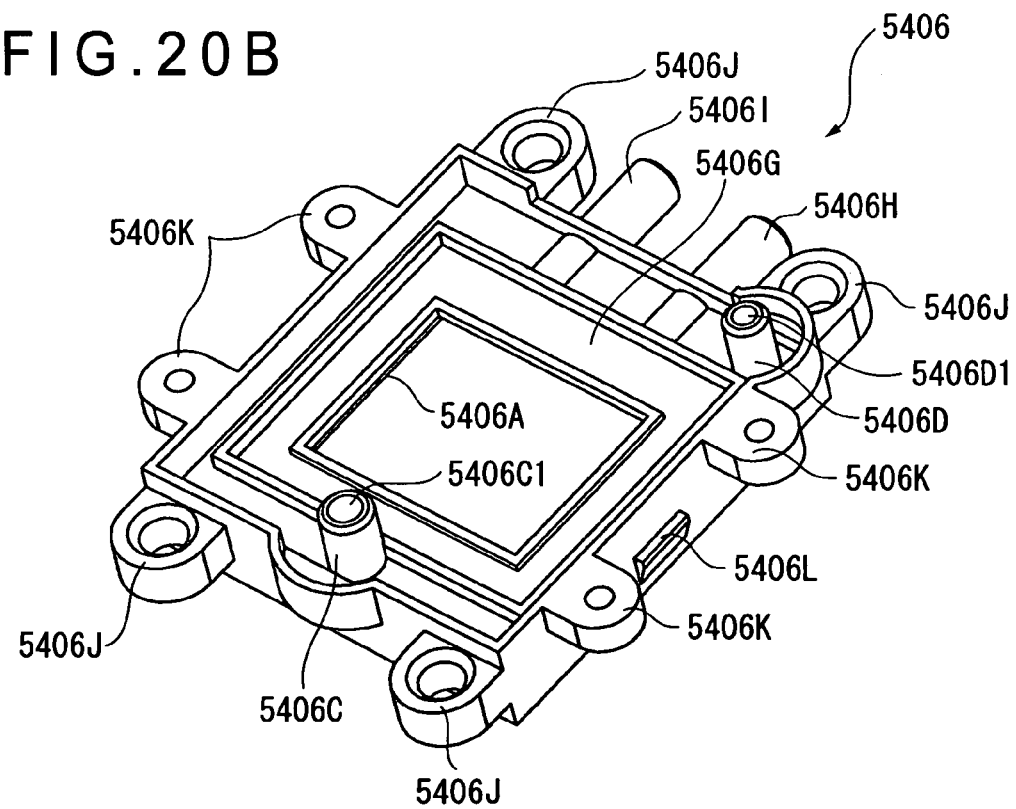

FIGS. 20A and 20B are schematic illustrations each showing the structure of the frame member 5406. Specifically, FIG. 20A is a perspective view of the frame member 5406 seen from the light-irradiation side. FIG. 20B is a perspective view of the frame member 5406 seen from the light-incident side.

The frame member 5406 and the above-described frame member 5405 sandwich the liquid crystal panel 441 therebetween through the elastic members 5407 and the middle frame 5409. The frame member 5406 also supports the irradiation-side polarization plate 443 on the face opposite to the face opposing to the frame member 5405 through the elastic member 5407. The configuration detail of the frame member 5406 is substantially the same as the frame member 4406 described in the first embodiment. Specifically, the frame member 5406 includes an opening 5406A (with a slanted face 5406A1), recesses 5406B, 5406E and 5406G, tubular portions 5406C and 5406D as projections (with holes 5406C1 and 5406D1), insert portions 5406J, connecting portions 5406K and hooks 5406L, which correspond to the opening 4406A (with the slanted face 4406A1), the recesses 4406B, 4406E and 4406G, the tubular portions 4406C and 4406D (with the holes 4406C1 and 4406D1), the insert portions 4406J, the connecting portions 4406K and the hooks 4406L of the frame member 4406 described in the first embodiment.

As shown in FIG. 20B, the tubular portions 5406C and 5406D are respectively formed at one upper corner (the left corner seen from the light-irradiation side) and the lower horizontal center in the recess 5406B. That is, the frame member 5406 is so configured that one of the two tubular portions 4406D of the frame member 4406 described in the first embodiment is not provided. When the frame member 5406 and the frame member 5405 are assembled, the two tubular portions 5406C and 5406D of the frame member 5406 are respectively inserted in the two insert holes 5405C and 5405D of the frame member 5405, thus allowing the cooling fluid to flow at the light-irradiation side of the frame member 5406 and the light-incident side of the frame member 5405 through the holes 5406C1 and 5406D1 of the tubular portions 5406C and 5406D and the two insert holes 5405C and 5405D.

Although having the shape corresponding to the tubular portion 4406C described in the first embodiment, the tubular portion 5406C does not have the projection 4406C2 of the tubular portion 4406C.

In the frame member 5406, as shown in FIGS. 20A and 20B, the inlet port 5406H penetrating through an upper lateral wall of the recess 5406E positioned at the upper side is formed at the right side of the horizontal approximate center seen from the light-irradiation side. The inlet port 5406H has the same shape as the inlet port 4406H of the first embodiment. A second end of the fluid circulator 448 connected to the cooling fluid outlet 5404B of the relay tank 5404 is connected to an outwardly-projecting end of the frame member 5406, so that the cooling fluid flown out of the relay tank 5404 through the fluid circulator 448 flows into the inside (a later-described cooling chamber R4).

Further, in the frame member 5406, as shown in FIGS. 20A and 20B, the outlet port 5406I penetrating through the upper lateral wall of the recess 5406E positioned at the upper side is formed at the left side of the horizontal approximate center seen from the light-irradiation side. The inlet port 5406H and the outlet port 5406I are substantially symmetrically arranged with respect to the horizontal approximate center. The outlet port 5406I has the same shape as the outlet port 4406I of the first embodiment. Although not shown in detail, the second end of the fluid circulator connected to the upper end of the pipe member 4472 (FIGS. 12A and 12B) of the radiator 447 is connected to an outwardly-projecting end of the frame member 5406, so that the cooling fluid inside (a later-described area R4B) is sent out to the radiator 447 through the fluid circulator.

Although not shown in detail, the cooling fluid circulator is a tubular member with the second ends thereof being split into three. The second ends are respectively connected to the outlet ports 5406I of the three optical modulator holders 5402, so that the cooling fluid flown out of the three optical modulator holders 5402 is collectively sent out to the radiator 447.

In the frame member 5406, as shown in FIG. 20A, a partition 5406N surrounding a section where the outlet port 5406I is communicated with a lateral wall of the recess 5406E and the hole 5406D1 is mounted in the recess 5406E positioned at the upper side.

According to this configuration, like the optical modulator holder 4402 described in the first embodiment, screws 5406M (FIG. 18) are screwed in the respective connecting portions 5405G and 5406K of the frame members 5405 and 5406, so that the liquid crystal panel 441 is pressed on the frame member 5405 through the middle frame 5409 and the later-described second elastic member of the elastic member 5407 as well as pressed on the frame member 5406 through the middle frame 5409 and a later-described third elastic member of the elastic member 5407. Therefore, the light-irradiation side of the opening 5405A of the frame member 5405 and the light-incident side of the opening 5406A of the frame member 5406 are sealed. Since the irradiation-side polarization plate 443 is pressed on the frame member 5406 through a later-described fourth elastic member of the elastic member 5407 by fixing the polarization plate fixer 4408B to the frame member 5406, the light-irradiation side of the opening 5406A of the frame member 5406 is sealed. The light-incident side and the light-irradiation side of the opening 5406A of the frame member 5406 are thus covered, so that the cooling chamber R4 (see FIG. 22 or 23) for sealing the cooling fluid therein is formed inside the frame member 5406 (in the opening 5406A, and a clearance between the recesses 5406E and the irradiation-side polarization plate 443). The cooling chamber R4 is divided by the partition 5406N into an area R4A where the inlet port 5406H is communicated with the hole 5406C1 of the tubular portion 5406C (see FIGS. 22 and 23) and an area R4B where the outlet port 5406I is communicated with the hole 5406D1 of the tubular portion 5406D (see FIGS. 22 and 23).

The four elastic members 5407 include, in addition to the first elastic member 4407A, the third elastic member 4407C and the fourth elastic member 4407D described in the first embodiment, the second elastic member 5407B. Like the elastic members 4407 described in the first embodiment, the elastic members 5407 may be made of elastic silicone rubber, butyl rubber or fluorocarbon rubber with low water permeability.

The second elastic member 5407B formed in the same shape as the second elastic member 4407B described in the first embodiment has an opening 5407B2 corresponding to the opening 4407B2. It is different only in that the two insert holes 5407B1 are formed respectively corresponding to the two tubular portions 5406C and 5406D of the frame member 5406.

The middle frame 5409 has the same shape as the middle frame 4409 described in the first embodiment except only that two insert holes 5409D are formed respectively corresponding to the two tubular portions 5406C and 5406D of the frame member 5406. That is, as shown in FIG. 18, the middle frame 5409 has an opening 5409A and a step 5409B (with a clearance 5409C shown in FIG. 22 or 23), which correspond to the opening 4409A and the step 4409B (with the clearance 4409C) of the middle frame 4409. In a condition that the pair of frame members 5405 and 5406 and the middle frame 5409 are assembled, like the elastic member housings 4407E described in the first embodiment, the open parts of the recesses 5405B and 5406G of the pair of frame members 5405 and 5406 are respectively covered by the light-incident end faces of the middle frame 5409 and the opposing board 441D of the liquid crystal panel 441, and, the light-irradiation end faces of the middle frame 5409 and the drive board 441C of the liquid crystal panel 441, so that elastic member housings 5407E for accommodating the second elastic member 5407B and the third elastic member 4407C of the elastic members 5407 therein are formed (see FIG. 22 or FIG. 23).

As described above, the cooling fluid circulates in the flow channel from the main tank 445 (FIGS. 4A and 4B) to the fluid feeder 446 (FIG. 3) to the relay tank 5404 (FIG. 16) to the each optical modulator holder 5402 (FIG. 16 or 17) to the radiator 447 (FIGS. 12A and 12B) to the main tank 445 (FIGS. 4A and 4B) through the plurality of fluid circulators 448.

Next, the cooling mechanism for the liquid crystal panels 441, the incident-side polarization plates 442 and the irradiation-side polarization plates 443 will be described.

Figure 21:
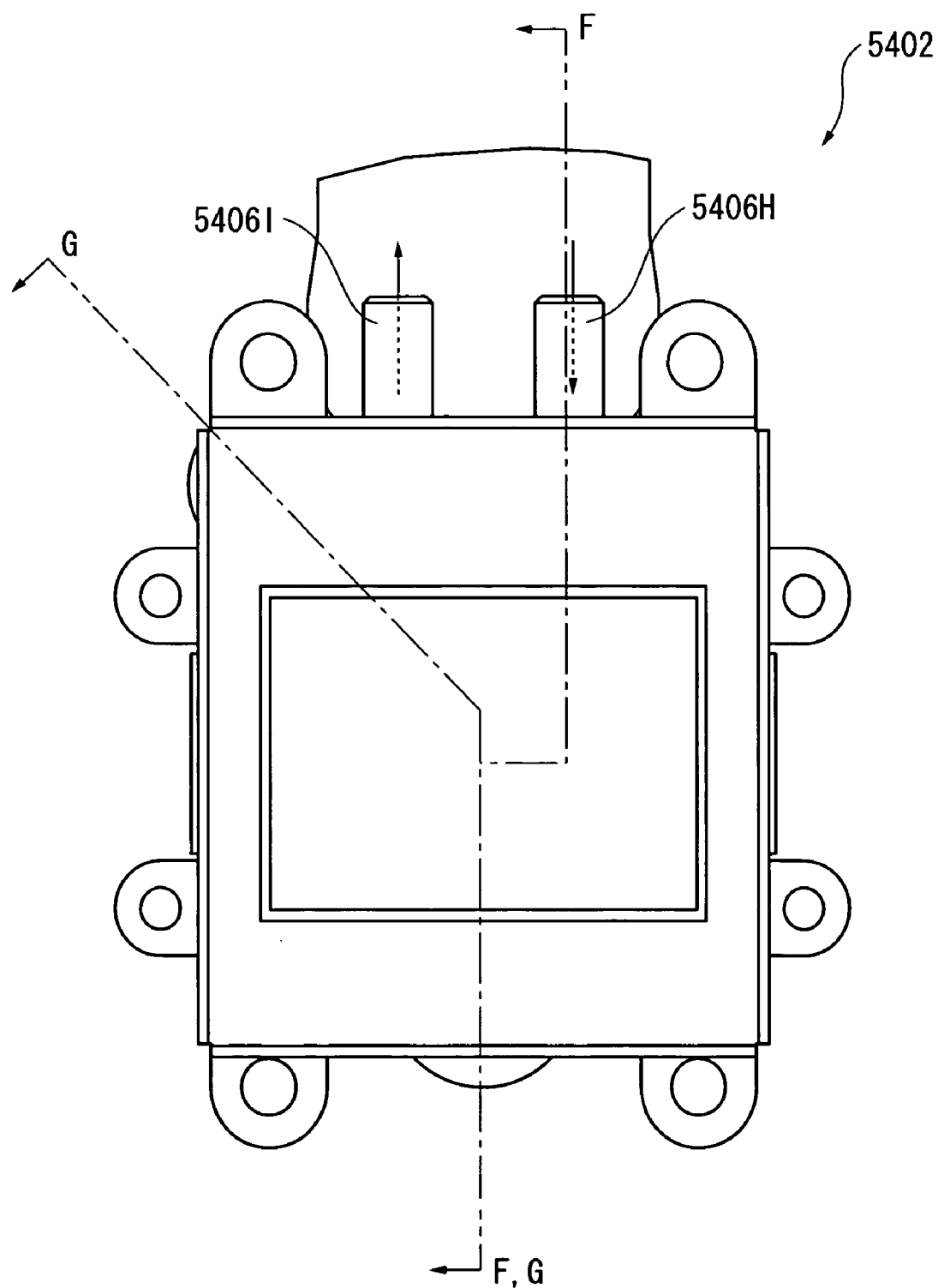
FIG. 21 is an illustration showing a cooling mechanism for a liquid crystal panel, an incident-side polarization plate and an irradiation-side polarization plate according to the aforesaid embodiment.
Figure 22:
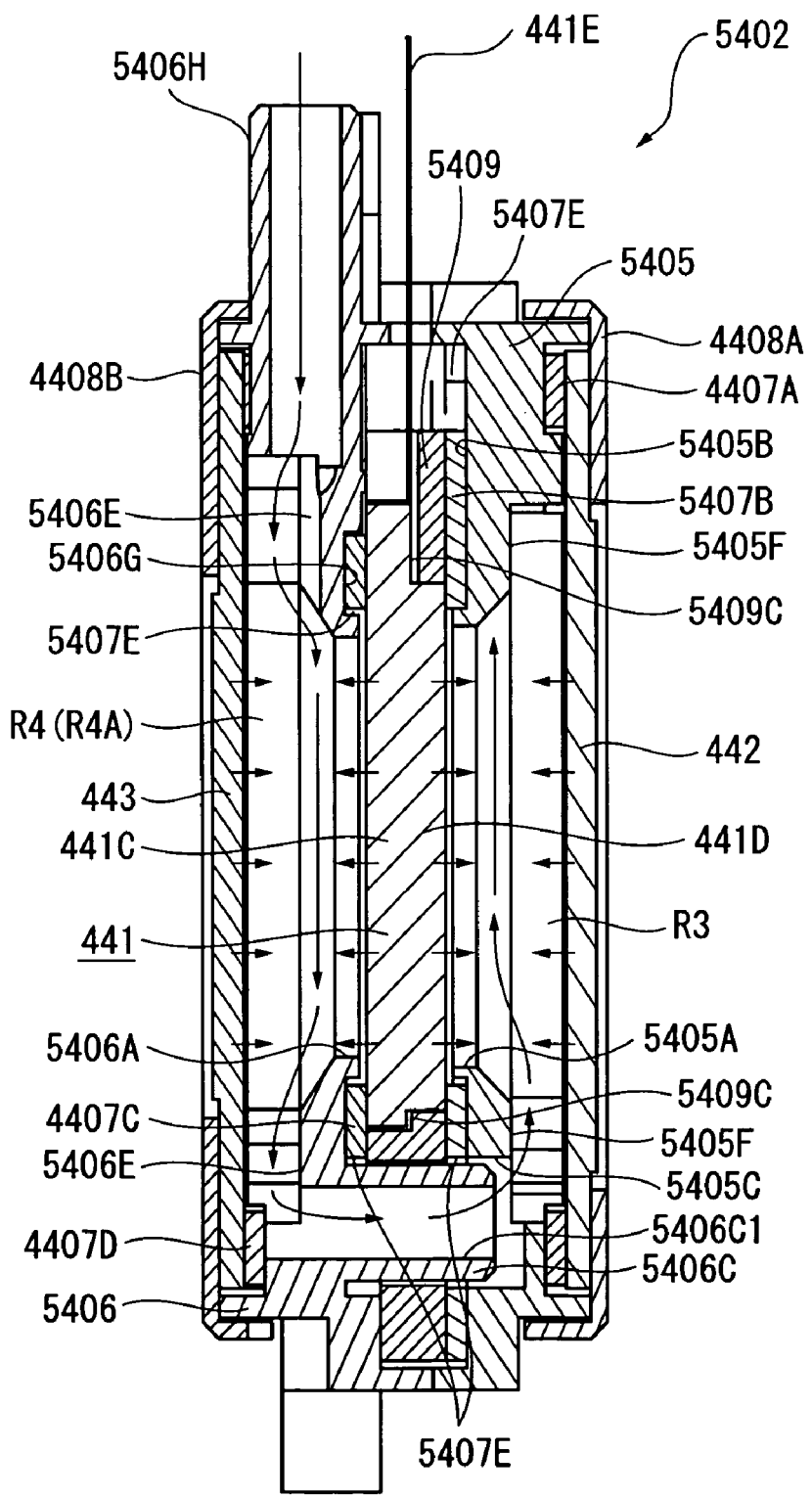
FIG. 22 is an illustration showing the cooling mechanism for the liquid crystal panel, the incident-side polarization plate and the irradiation-side polarization plate according to the aforesaid embodiment.
Figure 23:
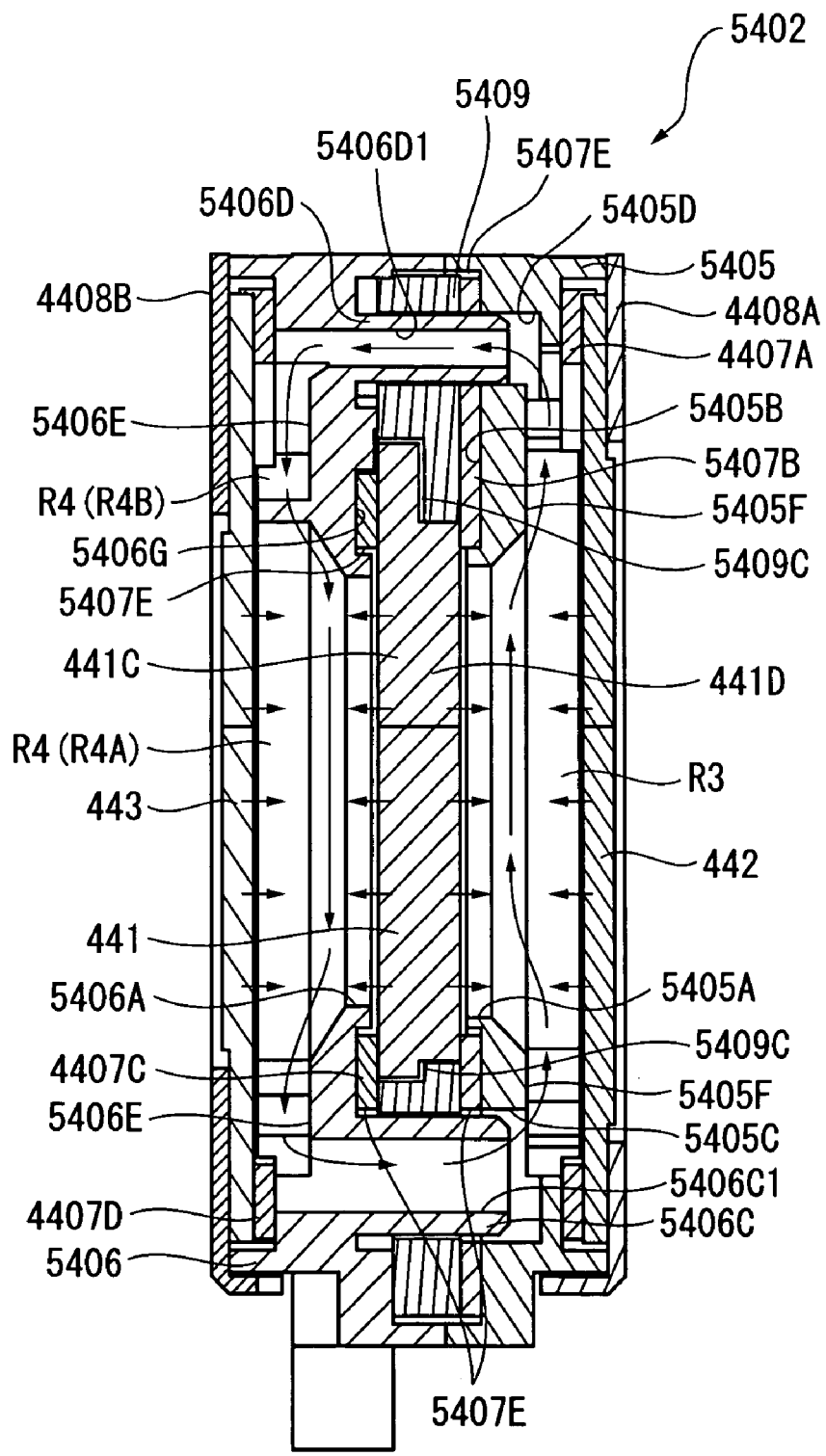
FIG. 23 is an illustration showing the cooling mechanism for the liquid crystal panel, the incident-side polarization plate and the irradiation-side polarization plate according to the aforesaid embodiment.

FIGS. 21 to 23 are illustrations showing a cooling mechanism for the liquid crystal panels 441, the incident-side polarization plates 442 and the irradiation-side polarization plates 443. Specifically, FIG. 21 is a plan view of the optical modulator holder 5402 seen from the light-irradiation side. FIG. 22 is a cross section taken along a line F—F in FIG. 21. FIG. 23 is a cross section taken along a line G—G in FIG. 22.

When the fluid feeder 446 is driven, the cooling fluid in the main tank 445 is taken in the fluid feeder 446, and sent out of the fluid feeder 446 to the relay tank 5404 through the fluid circulators 448.

The cooling fluid taken in the relay tank 5404 flows out of the cooling fluid outlets 5404B of the relay tank 5404, and flows from the inlet ports 5406H of the optical modulator holders 5402 into the areas R4A (FIG. 22 or 23) of the cooling chambers R4 of the optical modulator holders 5402 through the fluid circulators 448 as shown in FIG. 21 or 22.

The heat generated in the drive board 441C of the liquid crystal panel 441 and the irradiation-side polarization plate 443 by the light beam irradiated from the light source device 411 is transmitted to the cooling fluid in the area R4A of the cooling chamber R4.

As shown in FIG. 22, the heat transmitted to the cooling fluid in the area R4A of the cooling chamber R4 moves downward in FIG. 22 along with the flow of the cooling fluid. The heat moved downward is guided to the horizontal approximate center by a lower lateral wall of the lower recess 5406E (FIG. 20A) of the frame member 5406 along with the flow of the cooling fluid. As shown in FIG. 22, the heat guided to the horizontal approximate center moves into the cooling chamber R3 through the tubular portion 5406C and the insert hole 5405C connected to the tubular portion 5406C along with the flow of the cooling fluid.

The heat generated in the opposing board 441D of the liquid crystal panel 441 and the incident-side polarization plate 442 by the light beam irradiated from the light source device 411 is transmitted to the cooling fluid in the cooling chamber R3.

As shown in FIG. 22, the heat transmitted to the cooling fluid in the cooling chamber R3 moves upward in FIG. 22 together with the heat moved from the cooling chamber R4 along with the flow of the cooling fluid. The heat moved upward is guided to one upper corner (the right corner seen from the light-incident side) by a lateral wall of the upper recess 5405F (FIG. 19B) of the frame member 5405 along with the flow of the cooling fluid. As shown in FIG. 23, the heat guided to the upper corner moves into the area R4B of the cooling chamber R4 through the insert hole 5405D and the tubular portion 5406D connected to the insert hole 5405D, and moves to the outside from the area R4B through the outlet port 5406I along with the flow of the cooling fluid.

As in the first embodiment, the heat moved to the outside of the optical modulator holder 5402 through the outlet port 5406I moves from the each optical modulator holder 5402 to the radiator 447 through the not-shown fluid circulators along with the flow of the cooling fluid to be released by the radiator 447.

The cooling fluid cooled by the radiator 447 moves from the radiator 447 to the main tank 445 to the fluid feeder 446 to the relay tank 5404, and moves to the area R4A of the cooling chamber R4 again.

As in the first embodiment, the sirocco fan 31 of the cooling unit 3 sends the cooling air to the outer face of the optical modulator holder 5402 and between the optical modulator holder 5402 and the support member 4403 to cool the light-incident end face of the incident-side polarization plate 442 and the light-irradiation end face of the irradiation-side polarization plate 443.

According to the second embodiment, compared with the first embodiment, since the cooling chambers R3 and R4 are communicated and connected by the two tubular portions 5406C and 5406D and the two insert holes 5405C and 5405D, the pair of frame members 5405 and 5406 can be improved in the workability and easily manufactured, thereby reducing the manufacturing cost in comparison with the configuration described in the first embodiment in which the cooling chambers R1 and R2 are communicated and connected by the three tubular portions 4406C and 4406D and the three insert holes 4405C and 4405D. Since the second elastic member 5407B and the middle frame 5409 respectively have the two insert holes 5407B1 and 5409D corresponding to the two tubular portions 5406C and 5406D, the second elastic member 5407B and the middle frame 5409 can be improved in the workability and easily manufactured, thereby reducing the manufacturing cost in comparison with the configuration described in the first embodiment in which the second elastic member 4407B and the middle frame 4409 respectively have the three insert holes 4407B1 and 4409D.

Since the cooling chambers R3 and R4 are communicated and connected at two sections, i.e., the two tubular portions 5406C and 5406D and the two insert holes 5405C and 5405D, the leakage of the cooling fluid flowing between the cooling chambers R3 and R4 can be reduced and the leakage protection can be secured in comparison with the configuration described in the first embodiment in which the cooling chambers R1 and R2 are communicated and connected at three sections.

Since the inlet port 5406H and the outlet port 5406I are formed at the upper end of the frame member 5406, the work for connecting the fluid circulators 448 to the inlet port 5406H and the outlet port 5406I can all be performed from one direction (i.e., the upper direction), the connecting work can be further facilitated.

The cooling fluid flown into the area R4A of the cooling chamber R4 through the inlet port 5406H and flown from the upper side to the lower side in the area R4A is flown into the cooling chamber R3 by the tubular portion 5406C and the insert hole 5405C. The cooling fluid flown from the lower side to the upper side in the cooling chamber R3 is flown into the area R4B of the cooling chamber R4 and flown out through the outlet port 5406I by the tubular portion 5406D and the insert hole 5405D. Therefore, even though the inlet port 5406H and the outlet port 5406I are formed at the upper end of the frame member 5406, the cooling fluid can be surely flown to both of the cooling chambers R3 and R4.

[Third Embodiment]

A third embodiment of the present invention will be described with reference to the attached drawings.

In the following description, the components same as those in the first and second embodiments are indicated by the same reference symbols or numerals for omitting or simplifying the detailed description thereof.

According to the first embodiment, in the optical device body 440, the inlet port 4406H and the outlet port 4406I of the optical modulator holder 4402 are respectively formed at the opposing positions on the upper and lower ends of the frame member 4406. The middle frame 4409 and the second elastic member 4407B respectively have the three insert holes 4409D and 4407B1 corresponding to the three tubular portions 4406C and 4406D.

On the other hand, according to the third embodiment, in an optical device body 640, an inlet port 6406H and an outlet port 6405I of an optical modulator holder 6402 are respectively formed at the upper end of a frame member 6406 and the upper end of a frame member 6405. The frame member 6406 has one tubular portion 6406C. Correspondingly, a middle frame 6409 and a second elastic member 6407B respectively have only one insert hole 6409D and 6407B1. The configuration other than the optical device body 640 is the same as in the first embodiment.

Figure 24:
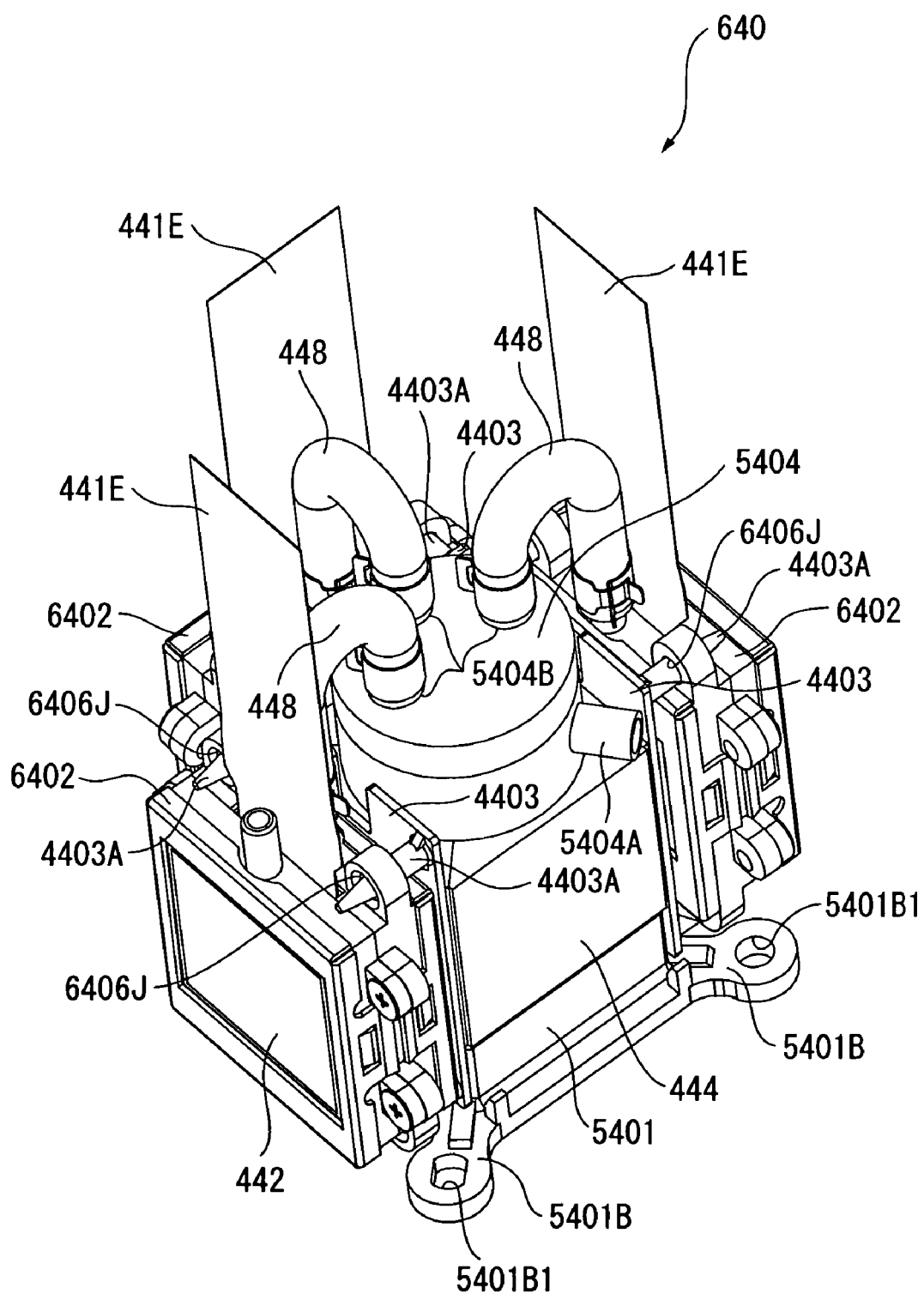
FIG. 24 is a schematic perspective view showing the structure of an optical device body according to a third embodiment.

Specifically, FIG. 24 is a schematic perspective view showing the structure of the optical device body 640 according to the third embodiment.

The optical device body 640 includes, in addition to the liquid crystal panels 441, the incident-side polarization plates 442, the irradiation-side polarization plates 443, the cross dichroic prism 444 and the support member 4403 described in the first embodiment and the relay tank 5404 and the prism fixing plate 5401 described in the second embodiment, three optical modulator holders 6402.

Figure 25:
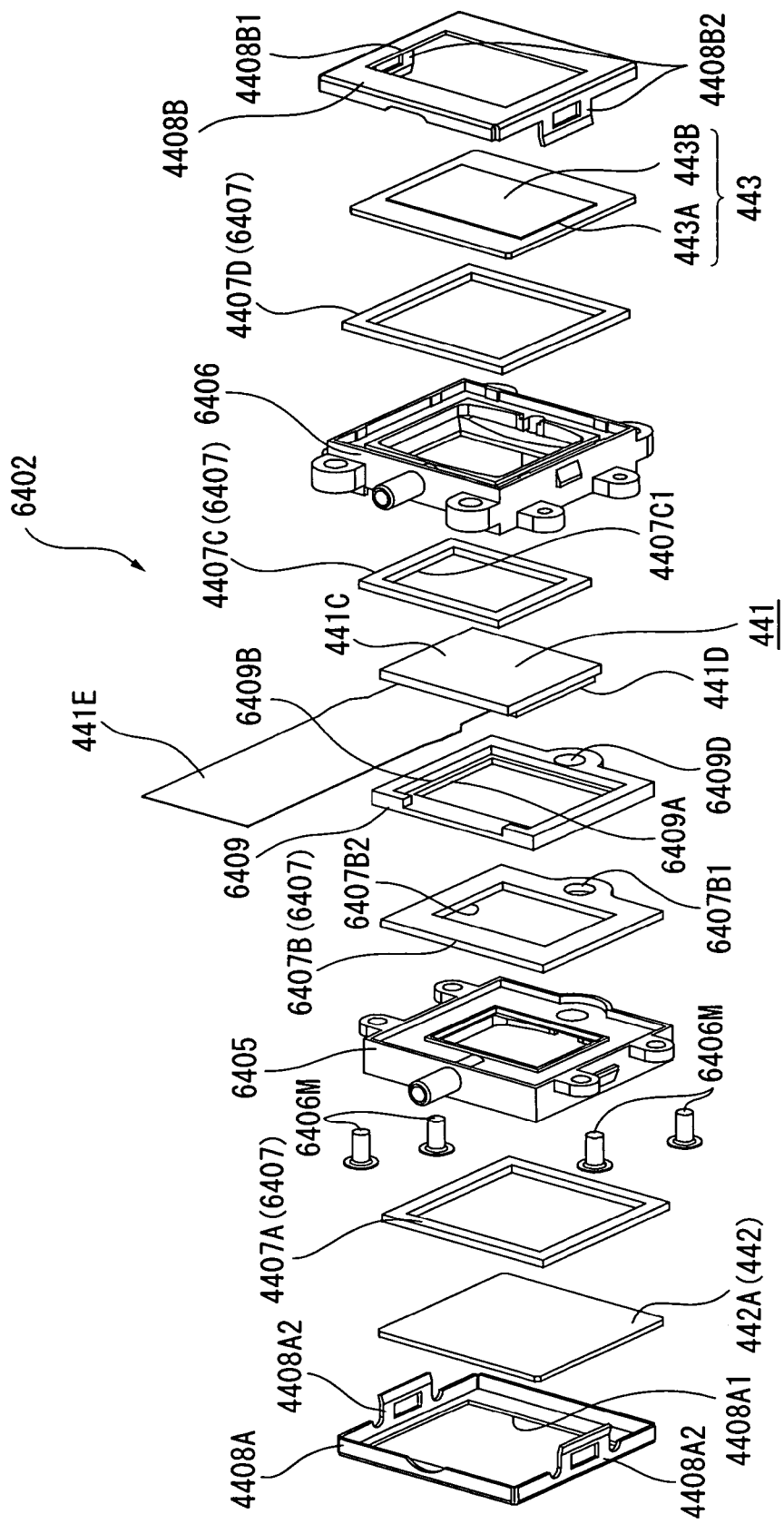
FIG. 25 is a schematic exploded perspective view showing the structure of an optical modulator holder according to the aforesaid embodiment.

FIG. 25 is a schematic exploded perspective view showing the structure of the optical modulator holder 6402.

Like the optical modulator holders 4402 described in the first embodiment, the three optical modulator holders 6402 respectively hold the three liquid crystal panels 441, the three incident-side polarization plates 442 and the three irradiation-side polarization plates 443. Also, the optical modulator holders 6402, where the cooling fluid flows in and out, respectively cool the three liquid crystal panels 441, the three incident-side polarization plates 442 and the three irradiation-side polarization plates 443 by the cooling fluid. Since the optical modulator holders 6402 have the same structure, only one of the optical modulator holders 6402 will be depicted in the following description. As shown in FIG. 25, the optical modulator holder 6402 includes, in addition to the pair of polarization plate fixers 4408A and 4408B described in the first embodiment, a pair of frame members 6405 and 6406, four elastic members 6407, and the middle frame 6409 as a support frame.

Figure 26A:
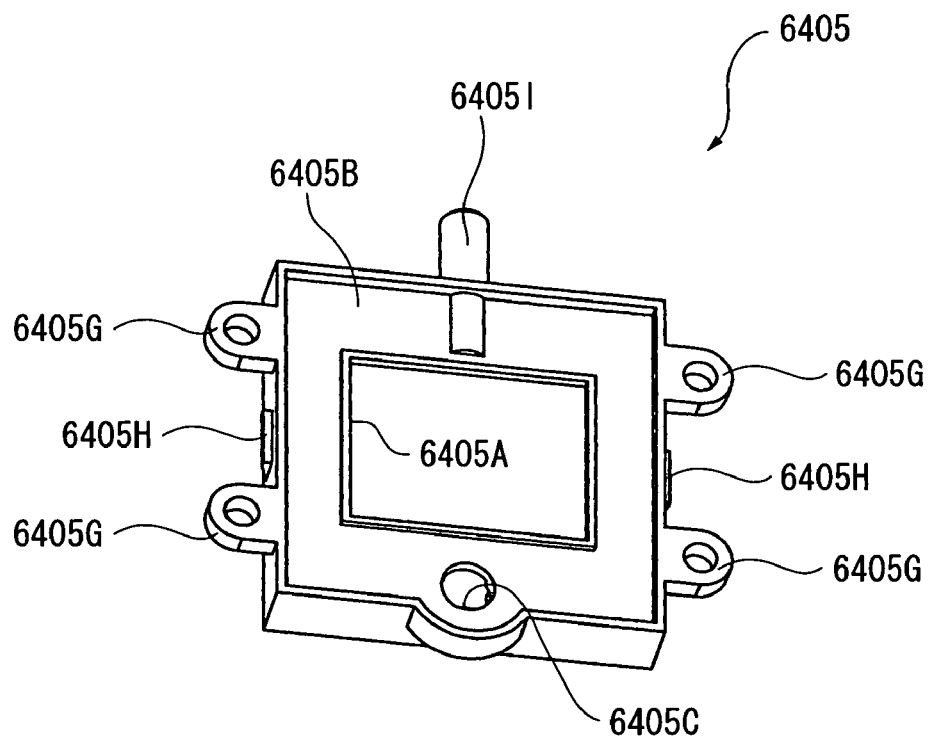
FIGS. 26A and 26B are schematic illustrations each showing the structure of a frame member according to the aforesaid embodiment.
Figure 26B:
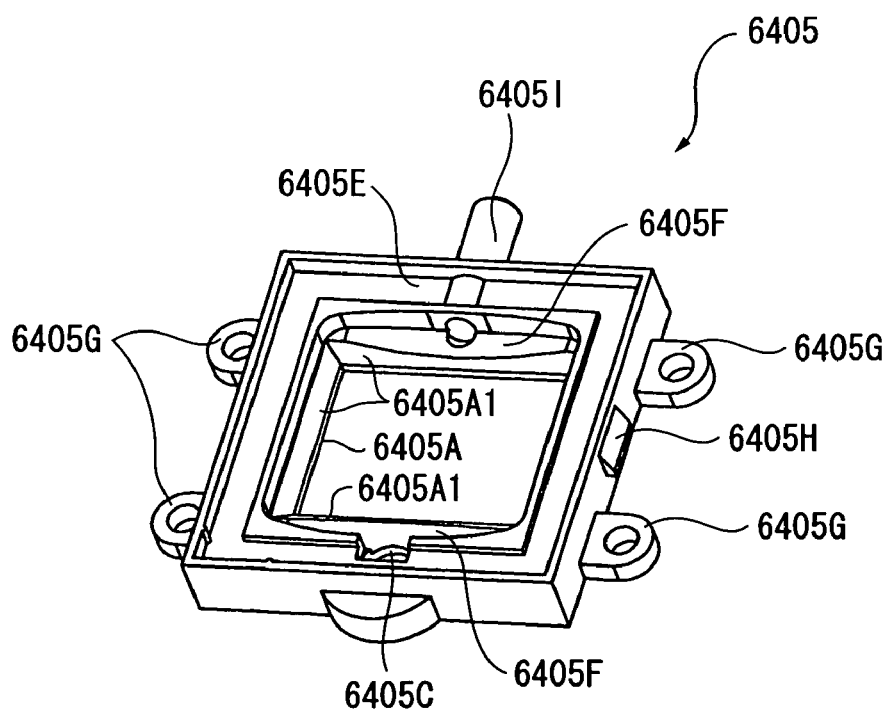

FIGS. 26A and 26B are schematic illustrations each showing the structure of the frame member 6405. Specifically, FIG. 26A is a perspective view of the frame member 6405 seen from the light-irradiation side. FIG. 26B is a perspective view of the frame member 6405 seen from the light-incident side.

The frame member 6405 is arranged at the light-incident side with respect to the frame member 6406 to support the light-incident side of the liquid crystal panel 441 and support the light-irradiation side of the incident-side polarization plate 442. The configuration detail of the frame member 6405 is substantially the same as the frame member 4405 described in the first embodiment. Specifically, the frame member 6405 includes an opening 6405A (with a slanted face 6405A1), recesses 6405B, 6405E and 6405F, an insert hole 6405C as a projection insert hole, connecting portions 6405G and hooks 6405H, which correspond to the opening 4405A (with the slanted face 4405A1), the recesses 4405B, 4405E and 4405F, the insert hole 4405C, the connecting portions 4405G and the hooks 4405H of the frame member 4405 described in the first embodiment.

To correspond to later-described one tubular portion of the frame member 6406, there is only one insert hole 6405C. That is, the two insert holes 4405D described in the first embodiment are not provided.

The recess 6405F positioned at the upper side is so curved that the horizontal approximate center thereof is dented to the light-irradiation side. An upper lateral wall of the recess 6405F is so curved that the horizontal approximate center thereof is dented upward.

In the frame member 6405, as shown in FIGS. 26A and 26B, an outlet port 6405I penetrating through the upper lateral wall of the recess 6405F positioned at the upper side is formed at the upper horizontal approximate center. The outlet port 6405I has the same shape as the outlet port 4406I of the first embodiment. In the outlet port 6405I, like the outlet port 5406I of the second embodiment, although not shown in detail, the second end of the fluid circulator connected to the upper end of the pipe member 4472 (FIGS. 12A and 12B) of the radiator 447 is connected to an outwardly-projecting end of the frame member 6405, so that the cooling fluid inside (a later-described cooling chamber R5) is sent out to the radiator 447 through the fluid circulator.

Like the fluid circulator described in the second embodiment, the cooling fluid circulator is a tubular member with the second ends thereof being split into three. The second ends are respectively connected to the outlet ports 6405I of the three optical modulator holders 6402, so that the cooling fluid flown out of the three optical modulator holders 6402 is collectively sent out to the radiator 447.

According to this configuration, in the frame member 6405, like the frame member 4405 described in the first embodiment, since the recess 6405B supports the light-incident end face of the liquid crystal panel 441 through the later-described second elastic member of the elastic member 6407 and the middle frame 6409, the light-irradiation side of the opening 6405A is covered. Since the incident-side polarization plate 442 is pressed on the frame member 6405 through a later-described first elastic member of the elastic member 6407 by fixing the polarization plate fixer 4408A to the frame member 6405, the light-incident side of the opening 6405A of the frame member 6405 is sealed. The light-incident side and the light-irradiation side of the opening 6405A of the frame member 6405 are thus covered, so that a cooling chamber R5 (see FIG. 29) for sealing the cooling fluid therein is formed inside the frame member 6405 (in the opening 6405A, and a clearance between the recesses 6405F and the incident-side polarization plate 442).

Figure 27A:
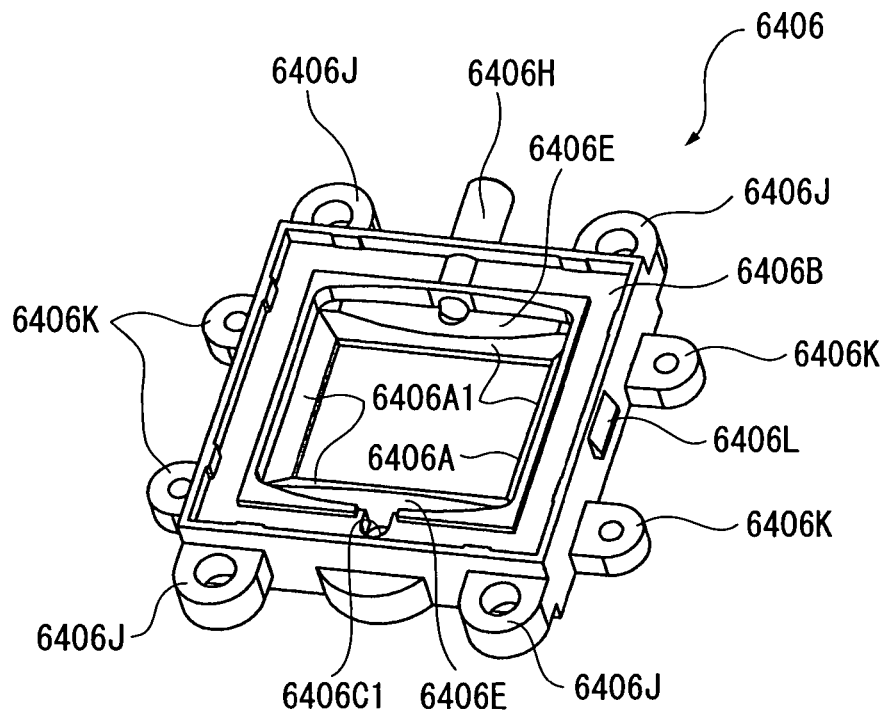
FIGS. 27A and 27B are schematic illustrations each showing the structure of another frame member according to the aforesaid embodiment.
Figure 27B:
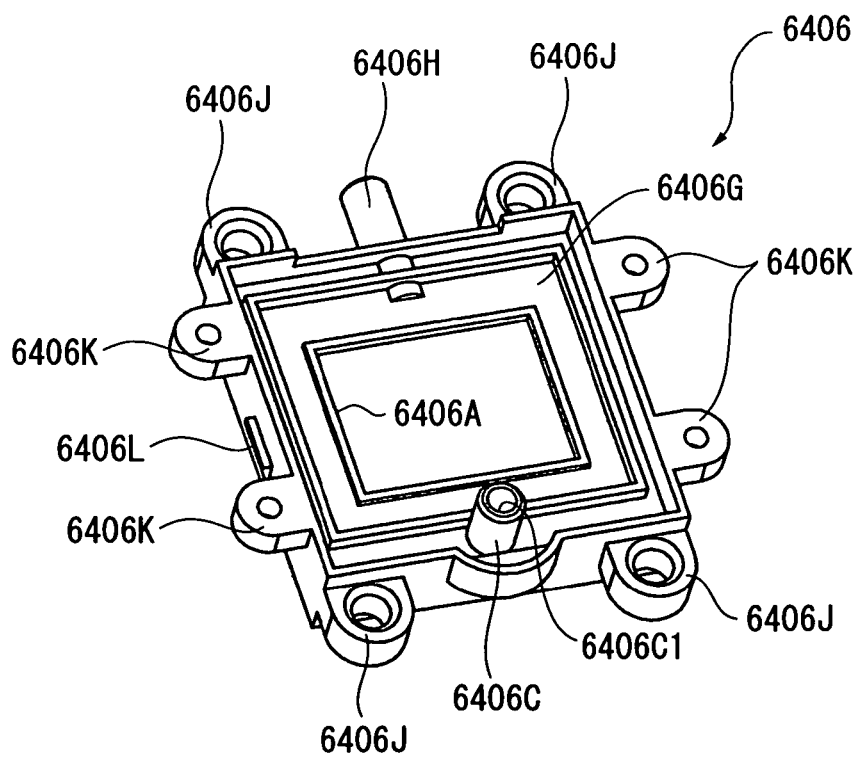

FIGS. 27A and 27B are schematic illustrations each showing the structure of the frame member 6406. Specifically, FIG. 27A is a perspective view of the frame member 6406 seen from the light-irradiation side. FIG. 27B is a perspective view of the frame member 6406 seen from the light-incident side.

The frame member 6406 and the above-described frame member 6405 sandwich the liquid crystal panel 441 therebetween through the elastic members 6407 and the middle frame 6409. The frame member 6406 also supports the irradiation-side polarization plate 443 on the face opposite to the face opposing to the frame member 6405 through the elastic member 6407. The configuration detail of the frame member 6406 is substantially the same as the frame member 4406 described in the first embodiment. Specifically, the frame member 6406 includes an opening 6406A (with a slanted face 6406A1), recesses 6406B, 6406E and 6406G, the tubular portion 6406C as a projection (with a hole 6406C1), insert portions 6406J, connecting portions 6406K and hooks 6406L, which correspond to the opening 4406A (with the slanted face 4406A1), the recesses 4406B, 4406E and 4406G, the tubular portion 4406C (with the hole 4406C1), the insert portions 4406J, the connecting portions 4406K and the hooks 4406L of the frame member 4406 described in the first embodiment.

As shown in FIG. 27B, the tubular portion 6406C is formed at the lower horizontal approximate center in the recess 6406B. That is, the frame member 6406 is so configured that the two tubular portions 4406D of the frame member 4406 described in the first embodiment is not provided. When the frame member 6406 and the frame member 6405 are assembled, the tubular portion 6406C of the frame member 6406 is inserted in the insert hole 6405C, thus allowing the cooling fluid to flow at the light-irradiation side of the frame member 6406 and the light-incident side of the frame member 6405 through the hole 6406C1 of the tubular portion 6406C and the insert hole 6405C.

Although having the shape corresponding to the tubular portion 4406C described in the first embodiment, the tubular portion 6406C does not have the projection 4406C2 of the tubular portion 4406C.

As shown in FIG. 27A, the recess 6406E positioned at the upper side is so curved that the horizontal approximate center thereof is dented to the light-incident side. An upper lateral wall of the recess 6406E is so curved that the horizontal approximate center thereof is dented upward.

In the frame member 6406, as shown in FIGS. 27A and 27B, an inlet port 6406H penetrating through the upper lateral wall of the recess 6406E positioned at the upper side is formed at the upper horizontal approximate center. The inlet port 6406H has the same shape as the inlet port 4406H of the first embodiment. The inlet port 6406H has the same shape as the inlet port 5406H of the second embodiment. A second end of the fluid circulator 448 connected to the cooing fluid outlet 5404B of the relay tank 5404 is connected to an outwardly-projecting end of the frame member 6406, so that the cooling fluid flown out of the relay tank 5404 through the fluid circulator 448 flows into the inside (a later-described cooling chamber R6).

According to this configuration, like the optical modulator holder 4402 described in the first embodiment, screws 6406M (FIG. 25) are screwed in the respective connecting portions 6405G and 6406K of the frame members 6405 and 6406, so that the liquid crystal panel 441 is pressed on the frame member 6405 through the middle frame 6409 and the later-described second elastic member of the elastic member 6407 as well as pressed on the frame member 6406 through the middle frame 6409 and a later-described third elastic member of the elastic member 6407. Therefore, the light-irradiation side of the opening 6405A of the frame member 6405 and the light-incident side of the opening 6406A of the frame member 6406 are sealed. Since the irradiation-side polarization plate 443 is pressed on the frame member 6406 through a later-described fourth elastic member of the elastic member 6407 by fixing the polarization plate fixer 4408B to the frame member 6406, the light-irradiation side of the opening 6406A of the frame member 6406 is sealed. The light-incident side and the light-irradiation side of the opening 6406A of the frame member 6406 are thus covered, so that a cooling chamber R6 (see FIG. 29) for sealing the cooling fluid therein is formed inside the frame member 6406 (in the opening 6406A, and a clearance between the recesses 6406E and the irradiation-side polarization plate 443).

The four elastic members 6407 include, in addition to the first elastic member 4407A, the third elastic member 4407C and the fourth elastic member 4407D described in the first embodiment, the second elastic member 6407B. Like the elastic members 4407 described in the first embodiment, the elastic members 6407 may be made of elastic silicone rubber, butyl rubber or fluorocarbon rubber with low water permeability.

The second elastic member 6407B formed in the same shape as the second elastic member 4407B described in the first embodiment has an opening 6407B2 corresponding to the opening 4407B2. It is different only in that only one insert hole 6407B1 is formed corresponding to the tubular portion 6406C of the frame member 6406.

The middle frame 6409 has the same shape as the middle frame 4409 described in the first embodiment except only that only one insert hole 6409D is formed corresponding to the tubular portion 6406C of the frame member 6406. That is, as shown in FIG. 25, the middle frame 6409 has an opening 6409A and a step 6409B (with a clearance 6409C shown in FIG. 29), which correspond to the opening 4409A and the step 4409B (with the clearance 4409C) of the middle frame 4409. In a condition that the pair of frame members 6405 and 6406 and the middle frame 6409 are assembled, like the elastic member housing 4407E described in the first embodiment, the open parts of respective recesses 6405B and 6406G of the pair of frame members 6405 and 6406 are respectively covered by the light-incident end faces of the middle frame 6409 and the opposing board 441D of the liquid crystal panel 441, and, the light-irradiation end faces of the middle frame 6409 and the drive board 441C of the liquid crystal panel 441, so that elastic member housings 6407E for accommodating the second elastic member 6407B and the third elastic member 4407C of the elastic members 6407 therein are formed (see FIG. 29).

As described above, the cooling fluid circulates in the flow channel from the main tank 445 (FIGS. 4A and 4B) to the fluid feeder 446 (FIG. 3) to the relay tank 5404 (FIG. 24) to the each optical modulator holder 6402 (FIG. 24) to the radiator 447 (FIGS. 12A and 12B) to the main tank 445 (FIGS. 4A and 4B) through the plurality of fluid circulators 448 as in the second embodiment.

Next, the cooling mechanism for the liquid crystal panels 441, the incident-side polarization plates 442 and the irradiation-side polarization plates 443 will be described.

Figure 28:
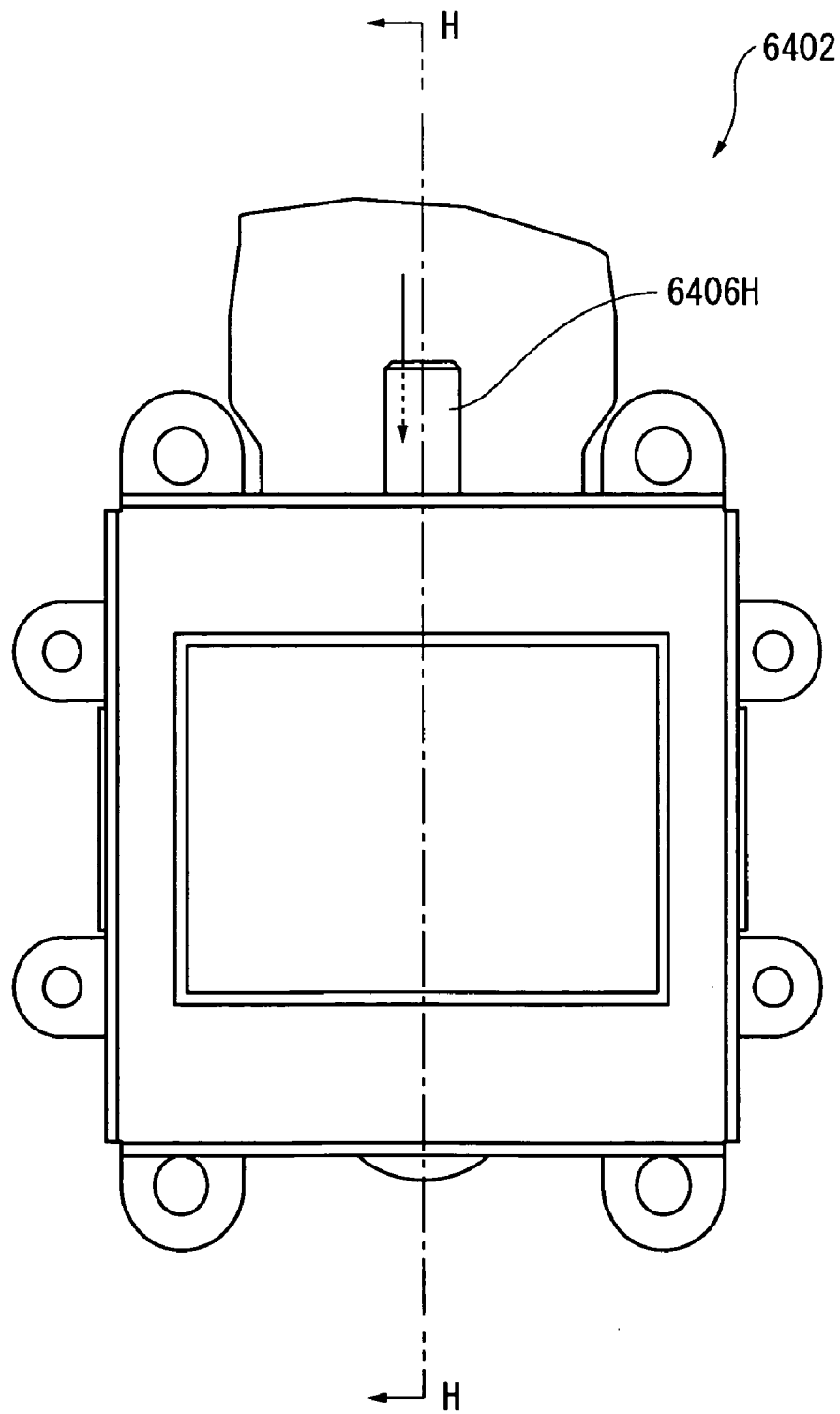
FIG. 28 is an illustration showing a cooling mechanism for a liquid crystal panel, an incident-side polarization plate and an irradiation-side polarization plate according to the aforesaid embodiment.
Figure 29:
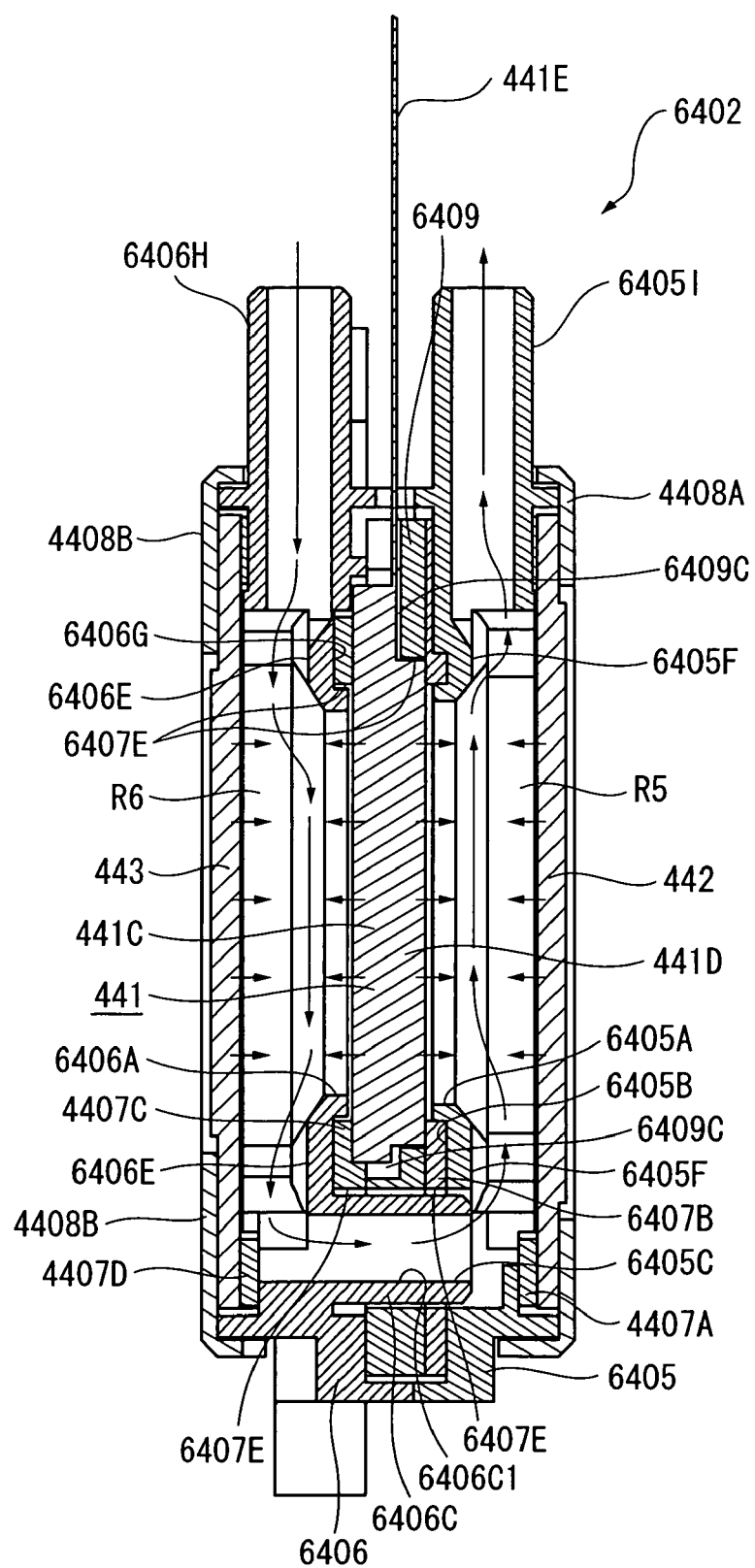
FIG. 29 is an illustration showing the cooling mechanism for the liquid crystal panel, the incident-side polarization plate and the irradiation-side polarization plate according to the aforesaid embodiment.

FIGS. 28 and 29 are illustrations showing a cooling mechanism for the liquid crystal panels 441, the incident-side polarization plates 442 and the irradiation-side polarization plates 443. Specifically, FIG. 28 is a plan view of the optical modulator holder 6402 seen from the light-irradiation side. FIG. 29 is a cross section taken along a line H—H in FIG. 28.

As in the second embodiment, when the fluid feeder 446 is driven, the cooling fluid in the main tank 445 is taken in the relay tank 5404 through the fluid circulator 448.

The cooling fluid taken in the relay tank 5404 flows out of the cooling fluid outlets 5404B of the relay tank 5404, and flows from the inlet ports 6406H of the optical modulator holders 6402 into the cooling chambers R6 (FIG. 29) of the optical modulator holders 6402 through the fluid circulators 448 as shown in FIG. 28 or 29.

The heat generated in the drive board 441C of the liquid crystal panel 441 and the irradiation-side polarization plate 443 by the light beam irradiated from the light source device 411 is transmitted to the cooling fluid in the cooling chamber R6.

As shown in FIG. 29, the heat transmitted to the cooling fluid in the cooling chamber R6 moves downward in FIG. 29 along with the flow of the cooling fluid. The heat moved downward is guided to the horizontal approximate center by a lateral wall of the lower recess 6406E (FIG. 27A) of the frame member 6406 along with the flow of the cooling fluid. As shown in FIG. 29, the heat guided to the horizontal approximate center moves into the cooling chamber R5 through the tubular portion 6406C and the insert hole 6405C connected to the tubular portion 6406C along with the flow of the cooling fluid.

The heat generated in the opposing board 441D of the liquid crystal panel 441 and the incident-side polarization plate 442 by the light beam irradiated from the light source device 411 is transmitted to the cooling fluid in the cooling chamber R5.

As shown in FIG. 29, the heat transmitted to the cooling fluid in the cooling chamber R5 moves upward in FIG. 29 together with the heat moved from the cooling chamber R6 along with the flow of the cooling fluid. The heat moved upward is guided to the horizontal approximate center by a lateral wall of the upper recess 6405F (FIG. 26B) of the frame member 6405 along with the flow of the cooling fluid. As shown in FIG. 29, the heat guided to the horizontal approximate center moves to the outside through the outlet port 6405I along with the flow of the cooling fluid.

As in the second embodiment, the heat moved to the outside of the optical modulator holder 6402 through the outlet port 6405I moves from the each optical modulator holder 6402 to the radiator 447 through the not-shown fluid circulators along with the flow of the cooling fluid to be released by the radiator 447.

The cooling fluid cooled by the radiator 447 moves from the radiator 447 to the main tank 445 to the fluid feeder 446 to the relay tank 5404, and moves to the cooling chamber R6 again.

As in the first embodiment, the sirocco fan 31 of the cooling unit 3 sends the cooling air to the outer face of the optical modulator holder 6402 and between the optical modulator holder 6402 and the support member 4403 to cool the light-incident end face of the incident-side polarization plate 442 and the light-irradiation end face of the irradiation-side polarization plate 443.

According to the third embodiment, compared with the first embodiment, since the cooling chambers R5 and R6 are communicated and connected by one tubular portion 6406C and one insert hole 6405C, the pair of frame members 6405 and 6406 can be considerably improved in the workability and more easily manufactured, thereby further reducing the manufacturing cost in comparison with the configuration described in the first embodiment in which the cooling chambers R1 and R2 are communicated and connected by the three tubular portions 4406C and 4406D and the three insert holes 4405C and 4405D. Since the second elastic member 6407B and the middle frame 6409 respectively have one insert hole 6407B1 and 6409D corresponding to one tubular portion 6406C, the second elastic member 6407B and the middle frame 6409 can be considerably improved in the workability and more easily manufactured, thereby further reducing the manufacturing cost in comparison with the configuration described in the first embodiment in which the second elastic member 4407B and the middle frame 4409 respectively have the three insert holes 4407B1 and 4409D. With this configuration, the size and the weight of the optical modulator holder 6402 can be reduced.

Since the cooling chambers R5 and R6 are communicated and connected at one section, i.e., one tubular portion 6406C and one insert hole 6405C, the leakage of the cooling fluid flowing between the cooling chambers R5 and R6 can be further reduced and the leakage protection can be more secured in comparison with the configuration described in the first embodiment in which the cooling chambers R1 and R2 are communicated and connected at three sections. Especially, since the symmetry and uniformity of the flow of the cooling fluid are improved, it is effective for uniformly cooling the liquid crystal panels 441.

Since the inlet port 6406H and the outlet port 6405I are respectively formed at the upper ends of the frame member 6406 and 6405, the work for connecting the fluid circulators 448 to the inlet port 6406H and the outlet port 6405I can be all performed from one direction (i.e., the upper direction), the connecting work can be further facilitated.

Since the cooling fluid flown in the cooling chamber R6 through the inlet port 6406H flows in the cooling chamber R5 through the tubular portion 6406C and the insert hole 6405C and flows out through the outlet port 6405I, the cooling fluid can easily flow from the cooling chambers R6 to the cooling chamber R5 and can flow in both of the cooling chambers R5 and R6.

[Fourth Embodiment]

A fourth embodiment of the present invention will be described with reference to the attached drawings.

In the following description, the components same as those in the first embodiment are indicated by the same reference symbols or numerals for omitting or simplifying the detailed description thereof.

According to the first embodiment, in the optical device 44, the flow rates of the cooling fluids split by the fluid splitter 4401 and flown in the three optical modulator holders 4402 are approximately equal.

On the other hand, according to the fourth embodiment, the optical device 44 includes flow-rate changers 449 for changing the flow rate of the cooling fluid flown in the optical modulator holders 4402. Except it, the configuration thereof is the same as the first embodiment.

Figure 30:
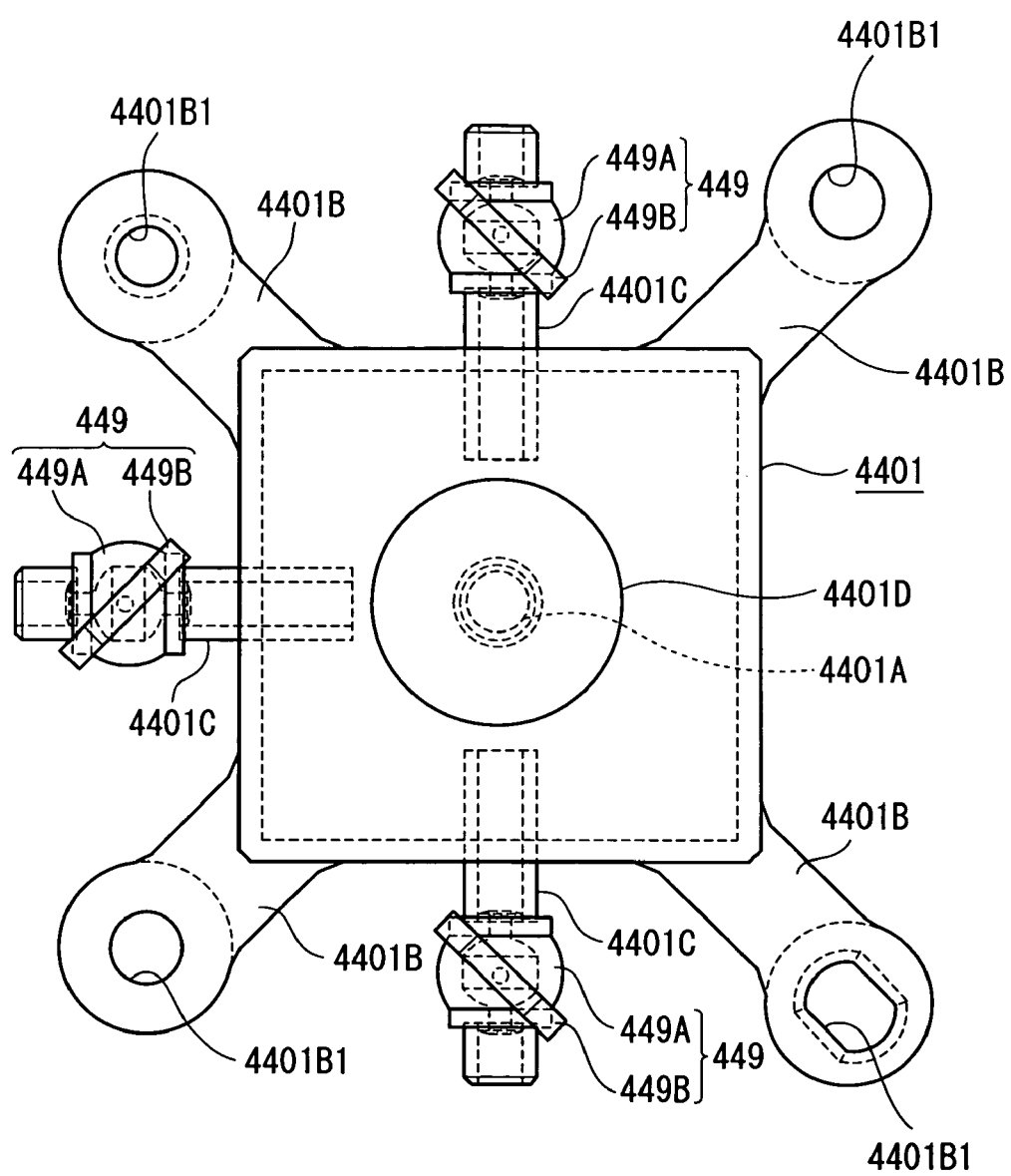
FIG. 30 is an illustration showing the structure of a flow-rate changer and an installation position thereof according to a fourth embodiment.

Specifically, FIG. 30 is an illustration showing the structure of the flow-rate changer 449 and an installation position thereof according to the fourth embodiment. More specifically, FIG. 30 is an illustration of the fluid splitter 4401 seen from the upper side.

The flow-rate changers 449 respectively provided at the cooling fluid outlets 4401C of the fluid splitter 4401 can change the flow rate of the cooling fluid flown in the optical modulator holders 4402 from the cooling fluid outlets 4401C. As shown in FIG. 30, each of the flow-rate changers 449 includes a flow-rate changer body 449A and a flow-rate regulator 449B.

The flow-rate changer body 449A has a flow channel for flowing the cooling fluid therein and pivotally and turnably supports the flow-rate regulator 449B.

Although not shown in detail, the flow-rate regulator 449B includes a regulating valve arranged in the flow-rate changer body 449A and a regulating screw projecting to the outside of the flow-rate changer body 449A.

The regulating valve can change the flow rate of the cooling fluid passing through the flow channel by narrowing and widening the flow channel in the flow-rate changer body 449A. The regulating valve interlocked with the movement of the regulating screw can change the flow rate of the cooling fluid passing through the flow channel in the flow-rate changer body 449A when the regulating screw is manually turned.

According to the fourth embodiment, compared with the first embodiment, the flow rate of the cooling fluid is increased for the liquid crystal panel 441 with high heat value among the three liquid crystal panels 441 while the flow rate of the cooling fluid is reduced for the liquid crystal panel 441 with low heat value by operating the flow-rate regulator 449B of the flow-rate changer 449, so that the temperatures of the liquid crystal panels 441 can be easily and highly accurately equalized with the simple structure. Accordingly, colors of optical images formed by the liquid crystal panels 441 can be properly maintained. In addition, the deterioration of the liquid crystal panels 441 can be prevented.

[Fifth Embodiment]

A fifth embodiment of the present invention will be described with reference to the attached drawings.

In the following description, the components same as those in the first embodiment are indicated by the same reference symbols or numerals for omitting or simplifying the detailed description thereof.

According to the first embodiment, in the optical device 44, the flow rates of the cooling fluids split by the fluid splitter 4401 and flown in the three optical modulator holders 4402 are approximately equal.

On the other hand, according to the fifth embodiment, the tube diameter of cooling fluid outlets 7401C of a fluid splitter 7401 and that of fluid circulators 748 connecting the fluid splitter 7401 and the optical modulator holders 4402 are different, and thereby the flow rate of the cooling fluid flown in the optical modulator holders 4402 is changed.

Figure 31:
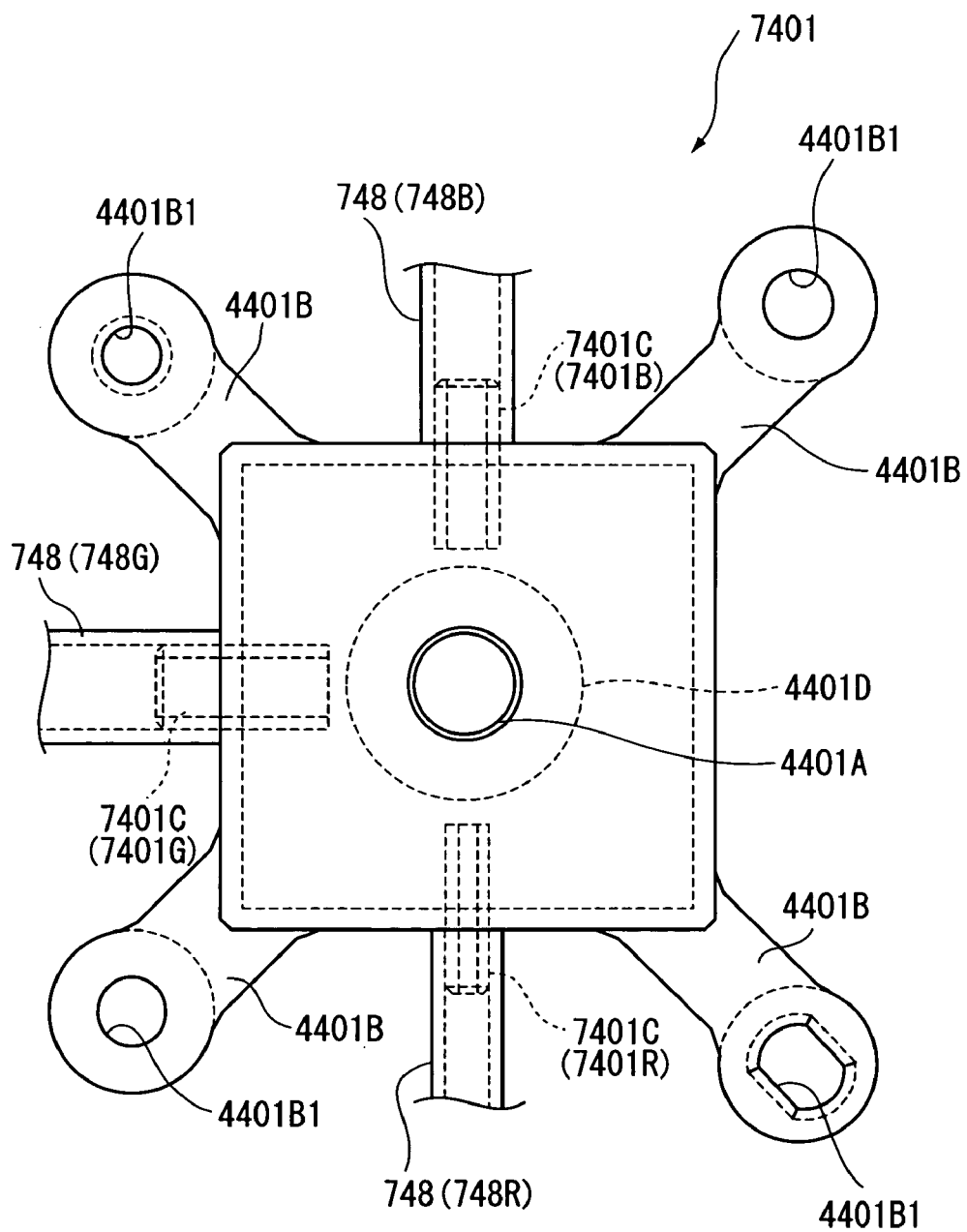
FIG. 31 is an illustration showing a fluid splitter and fluid circulators connected to the fluid splitter according to a fifth embodiment.

Specifically, FIG. 31 is an illustration showing the fluid splitter 7401 and the fluid circulators 748 connected to the fluid splitter 7401 according to the fifth embodiment. More specifically, FIG. 31 is an illustration of the fluid splitter 7401 seen from the lower side.

The fluid splitter 7401 has the substantially same configuration as the fluid splitter 4401 described in the first embodiment except only that cooling fluid outlets 7401R, 7401G and 7401B have different tube diameters.

According to this embodiment, the cooling fluid outlet 7401G for flowing the cooling fluid to the optical modulator holder 4402 holding the liquid crystal panel 441 for green light has the largest tube diameter. The cooling fluid outlet 7401B for flowing the cooling fluid to the optical modulator holder 4402 holding the liquid crystal panel 441 for blue light has a smaller tube diameter, and the cooling fluid outlet 7401R for flowing the cooling fluid to the optical modulator holder 4402 holding the liquid crystal panel 441 for red light has an even smaller tube diameter.

The fluid circulators 748, i.e., fluid circulators 748R, 748G and 748B also have different tube diameters corresponding to the tube diameters of the above-described cooling fluid outlets 7401R, 7401G and 7401B.

According to the fifth embodiment, compared with the first embodiment, since the cooling fluid outlets 7401R, 7401G and 7401B have different tube diameters and the fluid circulators 748R, 748G and 748B also have different tube diameters corresponding to the tube diameters of the cooling fluid outlets 7401R, 7401G and 7401B based on the heat value of the respective liquid crystal panels 441, the temperatures of the liquid crystal panels 441 can be easily and highly accurately equalized with the simple structure. Accordingly, colors of optical images formed by the liquid crystal panels 441 can be properly maintained.

While the present invention has been described above with the preferable embodiments, the present invention is not limited to the above-described embodiments, but includes improvements and modifications as long as an object of the present invention can be achieved.

While the optical modulator holders 4402, 5402 and 6402 respectively have one inlet port 4406H, 5406H and 6406H and one outlet port 4406I, 5406I and 6405I in the embodiments, the inlet port 4406H, 5406H and 6406H and the outlet port 4406I, 5406I and 6405I may be omitted so that the cooling fluid is sealed in the cooling chambers R1 to R6. Alternatively, two or more inlet ports and outlet ports may be respectively provided corresponding to the cooling chambers R1 to R6.

If the inlet ports 4406H, 5406H and 6406H and the outlet ports 4406I, 5406I and 6405I are omitted so that the cooling fluid is sealed in the cooling chambers R1 to R6, there is no need to provide the insert holes 4405C, 4405D, 5405C, 5405D and 6405C and the tubular portions 4406C, 4406D, 5406C, 5406D and 6406C in the pair of frame members 4405 and 4406, 5405 and 5406, and 6405 and 6406. With this configuration, the cooling fluid does not flow between the cooling chambers R1 and R2, between the cooling chambers R3 and R4, and between the cooling chambers R5 and R6, the leakage protection of the cooling fluid can be more secured.

If the inlet ports 4406H, 5406H and 6406H and the outlet ports 4406I, 5406I and 6405I are omitted so that the cooling fluid is sealed in the cooling chambers R1 to R6, the optical modulator holders 4402, 5402 and 6402 can be easily assembled by forming a projection projecting toward the opposing frame member on at last one of the pair of frame members 4405 and 4406, 5405 and 5406, and 6405 and 6406, and forming a fitting portion for fitting the projection thereto on the middle frames 4409, 5409 and 6409. In this case, the number and the position of the projection and fitting portion are not especially limited.

In the above embodiments, the position of the inlet ports 4406H, 5406H and 6406H and the outlet ports 4406I, 5406I and 6405I of the optical modulator holders 4402, 5402 and 6402 and the flowing direction of the cooling fluid are not limited to the position and the flowing direction described in the embodiments.

For example, while the outlet port 4406I and the inlet port 4406H are respectively formed on the upper and lower ends of the frame member 4406 in the first embodiment, the outlet port 4406I and the inlet port 4406H may be respectively formed on the upper and lower ends of the frame member 4405. Also, while the cooling fluid is flown from the lower side to the upper side, the cooling fluid may be flown from the upper side to the lower side by exchanging the positions of the inlet port 4406H and the outlet port 4406I. Further, the inlet port 4406H and the outlet port 4406I may be formed on the left and right ends of the frame member 4405 or 4406 without limiting to the upper and lower ends.

For example, while the inlet port 5406H and the outlet port 5406I are formed on the upper end of the frame member 5406 in the second embodiment, the inlet port 5406H and the outlet port 5406I may be formed on the upper end of the frame member 5405. With this configuration, the cooling fluid flows in the cooling chamber R3 at the light-incident side of the liquid crystal panel 441 through the inlet port 5406H, and flows in the cooling chamber R4 at the light-irradiation side of the liquid crystal panel 441 through the tubular portion 5406C and the insert hole 5405C. Further, the inlet port 5406H and the outlet port 5406I may be formed on another end, e.g., the lower end of the frame member 5405 or 5406 without limiting to the upper end.

Further, for example, while the outlet port 6405I is formed on the upper end of the frame member 6405 and the inlet port 6406H is formed on the upper end of the frame member 6406, the inlet port 6406H may be formed on the upper end of the frame member 6405 and the outlet port 6405I may be formed on the upper end of the frame member 6406. With this configuration, the cooling fluid flows in the cooling chamber R5 at the light-incident side of the liquid crystal panel 441 through the inlet port 6406H, and flows in the cooling chamber R6 at the light-irradiation side of the liquid crystal panel 441 through the tubular portion 6406C and the insert hole 6405C. While the inlet port 6406H and the outlet port 6405I are formed on the upper ends of the frame members 6406 and 6405, the inlet port may be formed on either one of the frame members 6405 and 6406 and the outlet port may be formed on the other one of the frame members. For instance, they may be respectively formed on the lower ends of the frame members 6406 and 6405.

In the above embodiments, the number and the position of the tubular portions 4406C, 4406D, 5406C, 5406D and 6406C and the insert holes 4405C, 4405D, 5405C, 5405D and 6405C formed in the pair of frame members 4405 and 4406, 5405 and 5406, and 6405 and 6406 are not especially limited. The same applies to the insert holes 4407B1, 5407B1 and 6407B1 of the second elastic members 4407B, 5407B and 6407B and the insert holes 4409D, 5409D and 6409D of the middle frames 4409, 5409 and 6409.

For example, while there are only one tubular portion 4406C and one insert hole 4405C are formed in the first embodiment, there may be two or more of each. While the tubular portion 4406C and the insert hole 4405C are formed at the lower horizontal center, they may be formed at other positions. The same applies to the tubular portions 5406C and 6406C and the insert holes 5405C and 6405C in the second and third embodiments. While there are two tubular portions 4406D and two insert holes 4405D, there may be only one of each.

While the optical device 44 is provide with the main tank 445, the fluid feeder 446 and the radiator 447 in the above embodiments, the object of the present invention is sufficiently achievable without providing at least any one of the main tank 445, the fluid feeder 446 and the radiator 447.

While the incident-side polarization plates 442 and the irradiation-side polarization plates 443 are arranged on the outer faces of the pair of frame members 4405 and 4406, 5405 and 5406, and 6405 and 6406 so that the cooling chambers R1 to R6 are covered by the translucent boards 442A and 443A of the incident-side polarization plates 442 and the irradiation-side polarization plates 443 in the above embodiments, the cooling chambers R1 to R6 may be covered by translucent boards made of glass or the like without polarization films attached thereon. If, instead of the absorption type polarization plates described in the above embodiments, reflective polarization plates that transmit a light beam having a predetermined polarization axis and reflect a light beam having other polarization axis are used as the incident-side polarization plate and the irradiation-side polarization plate, the temperature rise due to the light beam irradiated from the light source can be suppressed without cooling the incident-side polarization plate and the irradiation-side polarization plate by the cooing fluid.

The incident-side polarization plate 442 and the irradiation-side polarization plate 443 are used as the optical converters, and theses incident-side polarization plate 442 and the irradiation-side polarization plate 443 are cooled by the cooling fluid. However, phase plates or visual-angle corrector plates may be used as the optical converters, and these optical converters may be cooled by the cooling fluid.

The components in contact with the cooling fluid, i.e., the fluid circulators 448 and 748, the main tank 445, the fluid feeder 446, the pipe member 4472 of the radiator 447, the frame members 4405, 4406, 5405, 5406, 6405 and 6406 and the relay tank 4404 and 5404 are made of aluminum members in the above embodiments. However, without limiting to aluminum, they may be made of other corrosion-resistant materials such as oxygen-free copper and duralumin. Also, the middle frames 4409, 5409 and 6409 may be made of a material different from a material of the frame members 4405, 4406, 5405, 5406, 6405 and 6406, and may be made of a material other than aluminum. The fluid circulators 448 and 748 may be made of low-rigidity butyl rubber or fluorocarbon rubber that has small deformation reaction force against the optical modulator holders 4402, 5402 and 6402 and suppresses the pixel displacement.

The flow-rate changer 449 of the fourth embodiment may be applied to the second or third embodiment without limiting to the first embodiment. In such case, the flow-rate changer 449 is installed on the relay tank 5404 instead of the fluid splitter 4401. While there are three flow-rate changers 449 corresponding to the liquid crystal panels 441, there may be one or two. While the flow-rate changers 449 are provided at the cooling fluid outlets 4401C of the fluid splitter 4401, they may be provided at the fluid circulators 448 connected to the cooling fluid outlets 4401C or the cooling fluid outlets 5404B. The flow-rate changer 449, without limiting to the configuration described in the fourth embodiment, may be configured differently as long as it is provided with a valve in the flow channel of the cooling fluid and capable of narrowing and widening the flow channel by changing the position of the valve.

While the air send by the sirocco fan 31 cools the outer faces of the optical modulator holders 4402, 5402 and 6402 and the bottom face of the optical component casing 45 in the above embodiments, the object of the present invention is sufficiently achievable without providing the sirocco fan 31. Such configuration can contribute to noise reduction.

The configuration of the fifth embodiment may be applied to the second or third embodiment without limiting to the first embodiment. In such case, like the fluid splitter 7401, the three cooling fluid outlets 5404B of the relay tank 5404 are configured to have different tube diameters, and the fluid circulators 448 connected to the cooling fluid outlets 5404B are also configured to have different tube diameters. While the cooling fluid outlets 7401C of the fluid splitter 7401 and the fluid circulators 748 connected to the cooling fluid outlets 7401C have different tube diameters, only one of them may have a tube diameter smaller or larger than other ones.

While the optical unit 4 has a substantially L shape in plan view in the above embodiments, it may have a substantially U shape in plan view.

While only the projector 1 using the three liquid crystal panels 441 is exemplified in the above embodiments, the present invention may be applied to a projector using one liquid crystal panel, two liquid crystal panels or more than three liquid crystal panels.

While the transmissive liquid crystal panel separately having a light-incident side and a light-irradiation side is used in the above embodiments, a reflective optical liquid crystal panel having common light-incident side and light-irradiation side may be used.

While the liquid crystal panel is used as the optical modulator in the above embodiments, an optical modulator other than the liquid crystal panel such as a device using a micro-mirror may be used. In such case, the polarization plates at the light-incident side and the light-irradiation side can be omitted.

While only a front-type projector that projects an image in a direction for observing a screen is exemplified in the above embodiment, the present invention may be applied to a rear-type projector that projects an image in a direction opposite to the direction for observing the screen.

Although the best configuration for implementing the present invention has been disclosed above, the present invention is not limited thereto. In other words, the present invention is mainly illustrated and described on the specific embodiments, however, a person skilled in the art can modify the specific configuration such as shape, material, quantity in the above-described embodiment as long as a technical idea and an object of the present invention can be achieved.

Therefore, the description that limits the shape and the material is merely the example to make the present invention easily understood, but does not intend to limit the present invention, so that the present invention includes the description using a name of component without a part of or all of the limitation on the shape and the material etc.

The priority application No. JP 2004-020262 upon which this patent application is based is hereby incorporated by reference.

What is claimed is:

1. An optical modulator holder that holds an optical modulator for modulating a light beam irradiated from a light source in accordance with image information to form an optical image, and is provided with a cooling chamber for sealing a cooling fluid therein, the cooling fluid cooling the optical modulator, comprising:
a support frame having an opening corresponding to an outer profile of the optical modulator and supporting the optical modulator;
a pair of frame members respectively having openings corresponding to an image formation area of the optical modulator and sandwiching the support frame supporting the optical modulator;
elastic members respectively having openings corresponding to the image formation area of the optical modulator and respectively interposed between the pair of frame members and the optical modulator; and
translucent boards respectively arranged on faces opposite to the opposing faces of the pair of frame members,
wherein the cooling chamber is formed by closing opposing faces of the openings of the pair of frame members and the faces opposite to the opposing faces respectively with the optical modulator, the support frame, the elastic members and the translucent boards such that the cooling chamber is formed inside both of the pair of frame members, and
the optical modulator can be fitted into the opening of the support frame, an inner face of the opening of the support frame being an external position reference face for the optical modulator.

2. The optical modulator holder according to claim 1, wherein the support frame has a thickness approximately equal to a thickness of the optical modulator, so that a light-incident end face and a light-irradiation end face of the support frame become, respectively, substantially flush with a light-incident end face and a light-irradiation end face of the optical modulator when the optical modulator is received in the opening.

3. The optical modulator holder according to claim 2, wherein the elastic members are extended to planimetrically interfere with the support frame and respectively interposed between the support frame, the optical modulator and the pair of frame members.

4. The optical modulator holder according to claim 3, wherein recesses corresponding to the shape of the elastic members are respectively formed on the opposing faces of the pair of frame members, and elastic member housings capable of accommodating the elastic members are formed by the support frame, the optical modulator and the recesses when the optical modulator holder is assembled.

5. The optical modulator holder according to claim 1,
wherein a projection projecting toward the opposing frame member is formed on at least one frame member of the pair of frame members, and
a fitting portion into which the projection can be fitted is formed on the support frame.

6. The optical modulator holder according to claim 5,
wherein the projection projecting toward the opposing frame member is formed on a one frame member of the pair of frame members, and is provided with a hole communicating with the inside of the cooling chamber in the one frame member,
the projection can be inserted into the fitting portion of the support frame,
a projection insert hole communicating with the inside of the cooling chamber in the other frame member and into which the projection can be inserted is formed on the other frame member of the pair of frame members, and
an insert hole into which the projection can be inserted is formed on the elastic member interposed between the other frame member and the optical modulator.

7. The optical modulator holder according to claim 1,
wherein the optical modulator includes: a drive board having a plurality of signal lines, a plurality of switching elements connected to the plurality of signal lines, and a plurality of pixel electrodes connected to the plurality of switching elements; an opposing board arranged opposite to the drive board and having a common electrode; and a circuit board electrically connected to the plurality of signal lines and the common electrode and extending from between the drive board and the opposing board, and
a recess into which the circuit board is loosely fitted when the optical modulator is received in the opening is formed on the support frame.

8. The optical modulator holder according to claim 1, wherein the pair of frame members and the support frame are made of a same material.

9. An optical device comprising: an optical modulator that modulates a light beam irradiated from a light source in accordance with image information to form an optical image; and an optical modulator holder that holds the optical modulator and is provided with a cooling chamber for sealing a cooling fluid therein, the cooling fluid cooling the optical modulator,
wherein the optical modulator holder includes: a support frame having an opening corresponding to the outer profile of the optical modulator and supporting the optical modulator; a pair of frame members respectively having openings corresponding to an image formation area of the optical modulator and sandwiching the support frame supporting the optical modulator; elastic members respectively having openings corresponding to the image formation area of the optical modulator and respectively interposed between the pair of frame members and the optical modulator; and translucent boards respectively arranged on faces opposite to the opposing faces of the pair of frame members,
wherein the cooling chamber is formed by closing opposing faces of the openings of the pair of frame members and the faces opposite to the opposing faces respectively with the optical modulator, the support frame, the elastic members and the translucent boards such that the cooling chamber is formed inside both of the pair of frame members, and
the optical modulator can be fitted into the opening of the support frame, an inner face of the opening of the support frame being an external position reference face for the optical modulator.

10. The optical device according to claim 9, further comprising at least one optical converter that converts an optical property of an incident light beam,
wherein the optical converter includes: a translucent board; and an optical conversion film formed on the translucent board for converting the optical property of the incident light beam, and
at least one of the translucent boards of the optical modulator holder is the translucent board of the optical converter.

11. The optical device according to claim 9, further comprising:
a plurality of the optical modulators;

a plurality of the optical modulator holders corresponding to the plurality of optical modulators; and a color-combining optical device that has a plurality of light-incident end faces to which the plurality of optical modulator holders are attached, and combines and irradiates respective color lights modulated by the plurality of optical modulators.

12. A projector comprising: a light source device; an optical device including an optical modulator that modulates a light beam irradiated from a light source in accordance with image information to form an optical image; and a projection optical device that enlarges and projects an optical image formed by the optical device, wherein the optical device includes an optical modulator holder that holds the optical modulator and is provided with a cooling chamber for sealing a cooling fluid therein, the cooling fluid cooling the optical modulator, the optical modulator holder including: a support frame having an opening corresponding to the outer profile of the optical modulator and supporting the optical modulator; a pair of frame members respectively having openings corresponding to an image formation area of the optical modulator and sandwiching the support frame supporting the optical modulator; elastic members respectively having openings corresponding to the image formation area of the optical modulator and respectively interposed between the pair of frame members and the optical modulator; and translucent boards respectively arranged on faces opposite to the opposing faces of the pair of frame members, wherein the cooling chamber is formed by closing opposing faces of the openings of the pair of frame members and the faces opposite to the opposing faces respectively with the optical modulator, the support frame, the elastic members and the translucent boards such that the cooling chamber is formed inside both of the pair of frame members, and the optical modulator can be fitted into the opening of the support frame, an inner face of the opening of the support frame being an external position reference face for the optical modulator.

13. The projector according to claim 12, wherein the support frame has a thickness approximately equal to a thickness of the optical modulator, so that a light-incident end face and a light-irradiation end face of the support frame become, respectively, substantially flush with a light-incident end face and a light-irradiation end face of the optical modulator when the optical modulator is received in the opening.

14. The projector according to claim 13, wherein the elastic members are extended to planimetrically interfere with the support frame and respectively interposed between the support frame, the optical modulator and the pair of frame members.

15. The projector according to claim 14, wherein recesses corresponding to the shape of the elastic members are respectively formed on the opposing faces of the pair of frame members, and elastic member housings capable of accommodating the elastic members are formed by the support frame, the optical modulator and the recesses when the optical modulator holder is assembled.

16. The projector according to claim 12, wherein a projection projecting toward the opposing frame member is formed on at least one frame member of the pair of frame members, and a fitting portion into which the projection can be fitted is formed on the support frame.

17. The projector according to claim 16, wherein the projection projecting toward the opposing frame member is formed on a one frame member of the pair of frame members, and is provided with a hole communicating with the inside of the cooling chamber in the one frame member, the projection can be inserted into the fitting portion of the support frame, a projection insert hole communicating with the inside of the cooling chamber in the other frame member and into which the projection can be inserted is formed on the other frame member of the pair of frame members, and an insert hole into which the projection can be inserted is formed on the elastic member interposed between the other frame member and the optical modulator.

18. The projector according to claim 12, wherein the optical modulator includes: a drive board having a plurality of signal lines, a plurality of switching elements connected to the plurality of signal lines, and a plurality of pixel electrodes connected to the plurality of switching elements; an opposing board arranged opposite to the drive board and having a common electrode; and a circuit board electrically connected to the plurality of signal lines and the common electrode and extending from between the drive board and the opposing board, and a recess into which the circuit board is loosely fitted when the optical modulator is received in the opening is formed on the support frame.

19. The projector according to claim 12, wherein the pair of frame members and the support frame are made of a same material.

20. The projector according to claim 12, further comprising at least one optical converter that converts an optical property of an incident light beam, wherein the optical converter includes: a translucent board; and an optical conversion film formed on the translucent board for converting the optical property of the incident light beam, and at least one of the translucent boards of the optical modulator holder is the translucent board of the optical converter.

21. The projector according to claim 20, further comprising:

a plurality of the optical modulators;

a plurality of the optical modulator holders corresponding to the plurality of optical modulators; and a color-combining optical device that has a plurality of light-incident end faces to which the plurality of optical modulator holders are attached, and combines and irradiates respective color lights modulated by the plurality of optical modulators.

22. The projector according to claim 12, further comprising:

a plurality of the optical modulators;

a plurality of the optical modulator holders corresponding to the plurality of optical modulators; and a color-combining optical device that has a plurality of light-incident end faces to which the plurality of optical modulator holders are attached, and combines and irradiates respective color lights modulated by the plurality of optical modulators.

* * * * *